US012451080B2

(12) United States Patent
Kim

(10) Patent No.: US 12,451,080 B2
(45) Date of Patent: Oct. 21, 2025

(54) SCAN DRIVING CIRCUIT, SENSING DRIVING CIRCUIT, AND DISPLAY DEVICE INCLUDING THE SAME

(71) Applicant: Samsung Display Co., LTD., Yongin-si (KR)

(72) Inventor: Hong Kyu Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 72 days.

(21) Appl. No.: 18/503,261

(22) Filed: Nov. 7, 2023

(65) Prior Publication Data

US 2024/0169929 A1 May 23, 2024

(30) Foreign Application Priority Data

Nov. 14, 2022 (KR) ........................ 10-2022-0152041
Jun. 21, 2023 (KR) ........................ 10-2023-0079704

(51) Int. Cl.
*G09G 3/3266* (2016.01)
*G09G 3/20* (2006.01)
*G09G 3/3233* (2016.01)

(52) U.S. Cl.
CPC ......... *G09G 3/3266* (2013.01); *G09G 3/2096* (2013.01); *G09G 3/3233* (2013.01); *G09G 2300/0819* (2013.01); *G09G 2300/0842* (2013.01); *G09G 2320/0233* (2013.01); *G09G 2320/0247* (2013.01); *G09G 2320/045* (2013.01); *G09G 2330/021* (2013.01); *G09G 2330/12* (2013.01); *G09G 2340/0435* (2013.01)

(58) Field of Classification Search
CPC .................................................... G09G 3/3266
See application file for complete search history.

(56) References Cited

U.S. PATENT DOCUMENTS

2005/0078100 A1 4/2005 Tsujino et al.
2010/0201666 A1 8/2010 Tobita
2011/0228893 A1 9/2011 Tobta et al.
2020/0035163 A1 1/2020 Sun et al.
2020/0193912 A1 * 6/2020 Park ..................... G09G 3/3275
2021/0201804 A1 7/2021 Feng et al.
2022/0068194 A1 3/2022 Kim et al.

OTHER PUBLICATIONS

U.S. Final Office Action dated Feb. 20, 2025, in U.S. Appl. No. 18/239,128.

* cited by examiner

*Primary Examiner* — Gustavo Polo
(74) *Attorney, Agent, or Firm* — Sughrue Mion, PLLC

(57) ABSTRACT

A scan driving circuit including scan stage circuits that each output a first carry signal and a scan signal, and sense stage circuits that each output a second carry signal and a sense signal. Each of the scan stage circuits receives the first carry signal from at least one preceding or subsequent scan stage circuit. Each of the sense stage circuits receives the second carry signal from at least one preceding or subsequent sense stage circuit. Each of the plurality of sense stage circuits receives the first carry signal from one of the at least one preceding or subsequent scan stage circuit.

18 Claims, 29 Drawing Sheets

SCAN DRIVING CIRCUIT, SENSING DRIVING CIRCUIT, AND DISPLAY DEVICE INCLUDING THE SAME

CROSS-REFERENCE TO RELATED APPLICATION(S)

This application claims priority to and the benefits of Korean Patent Application Nos. 10-2022-0152041, filed in the Korean Intellectual Property Office on Nov. 14, 2022, and 10-2023-0079704, filed in the Korean Intellectual Property Office on Jun. 21, 2023, the entire contents of which are incorporated herein by reference.

BACKGROUND

1. Technical Field

Embodiments of the disclosure relate to a scan driving circuit and a display device including the same.

2. Description of the Related Art

With the development of information technology, the importance of a display device, which is a connection medium between a user and information, has been emphasized. Owing to the importance of display devices, the use of various kinds of display devices, such as a liquid crystal display device and an organic light emitting display device, has increased.

Such display devices may display images of various contents. For example, the display devices may display various types of images such as still images, web pages, and images for movies or electronic games. In the case where a still image is displayed on a display device, frequent frame transitions may not be required. On the other hand, in the case where images for movies or electronic games are displayed on a display device, frequent frame transitions may be needed.

In terms of improvement in power consumption, technology of displaying images on the display device at various refresh rates (or refresh frame rates) have been developed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Various embodiments of the disclosure are directed to a display device which is improved in visibility so that images can be displayed at various refresh rates, and a display device including the same.

Embodiments of the disclosure may provide a scan driving circuit that may include a plurality of scan stage circuits each that output a first carry signal and a scan signal, and a plurality of sense stage circuits each that output a second carry signal and a sense signal. Each of the plurality of scan stage circuits may receive the first carry signal from at least one preceding or subsequent scan stage circuit. Each of the plurality of sense stage circuits may receive the second carry signal from at least one preceding or subsequent sense stage circuit. Each of the plurality of sense stage circuits may receive the first carry signal from one of the at least one preceding or subsequent scan stage circuit.

Each of the plurality of scan stage circuits may output the first carry signal and the scan signal based on a voltage of a first Q node, and each of the plurality of sense stage circuits may output the second carry signal and the sense signal based on a voltage of a second Q node.

At least one of the plurality of scan stage circuits may include a first terminal that receives a first sampling signal, a second terminal that receives a second sampling signal, a third terminal that receives the first carry signal, a scan sensing block connected to the first terminal, the second terminal, the third terminal, and the first Q node, a fourth terminal that outputs the first carry signal generated in response to the voltage of the first Q node, and a fifth terminal that outputs the scan signal generated in response to the voltage of the first Q node.

At least one of the plurality of sense stage circuits may include a first terminal that receives a first sampling signal, a second terminal that receives a second sampling signal, a third terminal that receives the first carry signal, a sense sensing block connected to the first terminal, the second terminal, the third terminal, and the second Q node, a fourth terminal that outputs the second carry signal generated in response to the voltage of the second Q node, and a fifth terminal that outputs the sense signal generated in response to the voltage of the second Q node, and the sense sensing block may store a high level voltage in response to the first sampling signal and the first carry signal and apply the stored high level voltage to the second Q node in response to the second sampling signal.

At least one of the plurality of sense stage circuits may include a sixth terminal to which the high level voltage is applied, a seventh terminal to which a low level voltage is applied, an eighth terminal configured to receive a carry clock signal, and a ninth terminal that receives a sense clock signal.

The sense stage circuit may further include a tenth terminal to which the high level voltage is applied, and the sense sensing block may include a twenty-first transistor including a gate electrode connected to the first terminal and that switches electrical connection between the third terminal and a twenty-third transistor, a twenty-second transistor that switches electrical connection between the tenth terminal and the twenty-first transistor and to switch electrical connection between the tenth terminal and the twenty-third transistor, the twenty-third transistor including a gate electrode connected to the first terminal and that switches electrical connection between the gate electrode of the twenty-first transistor and a gate electrode of the twenty-second transistor, a twenty-fourth transistor including a gate electrode connected to the gate electrode of the twenty-second transistor, and electrically connected to the sixth terminal, a twenty-fifth transistor including a gate electrode electrically connected to the second terminal and that switches electrical connection between the twenty-fourth transistor and the second Q node, a seventh transistor including a gate electrode electrically connected to the gate electrode of the twenty-fourth transistor, and electrically connected to the seventh terminal, and a capacitor including an electrode electrically connected to the gate electrode of the twenty-fourth transistor and another electrode electrically connected to the sixth terminal.

The sense sensing block may include a fourteenth transistor electrically connected to the sixth terminal, a nineteenth transistor that switches electrical connection between the third terminal and a gate electrode of the fourteenth transistor and including a gate electrode electrically connected to the first terminal, a fifteenth transistor including a gate electrode electrically connected to the second terminal and that switches electrical connection between the fourteenth transistor and the second Q node, and a capacitor including an electrode electrically connected to the fourteenth transistor and another electrode electrically connected to the sixth terminal.

The plurality of scan stage circuits may reset the voltage of the first Q node in response to a first reset signal, and the plurality of sense stage circuits may reset the voltage of the second Q node in response to a second reset signal that is different from the first reset signal.

Embodiments of the disclosure may provide a scan driving circuit including a plurality of scan stage circuits and a plurality of sense stage circuits, one of the plurality of scan stage circuits may include a first terminal that receives a first sampling signal, a second terminal that receives a second sampling signal, a third terminal that receives a first carry signal from one preceding scan stage circuit among the plurality of scan stage circuits, a scan sensing block connected to the first terminal, the second terminal, the third terminal, and a first Q node of the scan stage circuit, a fourth terminal that outputs an i-th first carry signal (i is an integer greater than or equal to 1) generated in response to a voltage of the first Q node, and a fifth terminal that outputs an i-th scan signal generated in response to the voltage of the first Q node, and one of the plurality of sense stage circuits may include a first terminal that receives the first sampling signal, a second terminal that receives the second sampling signal, a third terminal that receives the i-th first carry signal, a sense sensing block connected to the first terminal, the second terminal, the third terminal, and a second Q node of the sense stage circuit, a fourth terminal that outputs a j-th second carry signal (j is an integer greater than or equal to i) generated in response to a voltage of the second Q node, and a fifth terminal that outputs a j-th sense signal generated in response to the voltage of the second Q node.

The sense sensing block may stores a high level voltage in response to the first sampling signal and the i-th first carry signal and may output the stored high level voltage in response to the second sampling signal.

The one of the plurality of sense stage circuits may include a sixth terminal to which the high level voltage is applied, a seventh terminal to which a low level voltage is applied, an eighth terminal that receives a carry clock signal, and a ninth terminal that receives a sense clock signal.

The at least one of the plurality of sense stage circuits may further include a tenth terminal to which the high level voltage is applied, and the sense sensing block may include a twenty-first transistor including a gate electrode connected to the first terminal and that switches electrical connection between the third terminal and a twenty-third transistor, a twenty-second transistor that switches electrical connection between the tenth terminal and the twenty-first transistor and to switch electrical connection between the tenth terminal and the twenty-third transistor, the twenty-third transistor including a gate electrode connected to the first terminal and that switches electrical connection between the gate electrode of the twenty-first transistor and a gate electrode of the twenty-second transistor, a twenty-fourth transistor including a gate electrode connected to the gate electrode of the twenty-second transistor, and electrically connected to the sixth terminal, a twenty-fifth transistor including a gate electrode electrically connected to the second terminal and that switches electrical connection between the twenty-fourth transistor and the second Q node, a seventh transistor including a gate electrode electrically connected to the gate electrode of the twenty-fourth transistor, and electrically connected to the seventh terminal, and a capacitor including an electrode electrically connected to the gate electrode of the twenty-fourth transistor and another electrode electrically connected to the sixth terminal.

The sense sensing block may include a fourteenth transistor electrically connected to the sixth terminal, a nineteenth transistor that switches electrical connection between the third terminal and a gate electrode of the fourteenth transistor and including a gate electrode electrically connected to the first terminal, a fifteenth transistor including a gate electrode electrically connected to the second terminal and that switches electrical connection between the fourteenth transistor and the second Q node, and a capacitor including an electrode electrically connected to the fourteenth transistor and another electrode electrically connected to the sixth terminal.

Embodiments of the disclosure may provide a display device that may include a display panel including a plurality of scan lines, a plurality of sense lines, a plurality of data lines, a plurality of reference voltage lines, and a plurality of sub-pixels, each of the plurality of sub-pixels being electrically connected to a corresponding one of the plurality of scan lines, a corresponding one of the plurality of sense lines, a corresponding one of the plurality of data lines, and a corresponding one of the plurality of reference voltage lines. The display device may further include a scan driving circuit including a plurality of scan stage circuits that output a first carry signal and a scan signal, and a plurality of sense stage circuits that output a second carry signal and a sense signal, wherein the scan driving circuit that outputs the scan signal to each of the plurality of scan lines and output the sense signal to each of the plurality of sense lines, a data driving circuit including an output circuit that supplies a data voltage to the plurality of data lines and a sensing circuit that senses at least one of the plurality of reference voltage lines, and a timing controller that controls operation timings of the scan driving circuit and the data driving circuit. Each of the plurality of scan stage circuits may receive the first carry signal from at least one preceding or subsequent scan stage circuit, and each of the plurality of sense stage circuits may receive the second carry signal from at least one preceding or subsequent sense stage circuit. Each of the plurality of sense stage circuits may receive the first carry signal from one of the at least one preceding or subsequent scan stage circuit.

At least one of the plurality of sub-pixels may include a light emitting element connected between a second node and a second power line, a first transistor including a gate electrode electrically connected to a first node, and connected between a first power line and the second node, a second transistor including a gate electrode electrically connected to a corresponding one of the plurality of scan lines and that switches electrical connection between the first node and the corresponding one of the plurality of data lines, a third transistor including a gate electrode electrically connected to a corresponding one of the plurality of sense lines and that switches electrical connection between the second node and the corresponding one of the plurality of reference voltage lines, and a storage capacitor including an electrode electrically connected to the first node and another electrode electrically connected to the second node.

In an active period of a frame period including the active period and a blank period, the display device may supply a data voltage to the plurality of data lines and sequentially supply a scan signal having a turn-on level to the plurality of scan lines in synchronization with a timing of supplying the data voltage, and in the blank period of the frame period, the display device may supply a scan signal having a turn-off level to the plurality of scan lines and sequentially supply a sense signal having a turn-on level to the plurality of sense lines.

The blank period of a preceding frame and the active period of a subsequent frame may overlap each other.

The timing controller may output a first sampling signal for selecting one sense stage circuit from among the plurality of sense stage circuits in the active period.

The timing controller may output a second sampling signal for outputting the sense signal from the one sense stage circuit selected from among the plurality of sense stage circuits in the blank period.

The one selected sense stage circuit may be a sense stage circuit that simultaneously receives the first carry signal having a turn-on level and the first sampling signal having a turn-on level among the plurality of sense stage circuits.

DETAILED DESCRIPTION OF THE EMBODIMENTS

Figure 1:
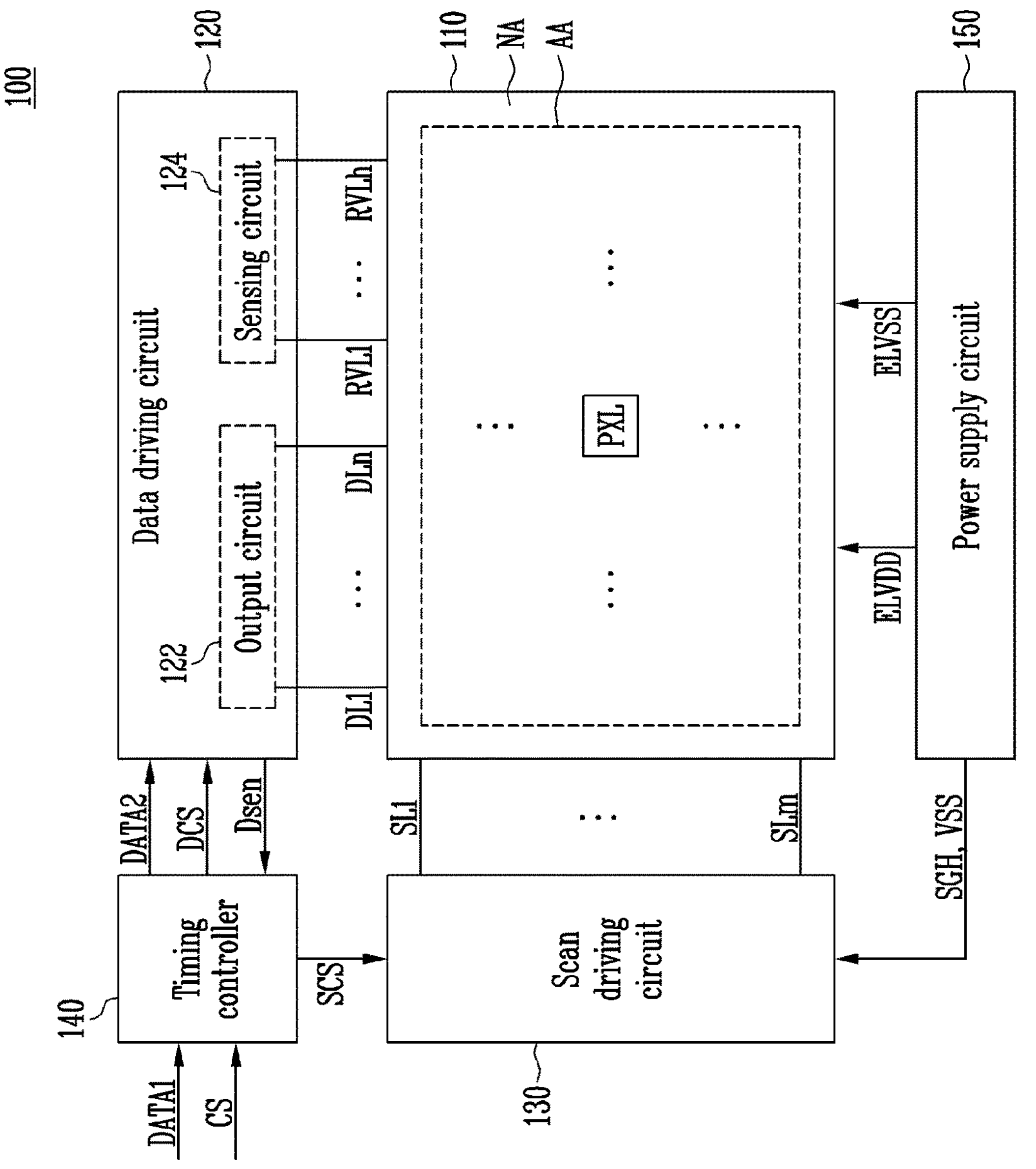
FIG. 1 is a schematic system block diagram of a display device in accordance with embodiments of the disclosure.

Hereinafter, embodiments of the disclosure will be described in detail with reference to the attached drawings, such that those skilled in the art can easily implement the disclosure. The disclosure may be implemented in various forms, and is not limited to the embodiments to be described herein below.

In the drawings, portions which are not related to the disclosure may be omitted in order to explain the disclosure more clearly. Reference may be made to the drawings, in which similar reference numerals are used throughout the different drawings to designate similar components.

For reference, the size of each component and the thicknesses of lines illustrating the component may be arbitrarily represented for the sake of explanation, and the disclosure is not limited to what is illustrated in the drawings.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean any combination including "A, B, or A and B." The terms "and" and "or" may be used in the conjunctive or disjunctive sense and may be understood to be equivalent to "and/or."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Furthermore, the expression "being the same" may mean "being substantially the same".

"About" or "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

While such terms as "first" and "second" may be used to describe various elements, such elements should not be limited by the above terms. The above terms are used to distinguish one element from another. For example, while not departing from the scope of the disclosure, a first element may be referred to as a second element, and similarly, a second element may be referred to as a first element.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic system block diagram of a display device 100 in accordance with embodiments of the disclosure.

Referring to FIG. 1, the display device 100 in accordance with embodiments of the disclosure may include a display panel 110, a data driving circuit 120, a scan driving circuit 130, a timing controller 140, a power supply circuit 150, and the like.

Multiple pixels PXL may be disposed on the display panel 110. Multiple data lines DL1 to DLn (n is an integer greater than or equal to 2) electrically connected to the pixels PXL, multiple scan lines SL1 to SLm (m is an integer greater than or equal to 2), and multiple reference voltage lines RVL1 to RVLh (h is an integer greater than or equal to 2), and the like may be disposed on the display panel 110. One or more common voltage lines (not illustrated) configured to apply a common voltage (e.g., a first common voltage ELVDD, a second common voltage ELVSS, etc.) to multiple pixels PXL may be disposed on the display panel 110.

The display panel 110 may include a display area AA in which the pixels PXL are disposed, and a non-display area NA located around the display area AA (e.g., at the edge of the display area AA)

The display panel 110 may be formed to be flat, but the disclosure is not limited thereto. For example, the display panel 110 may include curved portions (not illustrated) formed at left and right ends. The curved surface may have a constant curvature or a changing curvature. The display panel 110 may be flexibly formed so that the display panel 110 can be curved, bent, folded, and/or rolled.

The data lines DL1 to DLn may be disposed to extend in a first direction (e.g., a direction crossing from the upper side to the lower side of the display panel 110) in the display panel 110. The scan lines SL1 to SLm may be disposed to extend in a second direction different from the first direction (e.g., a direction crossing from the left side to the right side of the display panel 110) in the display panel 110. The reference voltage lines RVL1 to RVLk may be disposed to extend in the first direction in the display panel 110, but the disclosure is not limited thereto.

The data driving circuit 120 may include an output circuit 122 and a sensing circuit 124. In accordance with embodiments, the output circuit 122 and the sensing circuit 124 may be formed to be functionally separate from each other within the same integrated circuit. In accordance with embodiments, the output circuit 122 and the sensing circuit 124 may be formed in different integrated circuits.

The output circuit 122 may be configured to supply a data voltage to the data lines DL1 to DLn. The output circuit 122 may generate the data voltage based on second image data DATA2 and a data driving circuit control signal DCS and may output the generated data voltage to the data lines DL1 to DLn according to a timing. The data driving circuit control signal DCS may include, for example, a source start pulse (SSP), a source shift clock (SSC), a source output enable (SOE), and the like.

The sensing circuit 124 may be configured to input a reference voltage to the reference voltage lines RVL1 to RVLk in response to the data driving circuit control signal DCS and to sense the voltages of the reference voltage lines RVL1 to RVLk. The sensing circuit 124 may convert the sensed voltage into a corresponding digital value Dsen and output the converted digital value Dsen. The sensing circuit 124 may include one or more analog digital converters (ADCs). The data driving circuit control signal DCS may include, for example, a reference voltage switching signal, a sampling control signal, a hold control signal, and the like. A detailed description of the signals will be described below with reference to FIG. 4.

The data driving circuit 120 may be implemented as an integrated circuit (e.g., a source driver integrated circuit (SDIC)) formed separately from the display panel 110, and may be formed together with the display panel 110 and formed in at least a portion of the non-display area NA of the display panel 110.

The scan driving circuit 130 may be configured to output a gate signal (e.g., a scan signal and a sense signal) to the scan lines SL1 to SLm in response to the scan driving circuit control signal SCS. The scan driving circuit 130 may be implemented as an integrated circuit (e.g., a gate driving integrated circuit (GDIC)) formed separately from the display panel 110, and may be formed together with the display panel 110 and formed in at least a portion of the non-display area NA of the display panel 110.

The timing controller 140 may be configured to control the data driving circuit 120 and the scan driving circuit 130. The timing controller 140 may generate and output the control signals DCS and SCS for controlling the data driving circuit 120 and the scan driving circuit 130 based on a control signal CS (e.g., a synchronization signal, a clock signal, etc.) inputted through an external device (e.g., a set-top box, an application processor (AP), etc.).

The timing controller 140 may receive first image data DATA1 from the outside and align the inputted original image data DATA1 in units of pixel rows. The timing controller 140 may convert the inputted first image data DATA1 according to a preset interface (e.g., low voltage differential signaling (LVDS), embedded display port (eDP), etc.). Second image data DATA2 that the timing controller 140 outputs to the data driving circuit 120 may be data converted within the timing controller 140 according to the preset interface.

The timing controller 140 may be a logic or processor type and may be disposed within the display device 100. The timing controller 140 may include one or more registers.

The power supply circuit 150 may be configured to output a constant voltage having a constant voltage level. For example, the power supply circuit 150 may output the first power voltage ELVDD and the second power voltage ELVSS supplied to the display panel 110. For example, the power supply circuit 150 may output, for example, a high level voltage SGH, a low level voltage VSS, and the like supplied to the scan driving circuit 130. The power supply circuit 150 may include, for example, a power management integrated circuit (PMIC).

In FIG. 1, the driving circuits 120, 130, 140, and 150 that supply the signals, the voltages, and the like to the display panel 110 are merely classified according to function. For example, the data driving circuit 120 and the timing controller 140 may be formed within one integrated circuit. The data driving circuit 120 and the timing controller 140 may be classified within one integrated circuit according to function.

The display device 100 in accordance with embodiments of the disclosure may be used as a display screen for a portable electronic device, such as a mobile phone, a smartphone, a tablet personal computer (PC), a smart watch, a watch phone, a mobile communication terminal, an electronic organizer, an e-book, a portable multimedia player (PMP), a navigation system, and an ultra mobile PC (UMPC), and may be used as display screens for various products, such as a television, a laptop, a monitor, a billboard, and an Internet of things (IoT) device.

Figure 2:
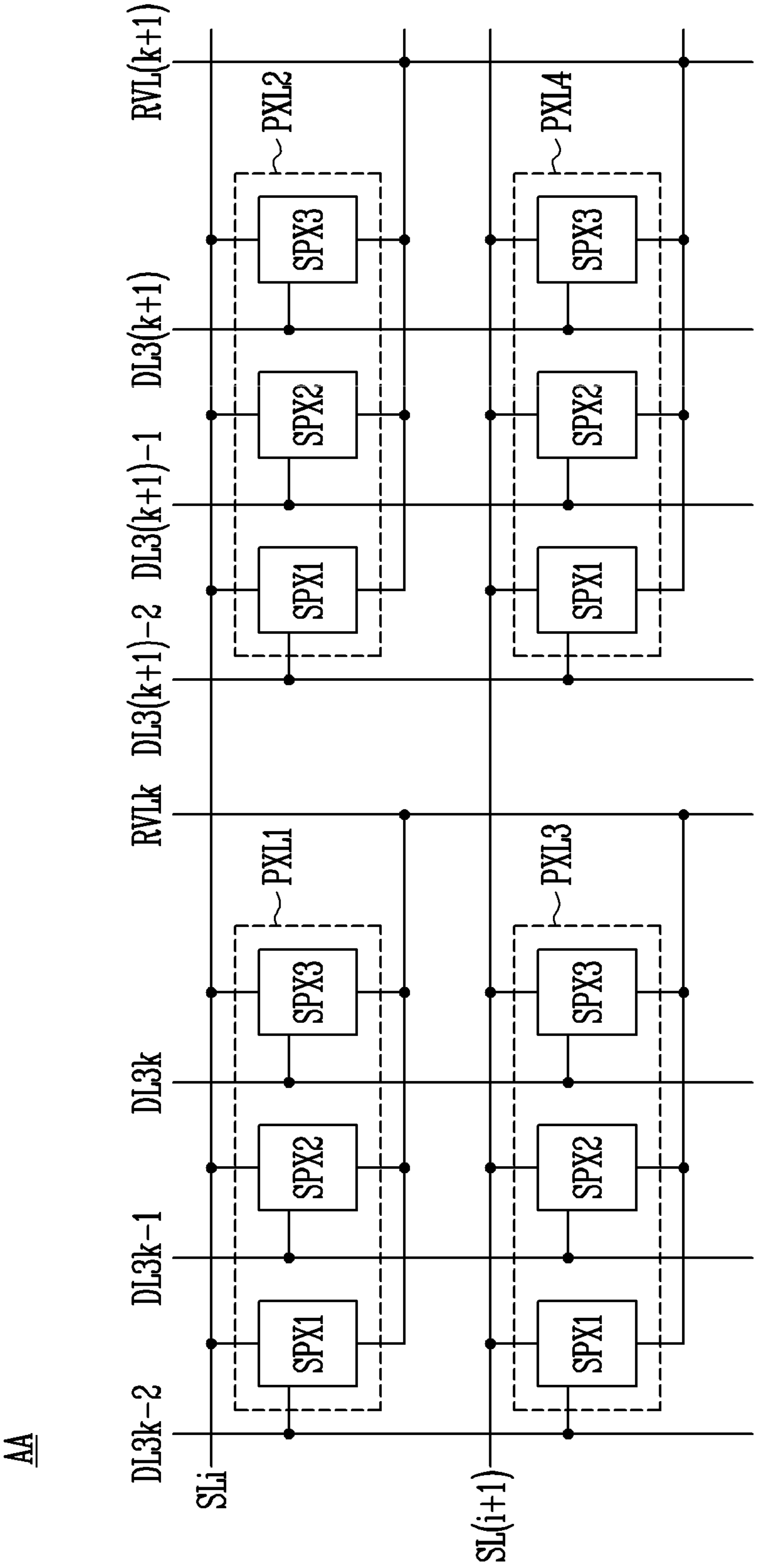
FIG. 2 is a schematic diagram of a display area in accordance with embodiments of the disclosure.

FIG. 2 is a schematic diagram of the display area AA in accordance with embodiments of the disclosure.

Referring to FIG. 2, four pixels PXL1, PXL2, PXL3, and PXL4 (hereinafter PXL1 to PXL4) arranged in a matrix type are illustrated as an example. At least two of the four pixels PXL1 to PXL4 may be arranged adjacent to each other in a row direction or may be arranged adjacent to each other in a column direction.

One of the four pixels PXL1 to PXL4 (e.g., the first pixel PXL1 located in the upper left corner) may include three or more sub-pixels SPX1, SPX2, and SPX3.

The three sub-pixels SPX1, SPX2, and SPX3 constituting one pixel (e.g., the first pixel PXL1) may be configured to emit light in different wavelength bands, respectively. For example, the first sub-pixel SPX1 may be configured to emit light in a red wavelength band. For example, the second sub-pixel SPX2 may be configured to emit light in a green wavelength band. For example, the third sub-pixel SPX3 may be configured to emit light in a blue wavelength band. In accordance with embodiments, one pixel (e.g., PXL1) may further include a white sub-pixel (not illustrated) configured to emit white light. In accordance with embodiments, one pixel (e.g., PXL1) may include two or more sub-pixels (e.g., two or more second sub-pixels SPX2) configured to emit green light.

The red wavelength band may be a wavelength band of about 600 nm (nanometer) to about 750 nm. The green wavelength band may be a wavelength band of about 480 nm to about 560 nm. The blue wavelength band may be a wavelength band of about 370 nm to about 460 nm.

Hereinafter, the case where the four pixels PXL1 to PXL4 each include one first sub-pixel SPX1, one second sub-pixel SPX2, and one third sub-pixel SPX3 will be described as an example. However, embodiments of the disclosure are not limited thereto.

In embodiments of the disclosure, the sub-pixels SPX1, SPX2, and SPX3 constituting one pixel (e.g., the first pixel PXL1) may be electrically connected to the corresponding data lines, respectively. For example, the first sub-pixel SPX1, the second sub-pixel SPX2, and the third sub-pixel SPX3 of the first pixel PXL1 (or the third pixel PXL3) may be electrically connected to three consecutive data lines DL3*k*-2, DL3*k*-1, and DL3*k* (k is an integer from 1 to h). For example, the first sub-pixel SPX1, the second sub-pixel SPX2, and the third sub-pixel SPX3 of the second pixel PXL2 (or the fourth pixel PXL4) may be electrically connected to three consecutive data lines DL3(*k*+1)−2, DL3(*k*+1)−1, and DL3(*k*+1), respectively.

In embodiments of the disclosure, the sub-pixels SPX1, SPX2, and SPX3 constituting one pixel (e.g., the first pixel PXL1) may be electrically connected to one reference voltage line. For example, the first sub-pixel SPX1, the second sub-pixel SPX2, and the third sub-pixel SPX3 of the first pixel PXL1 (or the third pixel PXL3) may be electrically connected to a k-th reference voltage line RVLk. For example, the first sub-pixel SPX1, the second sub-pixel SPX2, and the third sub-pixel SPX3 of the second pixel PXL2 (or the fourth pixel PXL4) may be electrically connected to a k+1-th reference voltage line RVL(k+1). Although not illustrated, in accordance with embodiments, the sub-pixels SPX1, SPX2, and SPX3 constituting one pixel (e.g., the first pixel PXL1) may be electrically connected to different reference voltage lines, respectively.

In embodiments of the disclosure, the sub-pixels SPX1, SPX2, and SPX3 constituting one pixel (e.g., the first pixel PXL1) may be electrically connected to one scan line. For example, the first sub-pixel SPX1, the second sub-pixel SPX2, and the third sub-pixel SPX3 of the first pixel PXL1 (or the second pixel PXL2) may be electrically connected to an i-th scan line SLi (i is an integer from 1 to m). For example, the first sub-pixel SPX1, the second sub-pixel SPX2, and the third sub-pixel SPX3 of the third pixel PXL3 (or the fourth pixel PXL4) may be electrically connected to an i+1-th scan line SL(i+1).

Referring to FIG. 2, the first pixel PXL1 located at the upper left corner and the second pixel PXL2 located at the upper right corner are electrically connected to the same scan line SLi. The first pixel PXL1 and the second pixel PXL2 are located in the same pixel row. Similarly, the third pixel PXL3 located at the lower left corner and the fourth pixel PXL4 located at the lower right corner are electrically connected to the same scan line SL(i+1). The third pixel PXL3 and the fourth pixel PXL4 are located in the same pixel row.

Referring to FIG. 2, the first pixel PXL1 located at the upper left corner and the third pixel PXL3 located at the lower left corner are electrically connected to the same data lines DL3*k*-2, DL3*k*-1, and DL3*k*. The first pixel PXL1 and the second pixel PXL3 are located in the same pixel column. Similarly, the second pixel PXL2 located at the upper right corner and the fourth pixel PXL4 located at the lower right corner are electrically connected to the same data lines DL3(*k*+1)−2, DL3(*k*+1)−1, and DL3*k*. The second pixel PXL2 and the fourth pixel PXL4 are located in the same pixel column.

In embodiments of the disclosure, two or more pixel rows and two or more pixel columns may be located in the display area AA.

Figure 3:
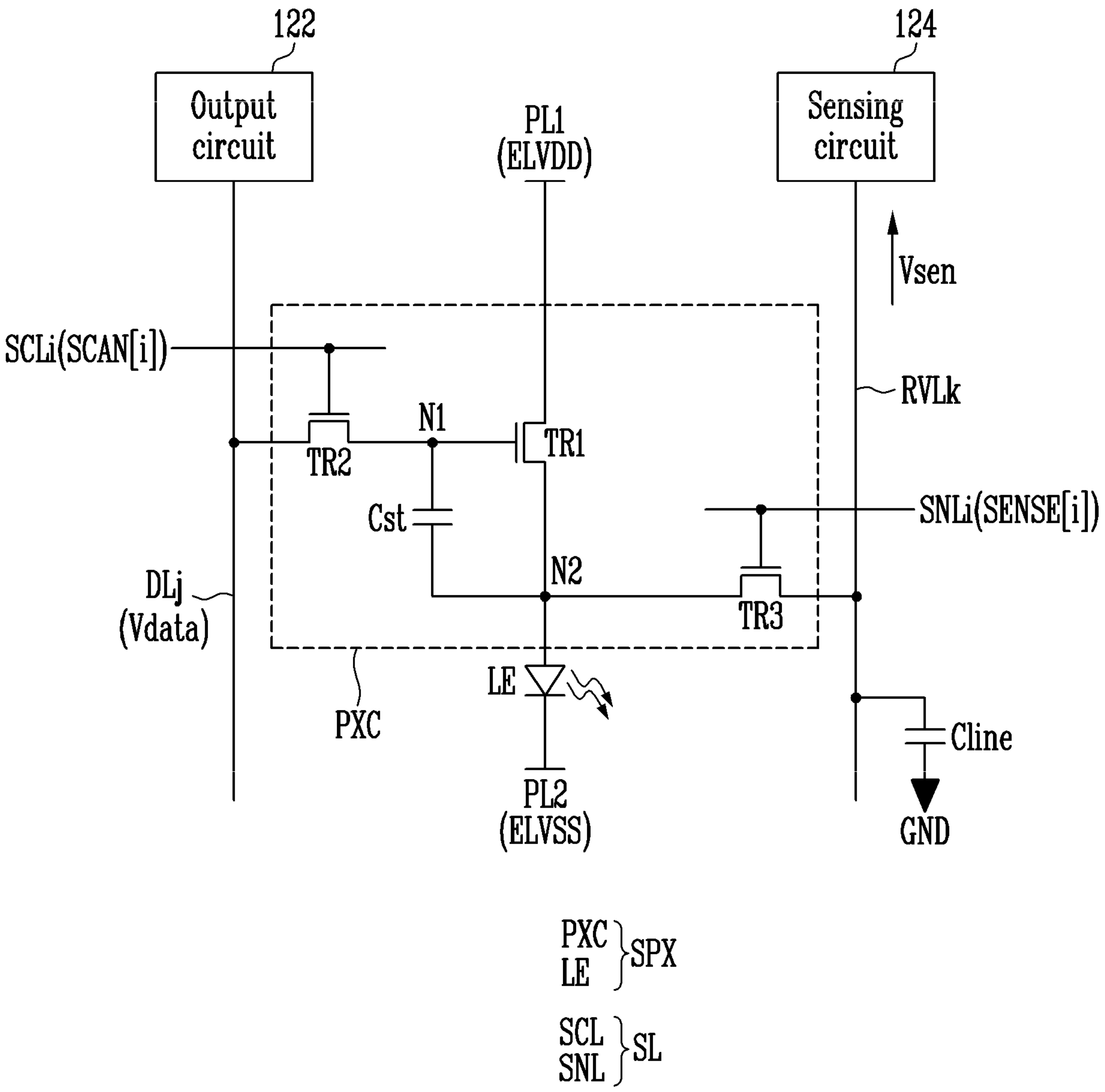
FIG. 3 is a schematic view of an example of a sub-pixel in accordance with embodiments of the disclosure.

FIG. 3 is a schematic view of an example of a sub-pixel SPX in accordance with embodiments of the disclosure.

The sub-pixel SPX in accordance with embodiments of the disclosure may include a light emitting element LE and a pixel driving circuit PXC configured to supply driving current to the light emitting element LE. The pixel driving circuit PXC may include one or more transistors and one or more capacitors.

For example, referring to FIG. 3, the pixel driving circuit PXC may include a light emitting element LE, first to third pixel transistors TR1, TR2, and TR3 (hereinafter TR1 to TR3), and a storage capacitor Cst.

The light emitting element LE may include a first electrode (either an anode electrode or a cathode electrode), a second electrode (a remaining one of the anode electrode and the cathode electrode), and an emission layer. The light emitting element LE may include an organic light emitting diode including an organic emission layer. The light emitting element LE may include an inorganic light emitting diode including an inorganic emission layer.

Referring to FIG. 3, the first electrode (e.g., the anode electrode) of the light emitting element LE may be electrically connected to a second node N2. The second electrode (e.g., the cathode electrode) of the light emitting element LE may be electrically connected to a second power line PL2.

A second common voltage ELVSS may be applied to the second power line PL2. The second common voltage ELVSS may be, for example, a low potential common voltage or a ground voltage.

A first pixel transistor TR1 may be connected (e.g., electrically connected) between a first power line PL1 and the second node N2. The first pixel transistor TR1 may include a gate electrode, a first electrode (either a source electrode or a drain electrode), and a second electrode (a remaining one of the source electrode and the drain electrode). The gate electrode of the first pixel transistor TR1 may be electrically connected to the second pixel transistor TR2 at a first node N1. The first electrode (e.g., the drain electrode) of the first pixel transistor TR1 may be electrically connected to the first power line PL1. A first power supply voltage ELVDD may be applied to the first electrode of the first pixel transistor TR1. The first power supply voltage ELVDD may be, for example, a high potential power supply voltage. The first electrode (e.g., the source electrode) of the first pixel transistor TR1 may be electrically connected to the light emitting element LE at the second node N2. The first pixel transistor TR1 may receive a data voltage Vdata through the second pixel transistor TR2. A current (e.g., a drain current) corresponding to the inputted data voltage Vdata may flow through the first pixel transistor TR1.

The second pixel transistor TR2 may be configured to switch electrical connection between the data line DLj and the first node N1. An operation timing of the second pixel transistor TR2 may be controlled by a scan signal SCAN[i]. The second pixel transistor TR2 may be turned on in response to the scan signal SCAN[i] having a turn-on level, and the data voltage Vdata (or a voltage corresponding to the data voltage Vdata) may be applied to the first node N1.

The third pixel transistor TR3 may be configured to switch electrical connection between the second node N2 and the reference voltage line RVLk. An operation timing of the third pixel transistor TR3 may be controlled by a sense signal SENSE[i]. The third pixel transistor TR3 may be turned on in response to the sense signal SENSE[i] having a turn-on level. In case that the third pixel transistor TR3 is turned on, the voltage of the second node N2 may be applied to the reference voltage line RVLk. The voltage applied to the reference voltage line RVLk may be stored in a line capacitor Cline.

Referring to FIG. 3, all the first to third pixel transistors TR1 to TR3 are illustrated as N-type transistors. The turn-on level voltages of the first to third pixel transistors TR1 to TR3 may each be a high logic level voltage, and the turn-off level voltage of the first to third pixel transistors TR1 to TR3 may each be a low logic level voltage. In accordance with embodiments, at least one of the first to third pixel transistors TR1 to TR3 may be a P-type transistor. The turn-on level voltage of the P-type transistor may be a low logic level voltage, and the turn-off level voltage of the P-type transistor may be a high logic level voltage.

At least one of the first to third pixel transistors TR1 to TR3 may include an amorphous silicon (a-Si) semiconductor. At least one of the first to third pixel transistors TR1 to TR3 may include a polycrystalline silicon (poly-Si) semiconductor. At least one of the first to third pixel transistors TR1 to TR3 may include an oxide semiconductor.

The storage capacitor Cst may be configured to maintain the voltage difference between the first node N1 and the second node N2. The storage capacitor Cst may include an electrode electrically connected to the first node N1 and another electrode electrically connected to the second node N2. The storage capacitor Cst may be formed as a physical capacitor element rather than a parasitic capacitor.

The scan signal SCAN[i] may be applied to the scan line SCLi (or the first scan line SCLi). The sense signal SENSE[i] may be applied to the sensing line SNL[i] (or the second scan line SNLi). The scan signal SCAN[i] and the sense signal SENSE[i] may be different signals. The scan line SCLi and the sensing line SNLi may be different lines. Referring to FIG. 1 together, the scan line SLi may include the scan line SCLi and the sensing line SNLi.

The output circuit 122 may output the data voltage Vdata to the data line DLj. The sensing circuit 124 may receive an analog sensing voltage Vsen applied to the reference voltage line RVLk. The analog sensing voltage may be a voltage that reflects a characteristic value of the first pixel transistor TR1 (e.g., a threshold voltage of the first pixel transistor TR1).

Figure 4:
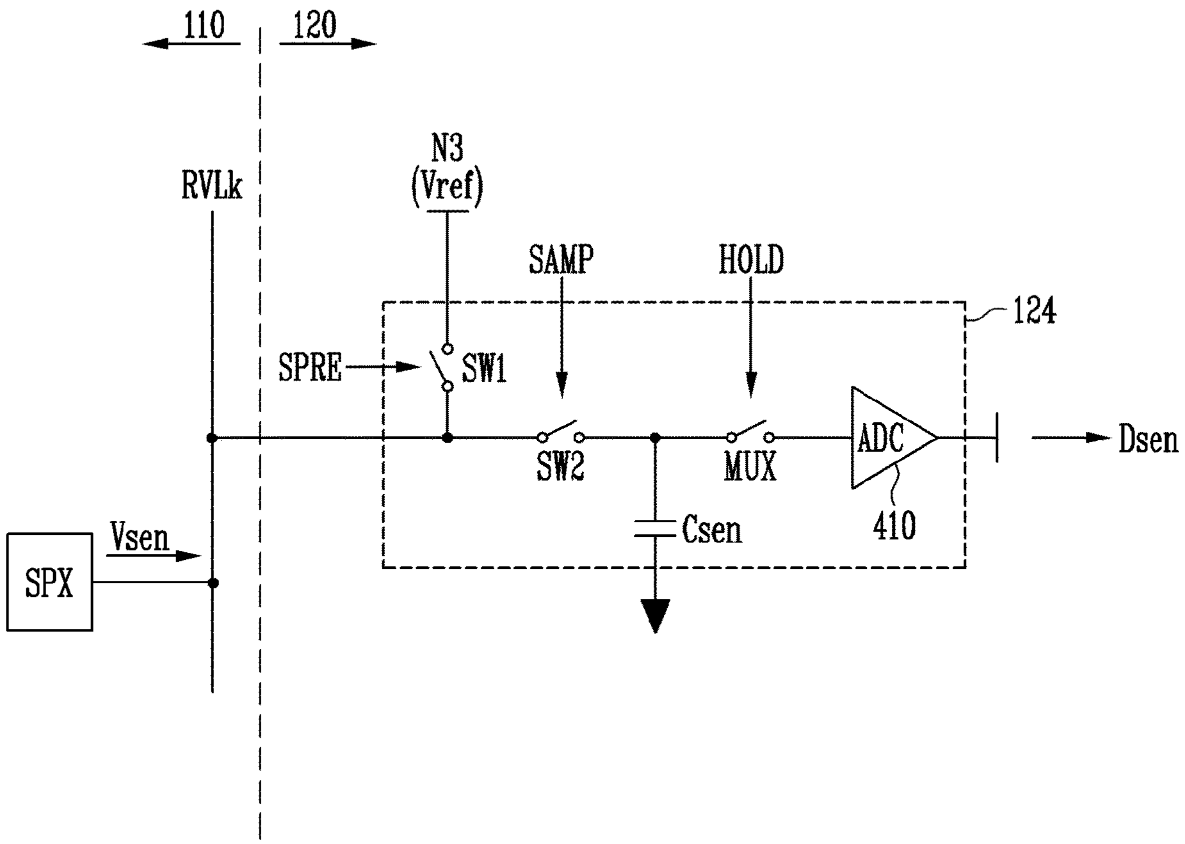
FIG. 4 is a schematic diagram illustrating a sensing circuit in accordance with embodiments of the disclosure.

FIG. 4 is a schematic diagram illustrating the sensing circuit 124 in accordance with embodiments of the disclosure.

The sensing circuit 124 may be included in the data driving circuit 120. The sensing circuit 124 may receive the analog sensing voltage Vsen from the reference voltage line RVLk. The sensing circuit 124 may convert the inputted analog sensing voltage Vsen into a digital value Dsen and output the digital value Dsen.

Referring to FIG. 4, the sensing circuit 124 may include a first switching element SW1, a second switching element SW2, a multiplexer MUX, a sensing capacitor Csen, an ADC 410, and the like.

The first switching element SW1 may be configured to switch electrical connection between the third node N3 and the reference voltage line RVLk. An operation timing of the first switching element SW1 may be controlled by a reference voltage switching signal SPRE. In case that the first switching element SW1 is turned on in response to the reference voltage switching signal SPRE having a turn-on level, the reference voltage Vref may be applied to the reference voltage line RVLk. The first switching element SW1 may include, for example, a transistor.

The second switching element SW2 may be configured to switch electrical connection between the reference voltage line RVLk and the sensing capacitor Csen. An operation timing of the second switching element SW2 may be controlled by a sampling control signal SAMP. In case that the second switching element SW2 is turned on by the sampling control signal SAMP having a turn-on level, the analog sensing voltage Vsen may be applied to the sensing capacitor Csen. The second switching element SW2 may include, for example, a transistor.

The sensing capacitor Csen may include an electrode connected (e.g., electrically connected) to the second switching element SW2 and another electrode to which a constant voltage (or ground) is applied. A voltage corresponding to the analog sensing voltage Vsen may be stored in an electrode of the sensing capacitor Csen.

The multiplexer MUX may be configured to switch electrical connection between the sensing capacitor Csen and the Analog-to-Digital Converter (ADC) 410. The multiplexer MUX may include two or more input terminals. The input terminal of the multiplexer MUX may be connected (e.g., electrically connected) to an electrode of the sensing capacitor Csen. An operation timing of the multiplexer MUX may be controlled by a hold control signal HOLD. In case that the multiplexer MUX is turned on by the hold control signal HOLD having a turn-on level, the voltage (e.g., the analog sensing voltage Vsen) stored in the sensing capacitor Csen may be inputted to the ADC 410.

The ADC 410 may be configured to convert an analog voltage into a digital voltage and output the digital voltage. The ADC 410 may receive an analog voltage (e.g., the analog sensing voltage Vsen) and output a digital value Dsen corresponding to the inputted analog voltage.

Accordingly, in embodiments of the disclosure, the analog sensing voltage Vsen sensed at the sub-pixel SPX may be converted into the digital value Dsen corresponding thereto, and the digital value Dsen may be outputted.

Figure 5A:
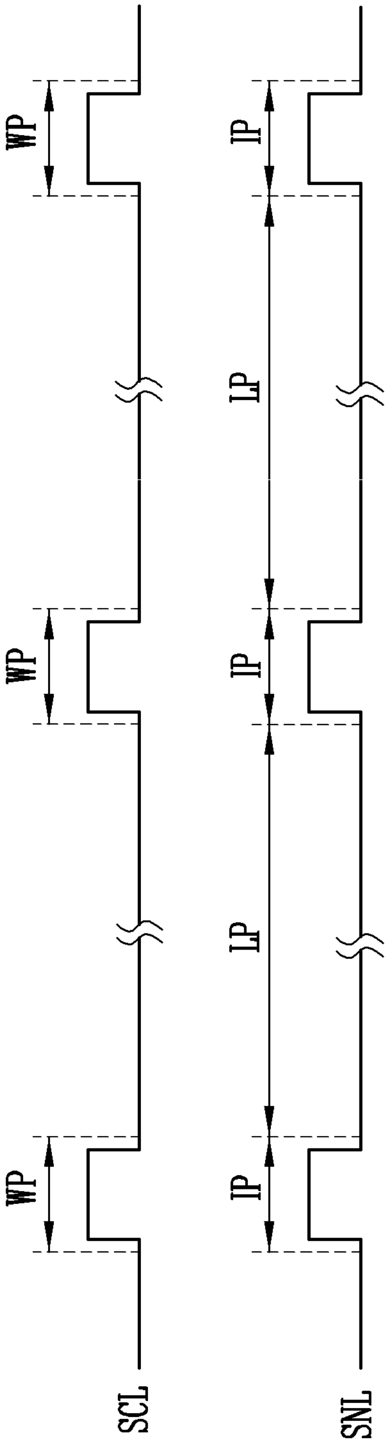
FIGS. 5A, 5B, and 5C are schematic views of examples of driving methods by which the display device of FIG. 1 displays images at different frame rates.
Figure 5B:
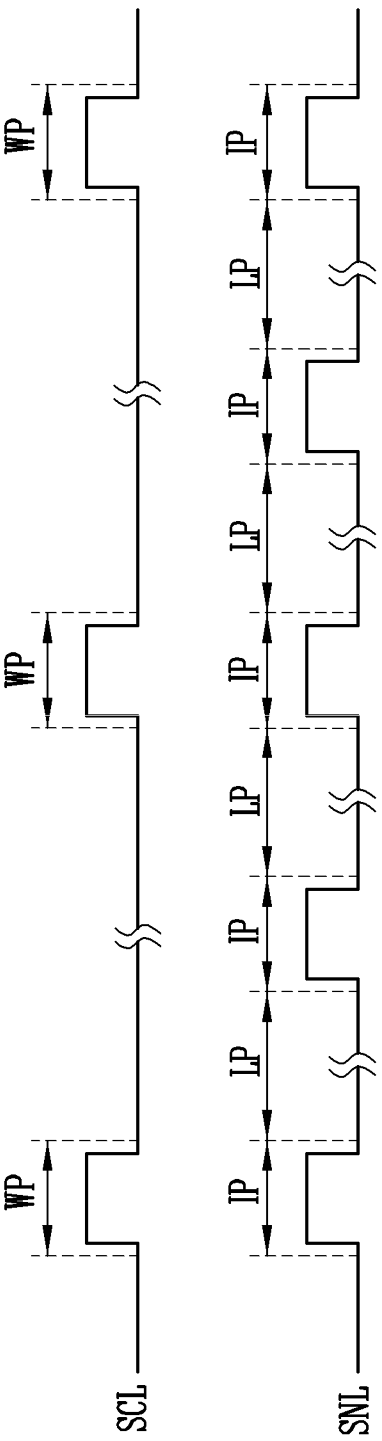
Figure 5C:
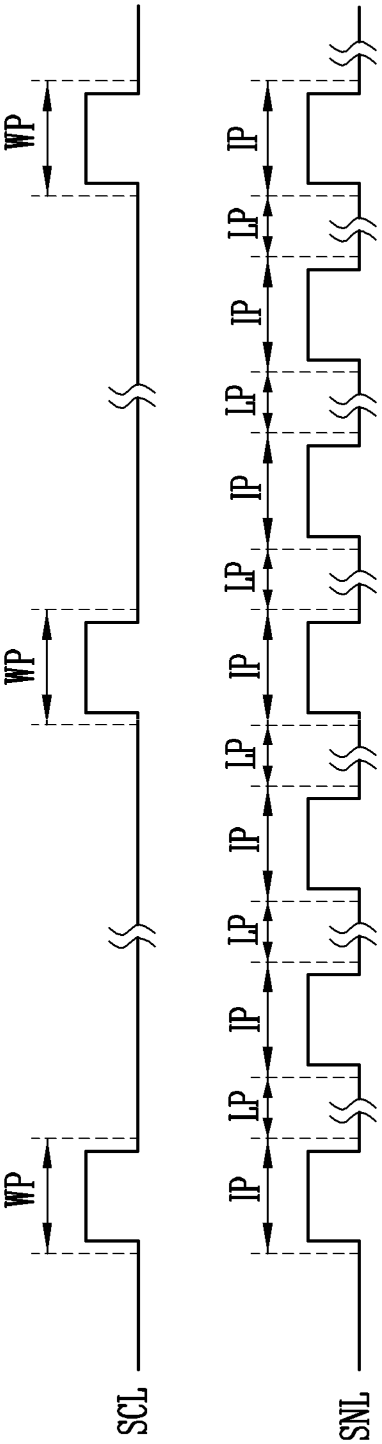

FIGS. 5A, 5B, and 5C are schematic views of examples of driving methods by which the display device of FIG. 1 displays images at different frame rates.

Referring to FIG. 5A, a period during which a turn-on level voltage is applied to the scan line SCL may correspond to a data write period WP (or referred also to as a write period). If a frame starts (or a frame transition is made), a data voltage Vdata (refer to FIG. 3) may be inputted (or written, or applied) to the sub-pixel. In the data write period WP, a data voltage for displaying an image of the corresponding frame may be inputted to the sub-pixel. The sub-pixel may store the inputted data voltage (e.g., in the storage capacitor), and emit light during at least a partial period of the corresponding frame, based on the stored data voltage.

A period during which a turn-on level voltage is applied to the sense line SNL may correspond to an initialization period IP. If a frame starts, a reference voltage Vref (refer to FIG. 3) may be inputted to the sub-pixel. In the initialization period IP, the reference voltage is inputted to the sub-pixel, and the light emitting element LE (refer to FIG. 3) of the sub-pixel may not emit light.

A period during which a turn-off level voltage is applied to the sense line SNL may include an emission period LP. The sub-pixel may emit light in the emission period LP, based on the data voltage inputted in the data write period WP.

Referring to FIG. 3, the data write period WP and the initialization period IP may at least partially overlap each other. For example, the data write period WP and the initialization period IP may match each other. However, embodiments of the disclosure are not limited thereto. For example, the data write period WP and the initialization period IP may not overlap each other.

In accordance with embodiments, if a refresh rate (a frequency at which a frame transition is made, or a cycle at which a data voltage is inputted to the sub-pixel) is reduced, the proportion of the initialization period IP in a single frame period may be reduced. In other words, in a single frame period, a non-emission period in which the light emitting element does not emit light may be relatively reduced. A luminance increase may be visible to the user as a refresh rate decreases, or a luminance reduction may be visible to the user as a refresh rate increase. The foregoing phenomenon may be visible to the user as a flicker phenomenon.

Referring to FIGS. 5B and 5C, in order to mitigate the flicker phenomenon, in embodiments of the disclosure, a turn-on level voltage (or a sense signal having a turn-on level) may be applied to the sense line SNL during at least a partial period during which a turn-off level voltage (or a scan signal having a turn-off level) may be applied to the scan line SCL. Accordingly, the light emitting element of the sub-pixel may flicker in a single frame period. If the refresh rate is reduced, the display device 100 (refer to FIG. 1) in accordance with embodiments of the disclosure may be controlled so that the driving current does not flow through the light emitting element (e.g., may be controlled so that the driving current does not flow through the light emitting element at a preset cycle). Accordingly, the phenomenon in which a rapid luminance change resulting from a change in refresh rate is visible to the user may be mitigated. Consequently, the visibility may be improved.

Referring to FIG. 5B, in a single frame period, one initialization period IP may progress in a period which does not overlap the data write period WP. Referring to FIG. 5C, in a single frame period, two or more initialization periods IP may progress in a period which does not overlap the data write period WP.

Referring to FIGS. 5A to 5C, the refresh rate illustrated in FIG. 5A may be, for example, 240 Hz. The refresh rate illustrated in FIG. 5B may range, for example, from 80 Hz to 120 Hz. The refresh rate illustrated in FIG. 5C may range, for example, from 60 Hz to 80 Hz. Embodiments of the disclosure are not limited to the foregoing description, and the presented refresh rate is only an example.

Figure 6:
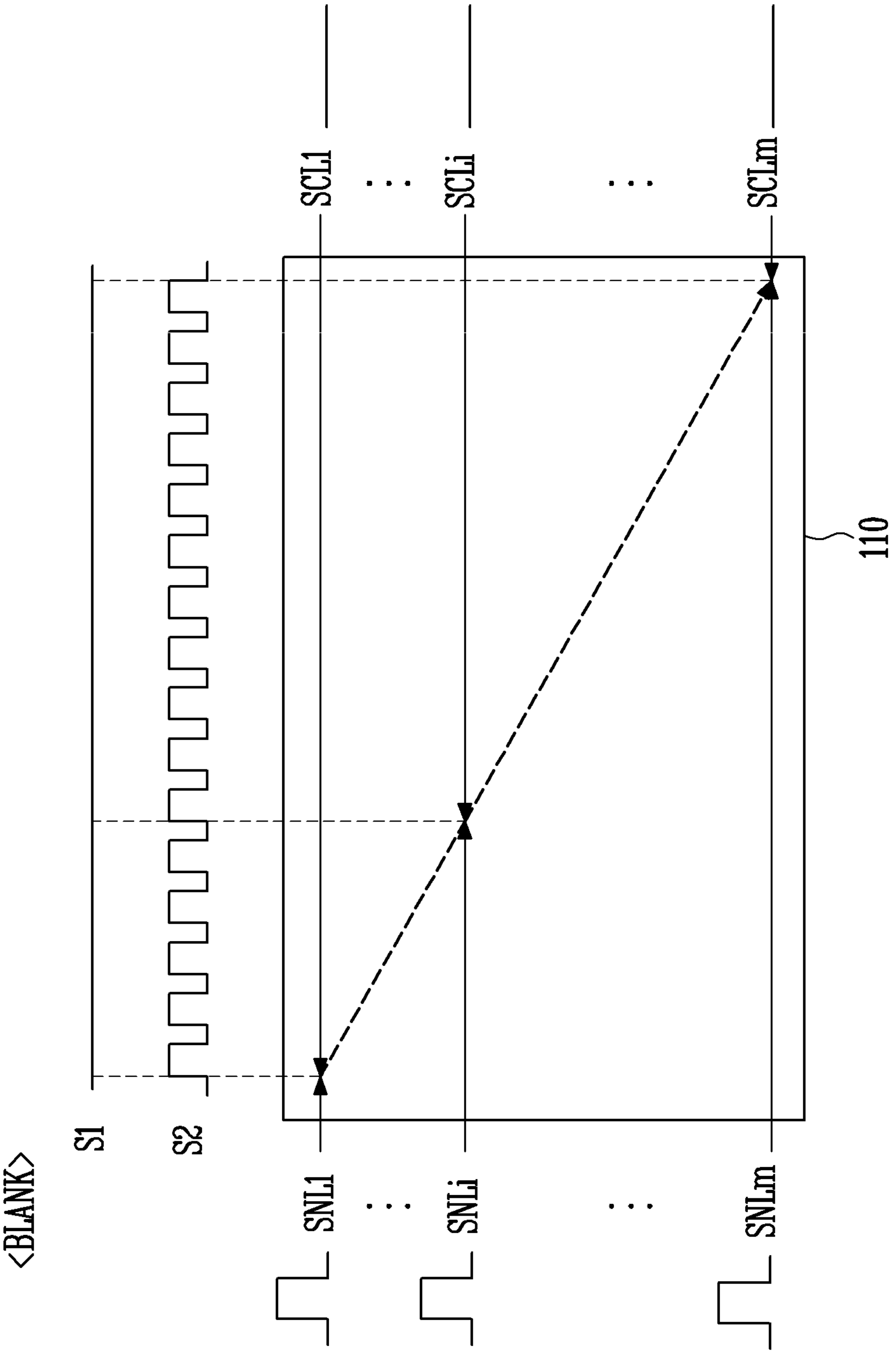
FIG. 6 is a schematic diagram briefly illustrating signals inputted to scan lines and sense lines during at least a portion of a blank period in the display device of FIG. 1.

FIG. 6 is a schematic diagram briefly illustrating signals inputted to scan lines and sense lines during at least a portion of a blank period BLANK in the display device of FIG. 1.

Referring to FIG. 6, there are illustrated a first preceding signal S1 for generating scan signals to be applied to the scan lines SCL1 to SCLm and a second preceding signal S2 for generating sense signals to be applied to the sense lines SNL1 to SNLm.

For example, the first preceding signal S1 and the second preceding signal S2 may be signals generated inside the timing controller 140 (refer to FIG. 1) described above.

The timing controller may generate and output a scan driving circuit control signal SCS (refer to FIG. 1), based on the first preceding signal S1. The scan driving circuit 130 (refer to FIG. 1) may output (e.g., sequentially output) the scan signal SCAN (refer to FIG. 3) to the scan lines SCL1 to SCLm, based on the inputted scan driving circuit control signal SCS. The timing at which the scan signal SCAN is applied to the scan lines SCL1 to SCLm may be synchronized with the first preceding signal S1 (e.g., the timing at which the first preceding signal S1 toggles).

The timing controller may generate and output the scan driving circuit control signal SCS (refer to FIG. 1), based on the second preceding signal S2. The scan driving circuit 130 (refer to FIG. 1) may output (e.g., sequentially output) the sense signal SENSE (refer to FIG. 3) to the sense lines SNL1 to SNLm, based on the inputted scan driving circuit control signal SCS. The timing at which the sense signal SENSE is applied to the sense lines SNL1 to SNLm may be synchronized with the second preceding signal S2 (e.g., the timing at which the second preceding signal S2 toggles).

Referring to FIG. 6, there are illustrated signals applied to the scan lines SCL1 to SCLm and the sense lines SNL1 to SNLm in at least a portion of a blank period BLANK.

Referring to FIG. 6, as time passes, scan signals may be sequentially applied to the scan lines SCL1 to SCLm and sense signals may be sequentially applied to the sense lines SNL1 to SNLm.

In at least a portion of the blank period BLANK, the first preceding signal S1 may have a constant logic level without toggling. A turn-off level voltage (e.g., a scan signal having a turn-off level) may be applied to the first scan lines SCL1 to SCLm.

In at least a portion of the blank period BLANK, the second preceding signal S2 may toggle. The second preceding signal S2 that toggles may have a high logic level or a low logic level. A turn-on level voltage (e.g., a sense signal having a turn-on level) may be sequentially applied to the sense lines SNL1 to SNLm in synchronization with the timing at which the second preceding signal S2 toggles.

The timing controller in accordance with embodiments of the disclosure may generate the first preceding signal S1 that does not toggle and the second preceding signal S2 that toggles, in at least a portion of the blank period BLANK. Accordingly, the turn-off level voltage may be applied to the scan lines SCL1 to SCLm in the blank period BLANK, and the turn-on level voltage may be sequentially applied to the sense lines SNL1 to SNLm.

Figure 7:
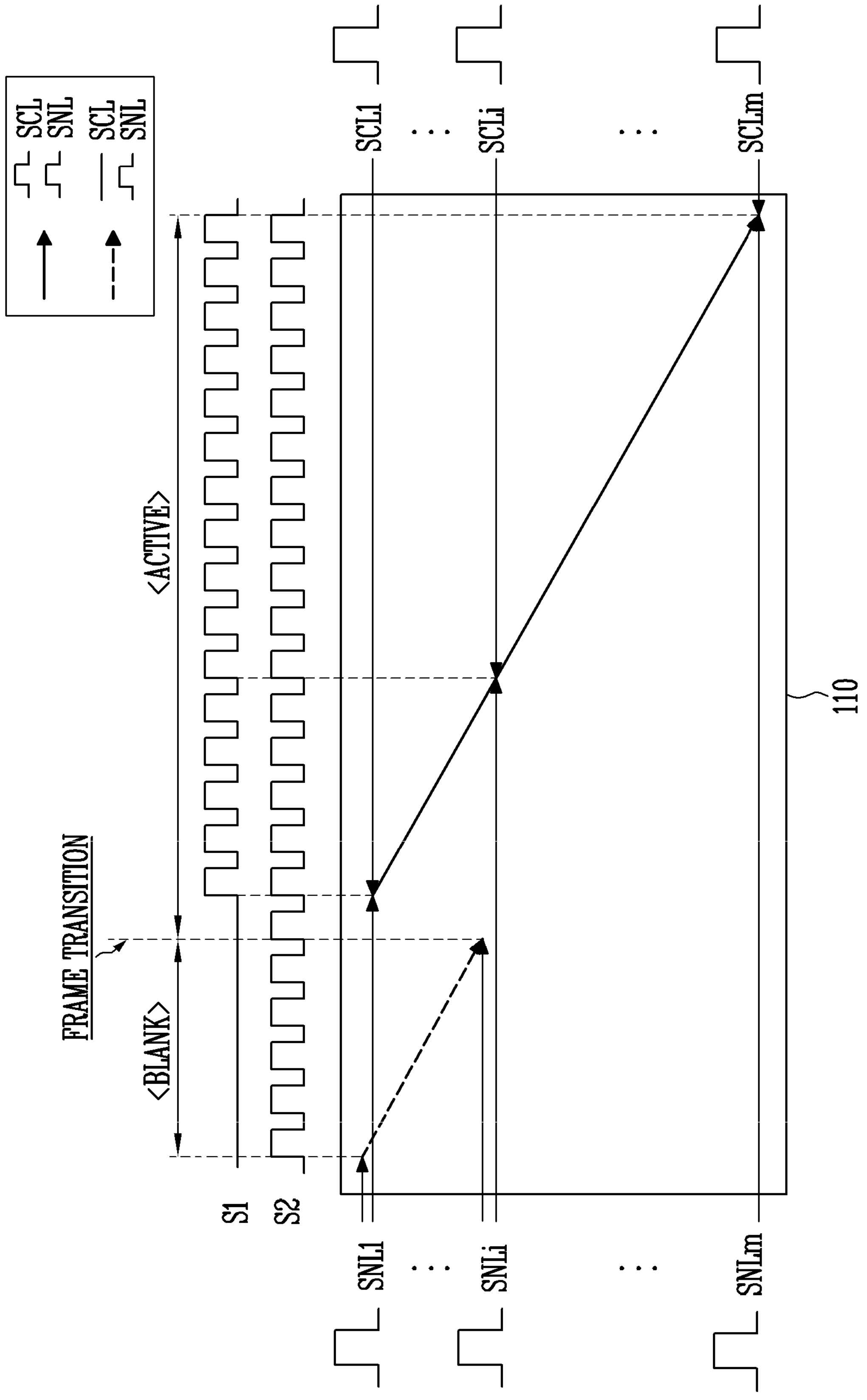
FIG. 7 is a schematic view of an embodiment in which a frame transition is made in the display device of FIG. 1.

FIG. 7 is a schematic view of an embodiment in which a frame transition is made in the display device of FIG. 1.

In FIG. 7, a dashed line indicates a blank period BLANK of a preceding frame. A solid line indicates an active period ACTIVE of a subsequent frame.

In the blank period BLANK, a turn-on level voltage may be applied to an i-th sense line SNLi, and immediately a frame transition may be made. After the turn-on level voltage is inputted to the i-th sense line SNLi, the corresponding frame period may be terminated, and a subsequent frame period may start.

If the active period ACTIVE in which a data voltage for displaying an image is applied starts, scan signals having a turn-on level may be inputted (e.g., sequentially inputted) to the scan lines SCL1 to SCLm and sense signals having a turn-on level may be inputted (e.g., sequentially inputted) to the sense lines SNL1 to SNLm.

An image of the preceding frame may be displayed on i+1-th to m-th sense lines SNL(i+1) (not shown) to SNLm until a sense signal having a turn-on level is inputted in an active period ACTIVE of a subsequent frame. Therefore, the image may be displayed on one side (e.g., i+1-th to m-th pixel rows) of the display panel 110 (refer to FIG. 1) for a relatively long period of time. Hence, there may be a difference in luminance between a side of the display panel 110 and another side thereof (e.g., first to i-th pixel rows), and the luminance difference may be visible to the user.

Figure 8:
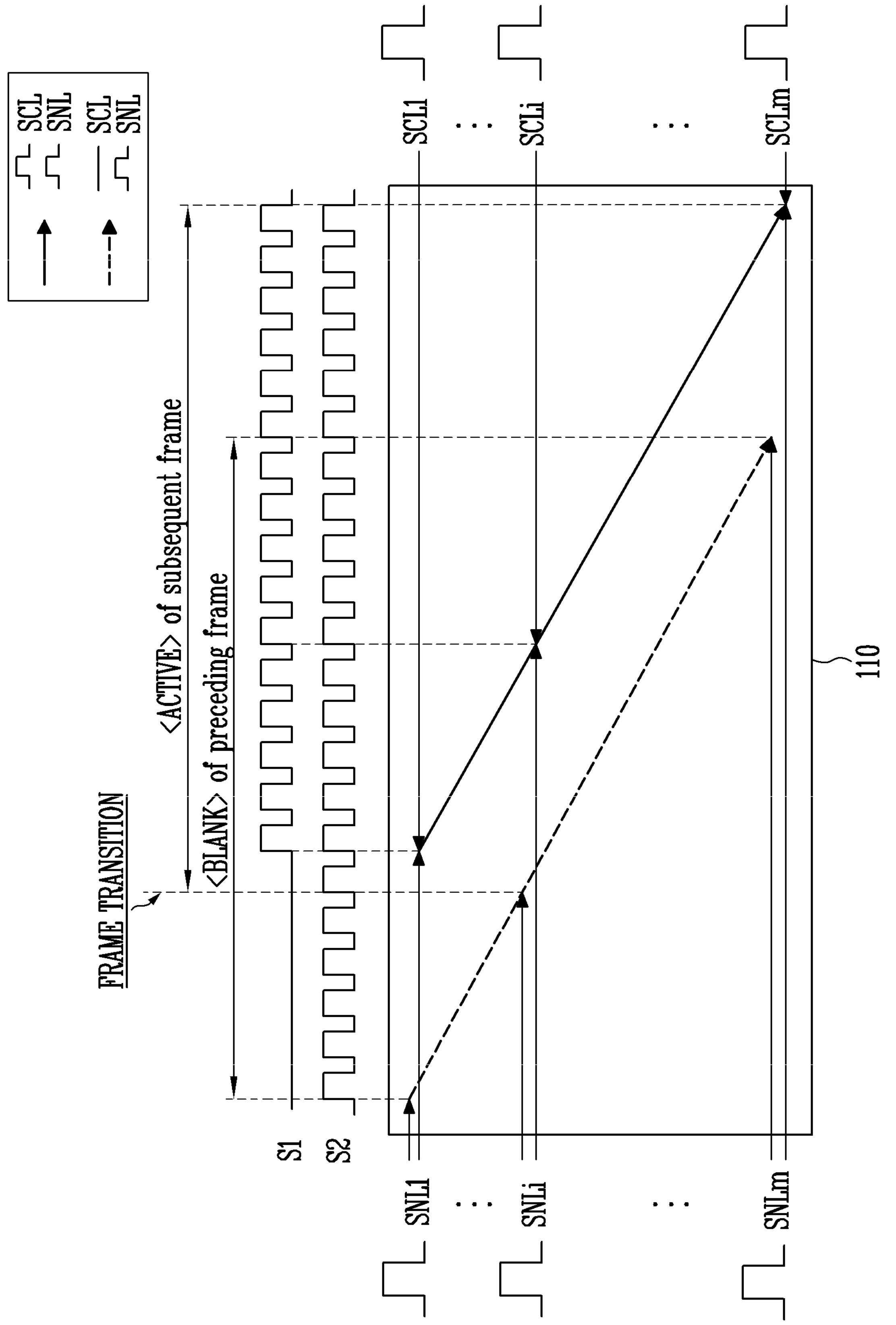
FIG. 8 is a schematic view of another embodiment in which a frame transition is made in the display device of FIG. 1.

FIG. 8 is a schematic view of another embodiment in which a frame transition is made in the display device 100 of FIG. 1.

In FIG. 8, a dashed line indicates a blank period BLANK of a preceding frame. A solid line indicates an active period ACTIVE of a subsequent frame.

Compared to FIG. 7, in embodiments of the disclosure, even though a frame transition is made immediately after a turn-on level voltage is applied to the i-th sense line SNLi, a turn-on level voltage may be sequentially inputted to the i+1-th to m-th sense lines SNL(i+1) to SNLm.

In a period in which the turn-on level voltage is sequentially inputted to the i+1-th to m-th sense lines SNL(i+1) to SNLm, a turn-on level voltage may be sequentially inputted to the sense lines SNL in a sequence from the first sense line SNL1. In a period in which the turn-on level voltage is sequentially inputted to the i+1-th to m-th sense lines SNL(i+1) to SNLm, a turn-on level voltage may be sequentially inputted to the scan lines SCL in a sequence from the first scan line SCL1. The foregoing may be understood that the blank period BLANK of the preceding frame and the active period ACTIVE of the subsequent frame overlap each other.

Therefore, a luminance difference occurring between a side of the display panel 110 (refer to FIG. 1) and another side thereof may be mitigated (e.g., removed).

Figure 9:
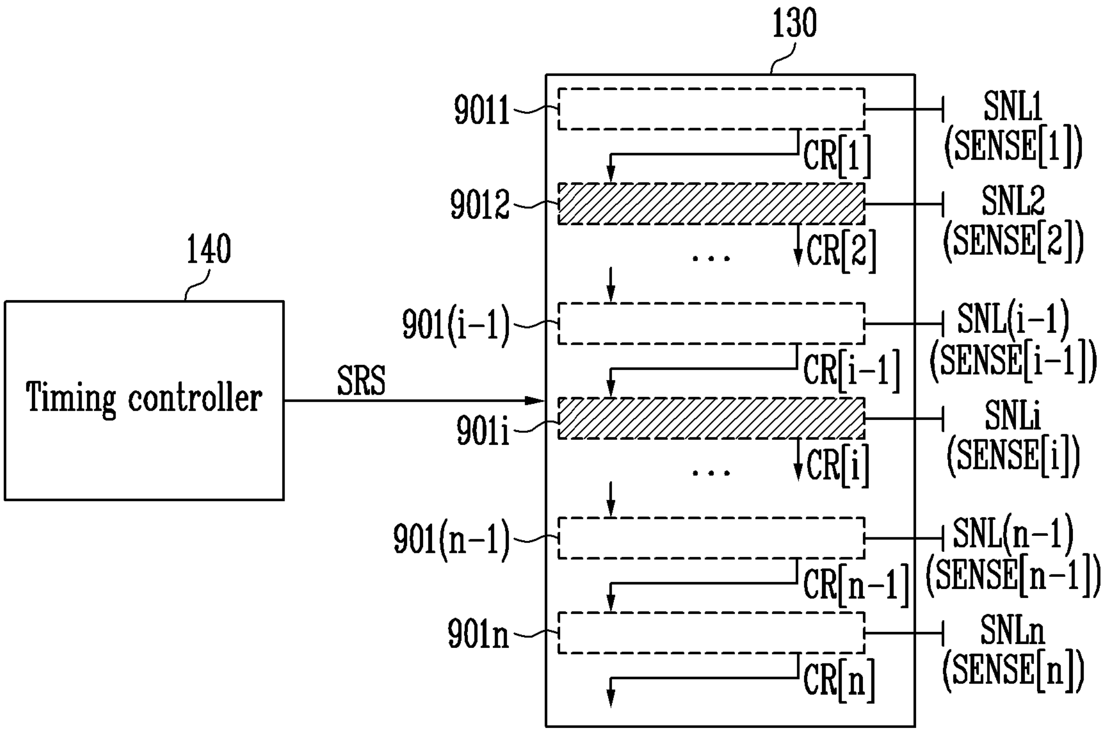
FIG. 9 is a schematic view of an embodiment in which a stage circuit is selected by a first sampling signal.

FIG. 9 is a schematic view of an embodiment in which a stage circuit 901 is selected by a first sampling signal SRS.

Referring to FIG. 9, a scan driving circuit 130 may include multiple stage circuits 9011, 9012, . . . , 901(*i*−1), 901*i*, . . . , 901(*n*−1), 901*n* (hereinafter 9011 to 901*n*). Each of the stage circuits 9011 to 901*n* may be connected to a corresponding sense line among multiple sense lines SNL1, SNL2, . . . , SNL(i−1), SNLi, . . . , SNL(n−1), and SNLn (hereinafter SNL1 to SNLn).

Each of the stage circuits 9011 to 901*n* may output a carry signal CR. The carry signal CR may be used to drive the stage circuits 9011 to 901*n* in a preset order (e.g., sequentially). Referring to FIG. 9, at least one of the stage circuits 9011 to 901*n* may receive a carry signal (e.g., a turn-on level carry signal) from a preceding stage circuit, and output sense signals SENSE[1], SENSE[2], . . . , SENSE[i−1], SENSE[i], . . . , SENSE[n−1], and SENSE[n] (hereinafter SENSE[1] to SENSE[n]) based on the inputted carry signal. Accordingly, the scan driving circuit 130 may output the sense signals SENSE[1] to SENSE[n] in an order (e.g., a preset order (e.g., sequentially)).

The first sampling signal SRS may be outputted from the timing controller 140 (refer to FIG. 1) in at least a portion of an active period. The scan driving circuit 130 may receive the first sampling signal SRS. At least one of the stage circuits 9011 to 901*n* may be selected by the first sampling signal SRS. One stage circuit selected among the stage circuits 9011 to 901*n* may be determined according to the level of the carry signal CR inputted to the corresponding stage circuit.

On the other hand, in the scan driving circuit 130 in accordance with embodiments of the disclosure, two or more stage circuits may output the sense signal SENSE having a turn-on level simultaneously (or at substantially the same timing).

For example, a carry signal CR[1] having a turn-on level may be inputted to the second stage circuit 9012, and a carry signal CR[i] having a turn-on level may be inputted to the i-th stage circuit 901*i*. Accordingly, the second stage circuit 9012 and the i-th stage circuit 901*i* may output sense signals SENSE[2] and SENSE[i] having a turn-on level simultaneously (or substantially simultaneously). Referring further to FIG. 8, the sense signal SENSE[2] outputted from the second stage circuit 9012 may be a signal outputted in the active period ACTIVE of the subsequent frame, and the sense signal SENSE[i] outputted from the i-th stage circuit 901*i* may be a signal outputted in the blank period BLANK of the preceding frame.

As described above, two or more stage circuits (e.g., the second stage circuit 9012 and the i-th stage circuit 901*i*) among the stage circuits 9011 to 901*n* may be selected by the first sampling signal SRS.

Figure 10:
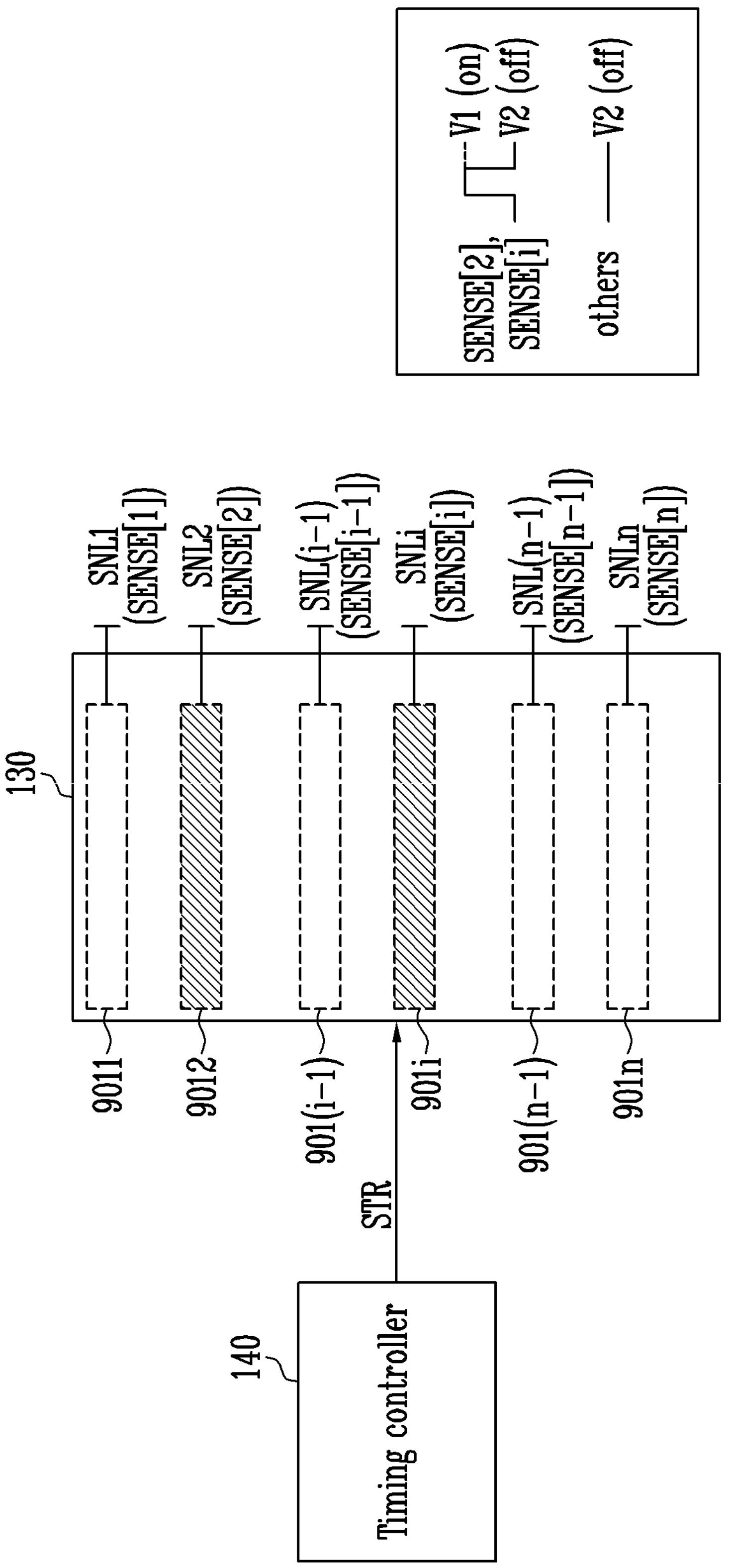
FIG. 10 is a schematic view of the case where the stage circuit selected in FIG. 9 outputs a sense signal in response to a second sampling signal.

FIG. 10 is a schematic view of the case where the stage circuit selected in FIG. 9 outputs a sense signal SENSE in response to a second sampling signal STR.

The second sampling signal STR may be outputted from the timing controller 140 (refer to FIG. 1) in at least a portion of a blank period BLANK. The scan driving circuit 130 may receive the second sampling signal STR. At least one stage circuit (e.g., the second stage circuit 9012 and the i-th stage circuit 901*i*) selected in advance among the stage circuits 9011 to 901*n* may output sense signal SENSE[2] and SENSE[i] having a turn-on level V1 by the second sampling signal STR. Stage circuits (e.g., the first stage circuit 9011, the third to i−1-th stage circuits 9013 (not shown) to 901(*i*−1), and the i+1-th to n-th stage circuits 901(*i*+1) (not shown) to 901*n*) that are not selected among the stage circuits 9011 to 901*n* may output a sense signal SENSE having a turn-off level V2 by the second sampling signal STR.

The turn-on level V1 may be, for example, a high level voltage. The turn-off level V2 may be, for example, a low level voltage.

On the other hand, referring further to FIG. 3, if the sense signals SENSE[2] and SENSE[i] having a turn-on level are outputted by the second sampling signal STR, the reference voltage line RVLk may be electrically connected to two or more sub-pixels SPX located in different pixel rows (e.g., a second pixel row and an i-th pixel row). Accordingly, the analog sensing voltage Vsen may reflect a change in characteristic value (e.g., a change in threshold voltage) of the first pixel transistor TR1 of each of the two or more sub-pixels SPX. Due to this, the accuracy may be lowered compared to compensation for a change in the characteristic value of the first pixel transistor TR1 for each pixel row.

Therefore, the technical objectives of the embodiments of the disclosure may be to provide the scan driving circuit 130, in which one of the stage circuits 9011 to 901*n* is selected by the first sampling signal SRS (refer to FIG. 9) and one selected (e.g., pre-selected) stage circuit outputs the sense signal SENSE having a turn-on level in response to the second sampling signal STR, and the display device 100 (refer to FIG. 1) including the same.

Figure 11:
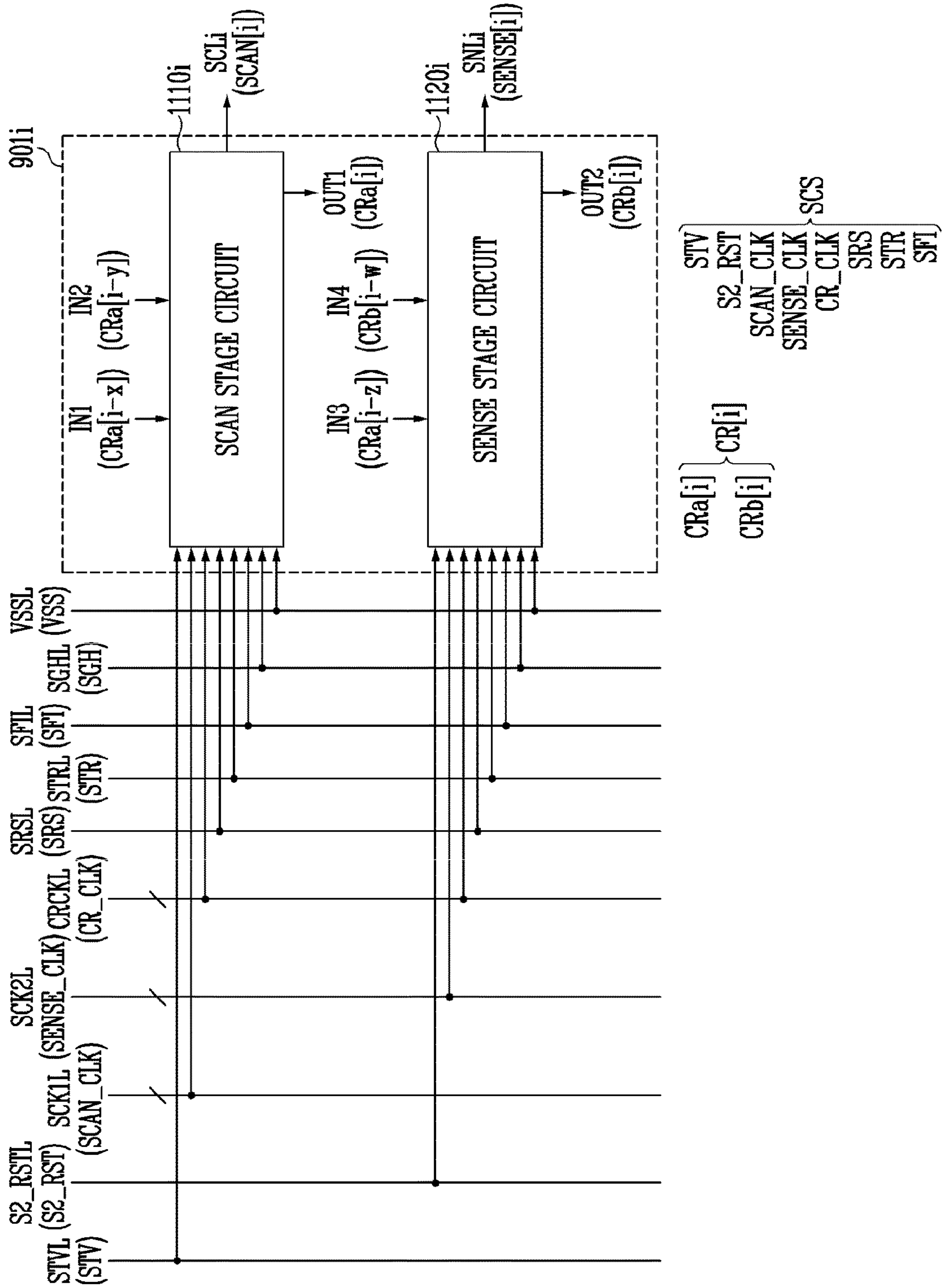
FIG. 11 is a schematic diagram illustrating a stage circuit and various signals and voltages inputted to the stage circuit.

FIG. 11 is a schematic diagram illustrating the stage circuit 901*i* and various signals and voltages inputted to the stage circuit 901*i*

Referring to FIG. 11, the i-th stage circuit 901*i* among the stage circuits is illustrated as an example. The stage circuit 901*i* may include a scan stage circuit 1110*i* and a sense stage circuit 1120*i*.

The stage circuit 901*i* may be connected (e.g., electrically connected) to a first start signal line STVL, a second start signal line S2_RSTL, a scan clock signal line SCK1L, a sense clock signal line SCK2L, a carry clock signal line CRCKL, a first sampling signal line SRSL, a second sampling signal line STRL, an inverter selection signal line SFIL, a high level voltage line SGHL, and a low level voltage line VSSL.

A first start signal STV may be inputted to the first start signal line STVL. A second start signal S2_RST may be inputted to the second start signal line S2_RSTL. A scan clock signal SCAN_CLK may be inputted to the scan clock signal line SCK1L. A sense clock signal SENSE_CLK may be inputted to the sense clock signal line SCK2L. A carry clock signal CR_CLK may be inputted to the carry clock signal line CRCKL. A first sampling signal SRS may be inputted to the first sampling signal line SRSL. A second sampling signal STR may be inputted to the second sampling signal line STRL. An inverter selection signal SFI may be inputted to the inverter selection signal line SFIL. A high level voltage SGH may be inputted to the high level voltage line SGHL. A low level voltage VSS may be inputted to the low level voltage line VSSL. The lines (STVL, etc.) may be disposed in at least a portion of the non-display area NA (refer to FIG. 1) of the display panel 110 (refer to FIG. 1).

The scan driving circuit control signal SCS may include the first start signal STV, the second start signal S2_RST, the scan clock signal SCAN_CLK, the sense clock signal SENSE_CLK, the carry clock signal CR_CLK, the first sampling signal SRS, the second sampling signal STR, and the inverter selection signal SFI. The aforementioned signals may be outputted from the timing controller 140 (refer to FIG. 1) and inputted to the scan driving circuit 130 (refer to FIG. 1).

The scan stage circuit 1110*i* may be connected (e.g., electrically connected) to the first start signal line STVL, the scan clock signal line SCK1L, the carry clock signal line CRCKL, the first sampling signal line SRSL, the second sampling signal line STRL, the inverter selection signal line SFIL, the high level voltage line SGHL, and the low level voltage line VSSL.

The scan stage circuit 1110*i* may include a first output terminal OUT1 configured to output an i-th first carry signal CRa[i], a first input terminal IN1 configured to receive an i-x-th first carry signal CRa[i-x] (x is an integer other than 0), and a second input terminal IN2 configured to receive an i-y-th first carry signal CRa[i-y] (y is an integer other than 0).

The sense stage circuit 1120*i* may be connected (e.g., electrically connected) to the second start signal line S2_RSTL, the sense clock signal line SCK2L, the carry clock signal line CRCKL, the first sampling signal line SRSL, the second sampling signal line STRL, the inverter selection signal line SFIL, the high level voltage line SGHL, and the low level voltage line VSSL.

The sense stage circuit 1120*i* may include a second output terminal OUT2 configured to output an i-th second carry signal CRb[i], a third input terminal IN3 configured to receive an i-z-th first carry signal CRa[i-z] (z is an integer other than 0), and a fourth input terminal IN4 configured to receive an i-w-th second carry signal CRb[i-w] (w is an integer other than 0).

z may be equal to x, but embodiments of the disclosure are not limited thereto. w may be equal to y, but embodiments of the disclosure are not limited thereto.

The aforementioned i-th carry signal CR[i] may include the i-th first carry signal CRa[i] and the i-th second carry signal CRb[i].

The scan stage circuit 1110*i* may output the first carry signal CRa[i] and the scan signal SCAN[i] in response to the first carry signal CRa[i-y] inputted to the second input terminal IN2.

The scan stage circuit 1110*i* may be selected based on the first carry signal (e.g., the i-x-th first carry signal CRa[i-x]) inputted to the first input terminal IN1.

The sense stage circuit 1120*i* may output the second carry signal CRb[i] and the sense signal SENSE[i] in response to the second carry signal CRb[i-w] inputted to the fourth input terminal IN4.

The sense stage circuit 1120*i* may be selected based on the first carry signal (e.g., the i-z-th first carry signal CRa[i-z]) inputted to the third input terminal IN3. The selected sense stage circuit 1120*i* may output a sense signal SENSE[i] having a turn-on level in response to the second sampling signal STR.

Referring to FIG. 8 together, as the first carry signal CRa[i-z] is inputted to the third input terminal IN3 of the sense stage circuit 1120*i*, only one sense stage circuit 1120*i* may be selected even if the blank period of the preceding frame and the active period of the subsequent frame overlap each other.

Figure 12:
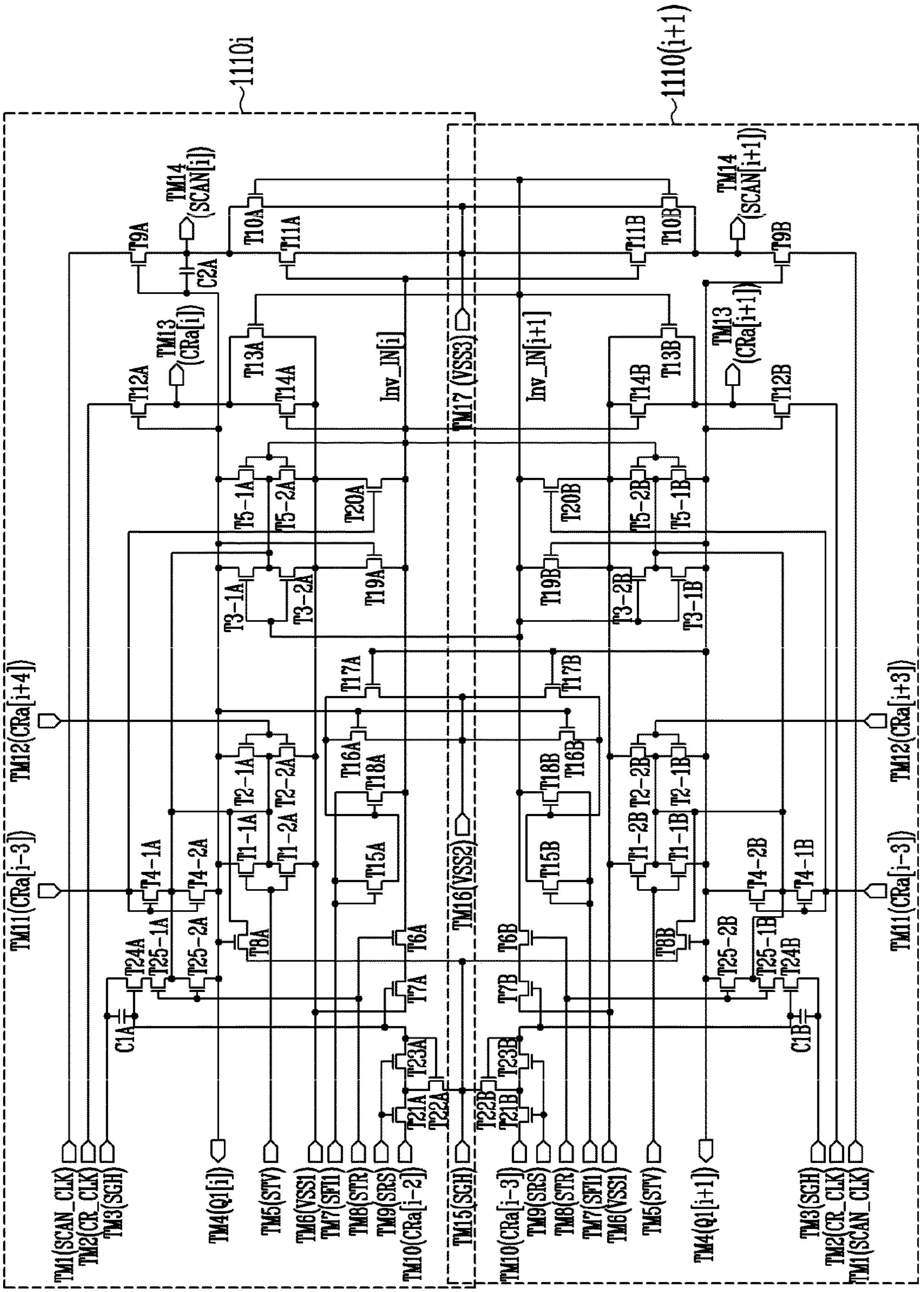
FIG. 12 is a schematic diagram of an equivalent circuit of a scan stage circuit in accordance with embodiments of the disclosure.

FIG. 12 is a schematic diagram of an equivalent circuit of the scan stage circuits 1110*i* and 1110(*i*+1) in accordance with embodiments of the disclosure.

In embodiments of the disclosure, the i-th scan stage circuit 1110*i* and the i+1-th scan stage circuit 1110(*i*+1) may share multiple nodes.

The i-th scan stage circuit 1110*i* may include one or more transistors and one or more capacitor elements. Referring to FIG. 12, the i-th scan stage circuit 1110*i* may include first to twenty-fifth transistors T1A to T25A and first and second capacitors C1A and C2A.

At least one of the first to twenty-fifth transistors T1A to T25A may include two sub-transistors connected in series to each other and may be configured to be controlled by a single signal (e.g., voltage). For example, the first transistor T1A may include two sub-transistors T1-1A and T1-2A connected in series to each other, and the two sub-transistors T1-1A and T1-2A may be controlled by the first start signal STV. FIG. 12 illustrates an embodiment in which the first to fifth transistors T1A to T5A and the twenty-fifth transistor T25A among the first to twenty-fifth transistors T1A to T25A each include two sub-transistors and the remaining transistors are each implemented as a single transistor. However, embodiments of the disclosure are not limited thereto. For example, at least one of the first to fifth transistors T1A to T5A and the twenty-fifth transistor T25A may each be implemented as a single transistor, and at least one of the remaining transistors may include two or more sub-transistors.

The i-th scan stage circuit 1110*i* and the i+1-th scan stage circuit 1110(*i*+1) may each include first to seventeenth terminals TM1 to TM17.

The first to seventeenth terminals TM1 to TM17 of the i-th scan stage circuit 1110*i* are described below.

A scan clock signal SCAN_CLK may be inputted to the first terminal TM1. A carry clock signal CR_CLK may be inputted to the second terminal TM2. A high level voltage SGH may be applied to the third terminal TM3. The fourth terminal TM4 may be connected (e.g., electrically connected) to a first Q node Q1. A first start signal STV may be inputted to the fifth terminal TM5. A first low level voltage VSS1 may be applied to the sixth terminal TM6. A first inverter selection signal SFI1 may be inputted to the seventh terminal TM7. A second sampling signal STR may be inputted to the eighth terminal TM8. A first sampling signal SRS may be inputted to the ninth terminal TM9. A first carry signal (e.g., an i−2-th first carry signal CRa[i−2]) may be inputted to the tenth terminal TM10. A first carry signal (e.g., an i−3-th first carry signal CRa[i−3]) may be inputted to the eleventh terminal TM11. A first carry signal (e.g., an i+4-th first carry signal CRa[i+4]) may be inputted to the twelfth terminal TM12. A first carry signal CRa[i] may be outputted to the thirteenth terminal TM13. A scan signal SCAN[i] may be outputted to the fourteenth terminal TM14. A high level voltage SGH may be applied to the fifteenth terminal TM15. A second low level voltage VSS2 may be applied to the sixteenth terminal TM16. A third low level voltage VSS3 may be applied to the seventeenth terminal TM17.

The first inverter selection signal SFI1 may be used to input the high level voltage SGH to an i-th inverter input terminal Inv_IN[i].

In accordance with embodiments, the first to third low level voltages VSS1 to VSS3 may have the same voltage, but the disclosure is not limited thereto. For example, at least one of the first to third low level voltages VSS1 to VSS3 may have a voltage level different from those of the remaining two low level voltages.

In accordance with embodiments, the third terminal TM3 and the fifteenth terminal TM15 may be the same terminal. However, embodiments of the disclosure are not limited thereto.

In accordance with embodiments, the first carry signals CRa inputted to the tenth terminal TM10, the eleventh terminal TM11, and the twelfth terminal TM12 may be designed to be different from the illustrated carry signals. For example, the first carry signal CRa outputted from one of the preceding scan stage circuits may be inputted to the tenth terminal TM10. For example, the first carry signal CRa outputted from one of the preceding scan stage circuits may be inputted to the eleventh terminal TM11. For example, the first carry signal CRa outputted from one of the subsequent scan stage circuits may be inputted to the twelfth terminal TM12.

The i+1-th scan stage circuit 1110(*i*+1) may be configured in the same or similar manner.

For example, referring to FIG. 12, the i−3-th first carry signal CRa[i−3] may be inputted to the tenth terminal TM10 among the first to fifteenth terminals TM1 to TM15 of the i+1-th scan stage circuit 1110(*i*+1). The i−3-th first carry signal CRa[i−3] may be inputted to the eleventh terminal TM11, and the i+3-th first carry signal CRa[i+3] may be inputted to the twelfth terminal TM12. However, embodiments of the disclosure are not limited thereto. An i+1-th first Q node Q1[*i*+1] may be connected (e.g., electrically connected) to the fourth terminal TM4, an i+1-th first carry signal CRa[i+1] may be outputted from the thirteenth terminal TM13, and an i+1-th scan signal SCAN[i+1] may be outputted from the fourteenth terminal TM14.

A second inverter selection signal SFI2 may be inputted to the seventh terminal TM7 of the i+1-th scan stage circuit 1110(*i*+1). The second inverter selection signal SFI2 may be used to input the high level voltage SGH to an i+1-th inverter input terminal Inv_IN[i+1].

The i-th scan stage circuit 1110*i* and the i+1-th scan stage circuit 1110(*i*+1) may share the fifteenth to seventeenth terminals TM15 to TM17.

The first to twenty-fifth transistors T1A to T25A and the first and second capacitors C1A and C2A of the i-th scan stage circuit 1110*i* are described below.

The first transistor T1A may be configured to switch electrical connection between the fourth terminal TM4 and the sixth terminal TM6. A gate electrode of the first transistor T1A may be connected (e.g., electrically connected) to the fifth terminal TM5. The first transistor T1A may electrically connect the fourth terminal TM4 and the sixth terminal TM6 to each other in response to the first start signal STV. In case that the first transistor T1A is turned on, the voltage of the first Q node Q1[*i*] may be initialized to the first low level voltage VSS1.

The second transistor T2A may be configured to switch electrical connection between the fourth terminal TM4 and the sixth terminal TM6. A gate electrode of the second transistor T2A may be connected (e.g., electrically connected) to the twelfth terminal TM12. The second transistor T2A may electrically connect the fourth terminal TM4 and the sixth terminal TM6 to each other in response to the first carry signal (e.g., CRa[i+4]) outputted from the subsequent scan stage circuit. In case that the second transistor T2A is turned on, the voltage of the first Q node Q1[*i*] may be initialized to the first low level voltage VSS1.

The third transistor T3A may be configured to switch electrical connection between the fourth terminal TM4 and the sixth terminal TM6. A gate electrode of the third transistor T3A may be connected (e.g., electrically connected) to the i+1-th inverter input terminal Inv_IN[i+1]. The i+1-th inverter input terminal Inv_IN[i+1] may be configured to integrally control the i-th scan stage circuit 1110*i* and the i+1-th scan stage circuit 1110(*i*+1). In case that the third transistor T3A is turned on, the voltages of the first Q nodes Q1[*i*] and Q1[*i*+1] may be initialized to the first low level voltage VSS1.

The fourth transistor T4A may be configured to switch electrical connection between the fourth terminal TM4 and the eleventh terminal TM11. A gate electrode of the fourth transistor T4A may be connected (e.g., electrically connected) to the eleventh terminal TM11. The fourth transistor T4A may be turned on in response to the first carry signal (e.g., the i−3-th first carry signal CRa[i−3]) having a turn-on level. In case that the fourth transistor T4A is turned on, the first carry signal CRa[i−3] may be inputted to the fourth terminal TM4.

The fifth transistor T5A may be configured to switch electrical connection between the fourth terminal TM4 and the sixth terminal TM6. A gate electrode of the fifth transistor T5A may be connected (e.g., electrically connected) to the i-th inverter input terminal Inv_IN[i]. The i-th inverter input terminal Inv_IN[i] may be configured to integrally control the i-th scan stage circuit 1110*i* and the i+1-th scan stage circuit 1110(*i*+1). In case that the fifth transistor T5A is turned on, the voltages of the first Q nodes Q1[*i*] and Q1[*i*+1] may be initialized to the first low level voltage VSS1.

The sixth transistor T6A may be configured to switch electrical connection between the seventh transistor T7A and the i-th inverter input terminal Inv_IN[i]. A gate electrode of the sixth transistor T6A may be connected (e.g., electrically connected) to the eighth terminal TM8.

The seventh transistor T7A may be configured to switch electrical connection between the sixth terminal TM6 and the sixth transistor T6A. A gate electrode of the seventh transistor T7A may be connected (e.g., electrically connected) to the twenty-third transistor T23A. Referring to FIG. 12, in a period in which the twenty-first and twenty-third transistors T21A and T23A are turned on (i.e., a period in which the first sampling signal SRS having a turn-on level is applied), the first carry signal (e.g., the i−2-th first carry signal CRa[i−2]) inputted to the tenth terminal TM10 may be inputted to the gate electrode of the seventh transistor T7A. The seventh transistor T7A may be turned on or turned off in response to the level of the first carry signal CRa[i−2] inputted to the tenth terminal TM10 during the corresponding period.

The eighth transistor T8A may be configured to switch electrical connection between the fifteenth terminal TM15 and the first transistor T1A, the second transistor T2A, the third transistor T3A, the fourth transistor T4A, the fifth transistor T5A, and the twenty-fifth transistor T25A. Referring to FIG. 12, all sub-transistors of the first to fifth transistors T1A to T5A and the twenty-fifth transistor T25A may be connected (e.g., electrically connected) to the eighth transistor T8A.

The ninth transistor T9A may be configured to switch electrical connection between the first terminal TM1 and the fourteenth terminal TM14. A gate electrode of the ninth transistor T9A may be electrically connected to the fourth terminal TM4. The gate electrode of the ninth transistor T9A may be connected (e.g., electrically connected) to an electrode of the second capacitor C2A.

The tenth transistor T10A may be configured to switch electrical connection between the fourteenth terminal TM14 and the seventeenth terminal TM17. A gate electrode of the tenth transistor T10A may be connected (e.g., electrically connected) to the i+1-th inverter input terminal Inv_IN[i+1]. In case that a high level voltage is inputted to the gate electrode of the tenth transistor T10A, that is, the i+1-th inverter input terminal Inv_IN[i+1], a third low level voltage VSS3 may be outputted from the fourteenth terminal TM14.

The eleventh transistor T11A may be configured to switch electrical connection between the fourteenth terminal TM14 and the seventeenth terminal TM17. A gate electrode of the eleventh transistor T11A may be connected (e.g., electrically connected) to the i-th inverter input terminal Inv_IN[i]. In case that a high level voltage is inputted to the gate electrode of the eleventh transistor T11A, that is, the i-th inverter input terminal Inv_IN[i], the third low level voltage VSS3 may be outputted from the fourteenth terminal TM14.

The twelfth transistor T12A may be configured to switch electrical connection between the second terminal TM2 and the thirteenth terminal TM13. A gate electrode of the twelfth transistor T12A may be connected (e.g., electrically connected) to the fourth terminal TM4. In a period in which a turn-on level voltage is applied to the gate electrode of the twelfth transistor T12A, the carry clock signal CR_CLK may be outputted through the thirteenth terminal TM13 as the first carry signal CRa[i].

The thirteenth transistor T13A may be configured to switch electrical connection between the thirteenth terminal TM13 and the sixth terminal TM6. A gate electrode of the thirteenth transistor T13A may be connected (e.g., electrically connected) to the i+1-th inverter input terminal Inv_IN [i+1]. In case that a high level voltage is inputted to the gate electrode of the thirteenth transistor T13A, that is, the i+1-th inverter input terminal Inv_IN[i+1], the first low level voltage VSS1 may be outputted from the thirteenth terminal TM13.

The fourteenth transistor T14A may be configured to switch electrical connection between the thirteenth terminal TM13 and the sixth terminal TM6. A gate electrode of the fourteenth transistor T14A may be connected (e.g., electrically connected) to the i-th inverter input terminal Inv_IN[i]. In case that a high level voltage is inputted to the gate electrode of the fourteenth transistor T14A, that is, the i-th inverter input terminal Inv_IN[i], the first low level voltage VSS1 may be outputted from the thirteenth terminal TM13.

The fifteenth transistor T15A may be configured to switch electrical connection between the seventh terminal TM7 and the i-th inverter input terminal Inv_IN[i]. A gate electrode of the fifteenth transistor T15A may be connected (e.g., electrically connected) to the seventh terminal TM7. In case that the first inverter selection signal SFI1 (e.g., the high level voltage) is inputted to the seventh terminal TM7, the fifteenth transistor T15A and the eighteenth transistor T18A may be turned on and the high level voltage may be inputted to the i-th inverter input terminal Inv_IN[i]. Therefore, the eleventh transistor T11A and the fourteenth transistor T14A may be turned on.

The sixteenth transistor T16A may be configured to switch electrical connection between a gate electrode of the eighteenth transistor T18A and the sixteenth terminal TM16. A gate electrode of the sixteenth transistor T16A may be connected (e.g., electrically connected) to the fourth terminal TM4 of the i-th scan stage circuit 1110*i*. In case that the sixteenth transistor T16A is turned on (i.e., in case that the turn-on level voltage is applied to the i-th first Q node Q1[*i*]), the second low level voltage VSS2 may be applied to a gate electrode of the eighteenth transistor T18A. Accordingly, the eighteenth transistor T18A may be turned off, and the electrical connection between the fifteenth transistor T15A and the i-th inverter input terminal Inv_IN[i] may be broken. The seventh terminal TM7 may be electrically connected to the sixteenth terminal TM16 via the fifteenth transistor T15A and the sixteenth transistor T16A.

The seventeenth transistor T17A may be configured to switch electrical connection between the gate electrode of the eighteenth transistor T18A and the sixteenth terminal TM16. A gate electrode of the seventeenth transistor T17A may be connected (e.g., electrically connected) to the fourth terminal TM4 of the i+1-th scan stage circuit 1110(*i*+1). In case that the seventeenth transistor T17A is turned on (i.e., in case that the turn-on level voltage is applied to the i+1-th first Q node Q1[*i*+1]), the second low level voltage VSS2 may be applied to the gate electrode of the eighteenth transistor T18A. Accordingly, the eighteenth transistor T18A may be turned off, and the electrical connection between the fifteenth transistor T15A and the i-th inverter input terminal Inv_IN[i] may be broken. The seventh terminal TM7 may be electrically connected to the sixteenth terminal TM16 via the fifteenth transistor T15A and the seventeenth transistor T17A.

The eighteenth transistor T18A may be configured to switch electrical connection between the seventh terminal TM7 and the i-th inverter input terminal Inv_IN[i]. The gate electrode of the eighteenth transistor T18A may be connected (e.g., electrically connected) to the fifteenth transistor T15A, the sixteenth transistor T16A, and the seventeenth transistor T17A.

The nineteenth transistor T19A may be configured to switch electrical connection between the sixth terminal TM6 and the i-th inverter input terminal Inv_IN[i]. A gate electrode of the nineteenth transistor T19A may be connected (e.g., electrically connected) to the fourth terminal TM4. In a period in which the high level voltage is applied to the fourth terminal TM4, the first low level voltage VSS1 may be applied to the i-th inverter input terminal Inv_IN[i].

The twentieth transistor T20A may be configured to switch electrical connection between the sixth terminal TM6 and the i-th inverter input terminal Inv_IN[i]. A gate electrode of the twentieth transistor T20A may be connected (e.g., electrically connected) to the eleventh terminal TM11. In a period in which the high level voltage is applied to the eleventh terminal TM11, the first low level voltage VSS1 may be applied to the i-th inverter input terminal Inv_IN[i].

The twenty-first, twenty-second, and twenty-third transistors T21A, T22A, and T23A may be configured to store the high level voltage SGH in the first capacitor C1A in response to the first sampling signal SRS and the first carry signal (e.g., the i−2-th first carry signal CRa[i−2]).

The twenty-first transistor T21A may be connected (e.g., electrically connected) between the tenth terminal TM10 and the twenty-third transistor T23A. A gate electrode of the twenty-first transistor T21A may be connected (e.g., electrically connected) to the ninth terminal TM9.

The twenty-second transistor T22A may be configured to switch electrical connection between the fifteenth terminal TM15 and the twenty-first transistor T21A and to switch electrical connection between the fifteenth terminal TM15 and the twenty-third transistor T23A. A gate electrode of the twenty-second transistor T22A may be connected (e.g., electrically connected) to the twenty-third transistor T23A.

The twenty-third transistor T23A may be connected (e.g., electrically connected) between the twenty-first transistor T21A and an electrode of the first capacitor C1A. A gate electrode of the twenty-third transistor T23A may be connected (e.g., electrically connected) to the ninth terminal TM9. The twenty-third transistor T23A may be connected (e.g., electrically connected) to the gate electrode of the seventh transistor T7A and a gate electrode of the twenty-fourth transistor T24A.

The twenty-fourth transistor T24A may be configured to switch electrical connection between the third terminal TM3 and the twenty-fifth terminal T25A. A gate electrode of the twenty-fourth transistor T24A may be connected (e.g., electrically connected) to an electrode of the first capacitor C1A and the twenty-third transistor T23A. In case that the twenty-fourth transistor T24A is turned on, the high level voltage SGH may be applied to the twenty-fifth transistor T25A.

The twenty-fifth transistor T25A may be configured to switch electrical connection between the twenty-fourth transistor T24A and the fourth terminal TM4. A gate electrode of the twenty-fifth transistor T25A may be connected (e.g., electrically connected) to the eighth terminal TM8. The twenty-fifth transistor T25A may be connected (e.g., electrically connected) to the first to fifth transistors T1A to T5A.

The first capacitor C1A may be configured to store the high level voltage SGH in one scan stage circuit selected from among the scan stage circuits. The first capacitor C1A may include an electrode connected (e.g., electrically connected) to the gate electrode of the twenty-fourth transistor T24A, and another electrode electrically connected to the third terminal TM3.

The second capacitor C2A may include an electrode connected (e.g., electrically connected) to the gate electrode of the ninth transistor T9A, and another electrode connected (e.g., electrically connected) to the fourteenth terminal TM14. In accordance with embodiments, the second capacitor C2A may be omitted.

The process of selecting one of the scan stage circuits by the first sampling signal SRS is described below.

Referring to FIG. 12, in case that the first sampling signal SRS (e.g., the turn-on level voltage) is applied to the ninth terminal TM9, the twenty-first and twenty-third transistors T21A and T23A may be turned on.

At this time, in case that the first carry signal CRa[i−2] having a low level (or a turn-off level) is inputted to the tenth terminal TM10, the turn-off level voltage may be stored in an electrode of the first capacitor C1A.

In contrast, in case that the first carry signal CRa[i−2] having a high level (or a turn-on level) is inputted to the tenth terminal TM10, the twenty-second transistor T22A may be turned on and the high level voltage SGH may be stored in an electrode of the first capacitor C1A. Therefore, the seventh transistor T7A and the twenty-fourth transistor T24A may be turned on.

The scan stage circuit selected by the first sampling signal SRS may indicate a scan stage circuit in which the high level voltage SGH is stored in the first capacitor C1A among the scan stage circuits.

The description of each configuration of the i-th scan stage circuit 1110*i* may be equally applied to the i+1-th scan stage circuit 1110(*i*+1).

The description of the first to twenty-fifth transistors T1A to T25A of the i-th scan stage circuit 1110*i* may be equally (or similarly) applied to the first to twenty-fifth transistors T1B to T25B of the i+1-th scan stage circuit 1110(*i*+1). The description of the first capacitor C1A of the i-th scan stage circuit 1110*i* may be equally applied to the first capacitor C1B of the i+1-th scan stage circuit 1110(*i*+1).

Referring to FIG. 12, the configuration corresponding to the second capacitor C2A of the i-th scan stage circuit 1110*i* is illustrated as being omitted from the i+1-th scan stage circuit 1110(*i*+1). However, embodiments of the disclosure are not limited thereto.

Figure 13:
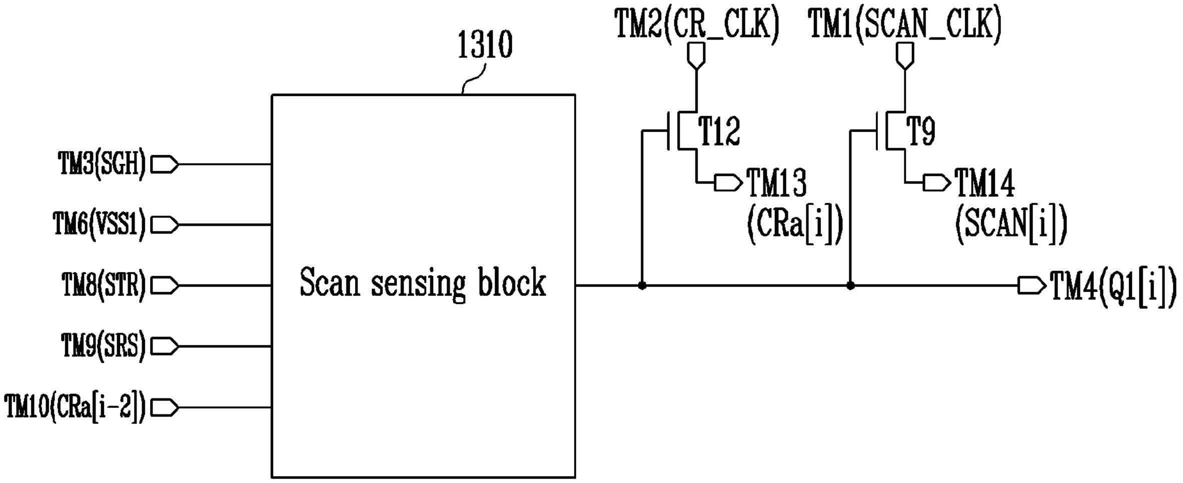
FIG. 13 is a schematic diagram illustrating a scan sensing block of the scan stage circuit.

FIG. 13 is a schematic diagram illustrating a scan sensing block 1310 of the scan stage circuit.

Referring to FIG. 13, the scan sensing block 1310 may be connected (e.g., electrically connected) to a third terminal TM3, a sixth terminal TM6, an eighth terminal TM8, a ninth terminal TM9, and a tenth terminal TM10. The scan sensing block 1310 may be connected (e.g., electrically connected) to a first Q node (e.g., an i-th first Q node QIN). The scan sensing block 1310 may be connected (e.g., electrically connected) to the fourth terminal TM4.

A twelfth transistor T12 (corresponding to the twelfth transistors T12A and T12B of FIG. 12) may be configured to switch electrical connection between a second terminal TM2 and a thirteenth terminal TM13 in response to a voltage of a first Q node Q1[*i*]. A first carry signal (e.g., an i-th first carry signal CRa[i]) may be outputted from the thirteenth terminal TM13.

A ninth transistor T9 (corresponding to the ninth transistors T9A and T9B of FIG. 12) may be configured to switch electrical connection between a first terminal TM1 and a fourteenth terminal TM14 in response to the voltage of the first Q node Q1[*i*]. A scan signal (e.g., an i-th scan signal SCAN[i]) may be outputted from the fourteenth terminal TM14.

The scan sensing block 1310 may be configured to store a high level voltage SGH in response to a first sampling signal SRS and a first carry signal CRa[i−2]. The scan sensing block 1310 may supply the stored high level voltage SGH to the first Q node Q1[*i*] in response to a second sampling signal STR. The twelfth transistor T12 may be turned on by receiving the high level voltage SGH, and a carry clock signal CR_CLK may be outputted to the thirteenth terminal TM13 as the first carry signal CRa[i]. The ninth transistor T9 may be turned on by receiving the high level voltage SGH, and a scan clock signal SCAN_CLK may be outputted to the fourteenth terminal TM14 as the scan signal SCAN[i].

Figure 14A:
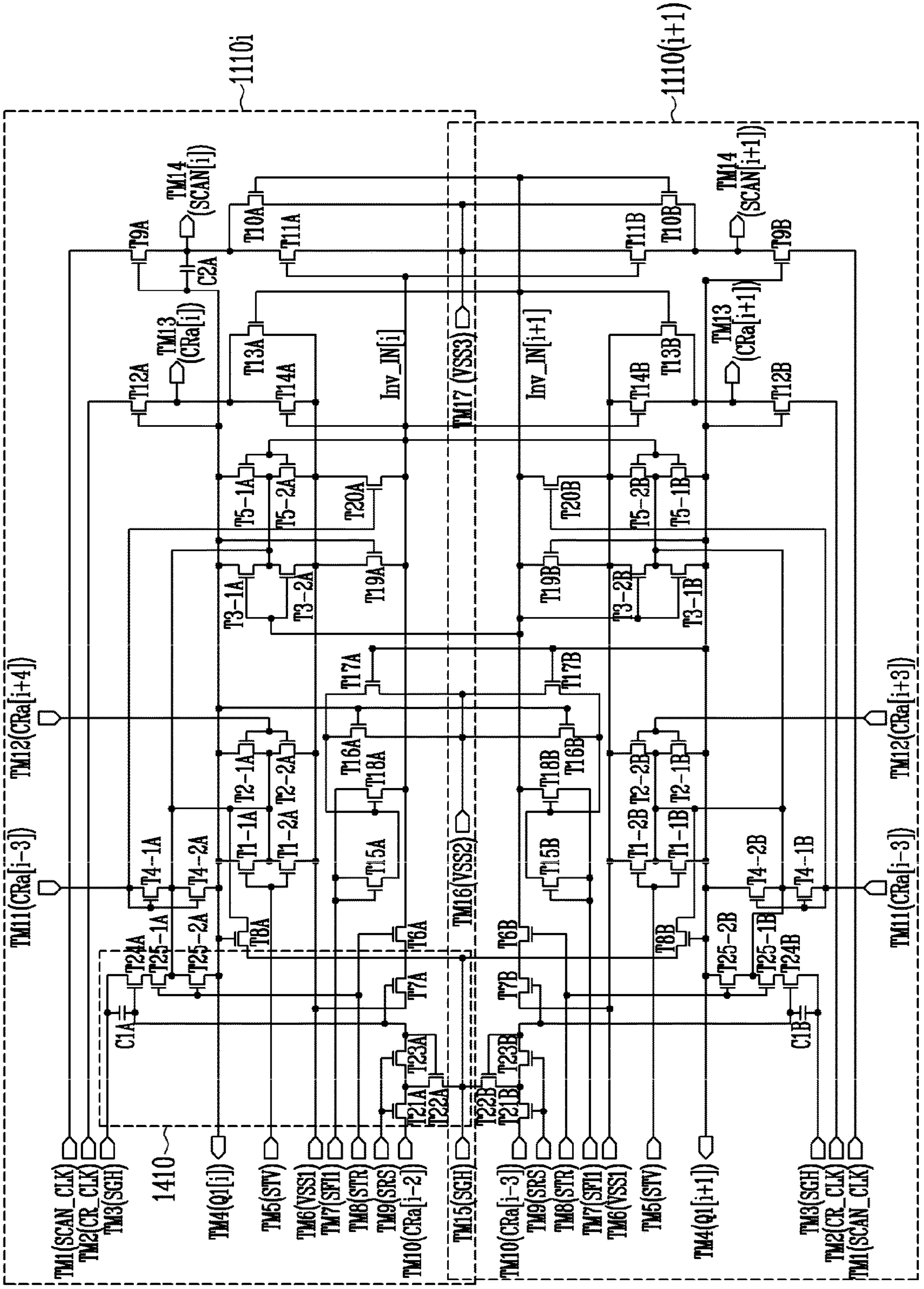
FIGS. 14A and 14B are schematic diagrams illustrating the scan sensing block in the scan stage circuit of FIG. 12.
Figure 14B:
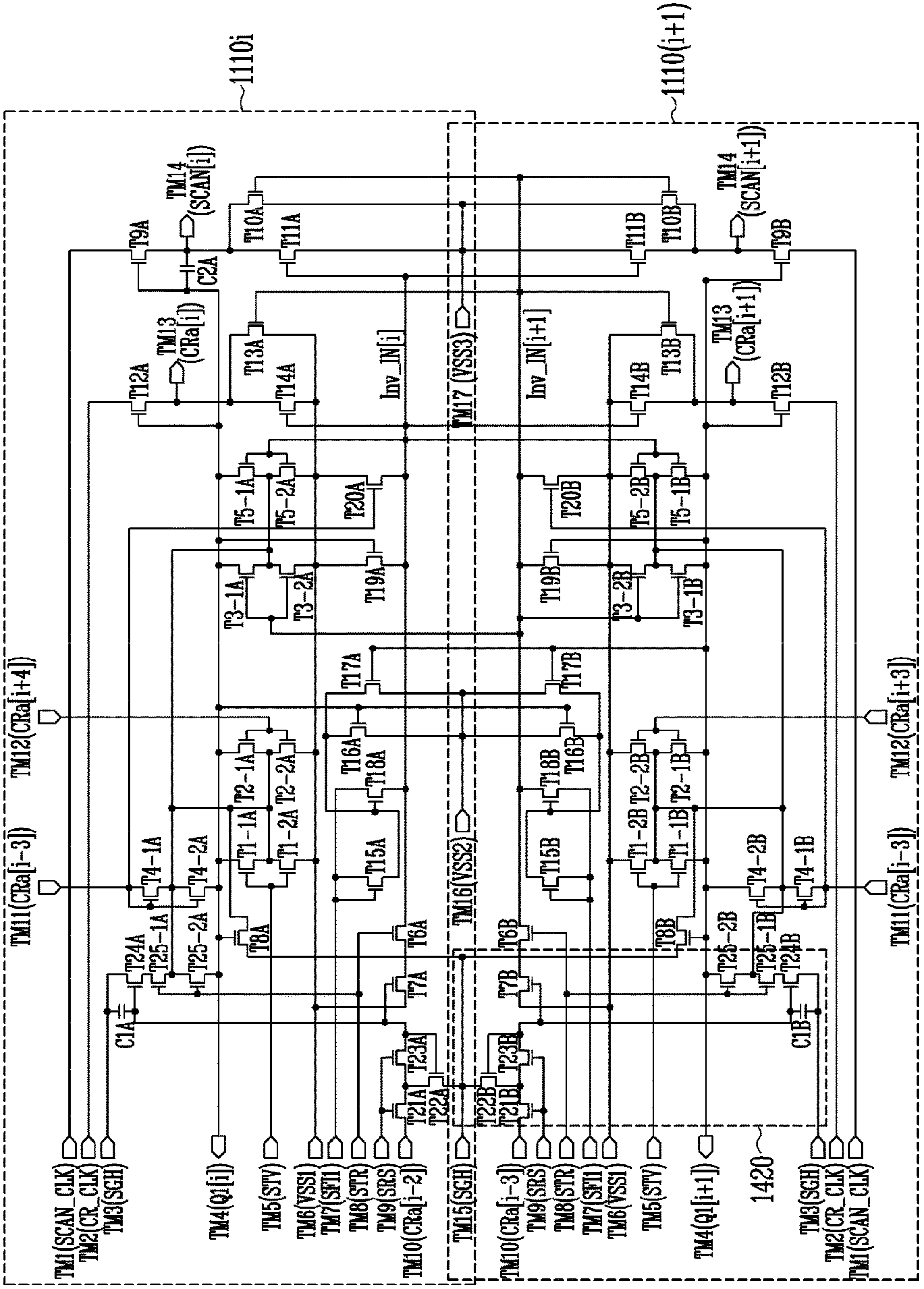

FIGS. 14A and 14B are schematic diagrams illustrating a scan sensing block in the scan stage circuit of FIG. 12.

Referring to FIG. 14A, a scan sensing block 1410 in an i-th scan stage circuit 1110*i* (refer to FIG. 12) may include a seventh transistor T7A, twenty-first to twenty-fifth transistors T21A to T25A, and a first capacitor C1A.

Referring to FIG. 14B, a scan sensing block 1420 in an i+1-th scan stage circuit 1110(*i*+1) (refer to FIG. 12) may include a seventh transistor T7B, twenty-first to twenty-fifth transistors T21B to T25B, and a first capacitor C1B.

The scan sensing block 1310 illustrated in FIG. 13 may be implemented as the scan sensing blocks 1410 and 1420 illustrated in FIGS. 14A and 14B.

Figure 15:
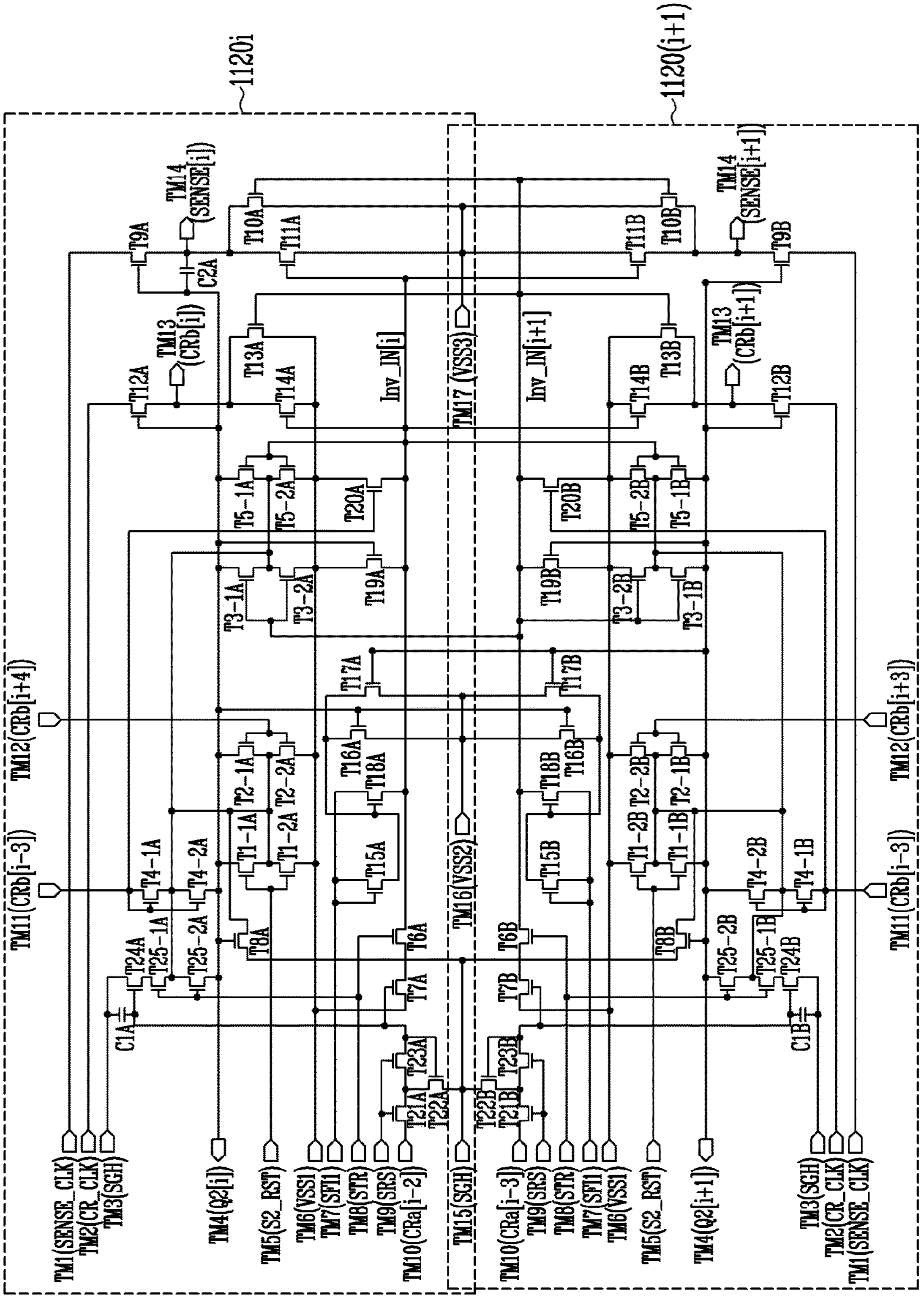
FIG. 15 is a schematic diagram of an equivalent circuit of a sense stage circuit in accordance with embodiments of the disclosure.

FIG. 15 is a schematic diagram of an equivalent circuit of the sense stage circuits 1120*i* and 1120(*i*+1) in accordance with embodiments of the disclosure.

In embodiments of the disclosure, the i-th sense stage circuit 1120*i* and the i+1-th sense stage circuit 1120(*i*+1) may share multiple nodes.

The i-th sense stage circuit 1120*i* may include one or more transistors and one or more capacitor elements. Referring to FIG. 12, the i-th sense stage circuit 1120*i* may include first to twenty-fifth transistors T1A to T25A and first and second capacitors C1A and C2A.

At least one of the first to twenty-fifth transistors T1A to T25A may include two sub-transistors connected in series to each other and may be configured to be controlled by a single signal (e.g., voltage). For example, the first transistor T1A may include two sub-transistors T1-1A and T1-2A connected in series to each other, and the two sub-transistors T1-1A and T1-2A may be controlled by the first start signal STV. FIG. 12 illustrates the case where the first to fifth transistors T1A to T5A and the twenty-fifth transistor T25A among the first to twenty-fifth transistors T1A to T25A each include two sub-transistors and the remaining transistors are each implemented as a single transistor. However, embodiments of the disclosure are not limited thereto. For example, at least one of the first to fifth transistors T1A to T5A and the twenty-fifth transistor T25A may each be implemented as a single transistor, and at least one of the remaining transistors may include two or more sub-transistors.

The i-th sense stage circuit 1120*i* and the i+1-th sense stage circuit 1120(*i*+1) may each include first to seventeenth terminals TM1 to TM17.

The first to seventeenth terminals TM1 to TM17 of the i-th sense stage circuit 1120*i* are described below.

A sense clock signal SENSE_CLK may be inputted to the first terminal TM1. A carry clock signal CR_CLK may be inputted to the second terminal TM2. A high level voltage SGH may be applied to the third terminal TM3. The fourth terminal TM4 may be connected (e.g., electrically connected) to a second Q node Q2. A second start signal S2_RST may be inputted to the fifth terminal TM5. A first low level voltage VSS1 may be applied to the sixth terminal TM6. A first inverter selection signal SFI1 may be inputted to the seventh terminal TM7. A second sampling signal STR may be inputted to the eighth terminal TM8. A first sampling signal SRS may be inputted to the ninth terminal TM9. A first carry signal (e.g., an i−2-th first carry signal CRa[i−2]) may be inputted to the tenth terminal TM10. A second carry signal (e.g., an i−3-th second carry signal CRb[i−3]) may be inputted to the eleventh terminal TM11. A second carry signal (e.g., an i+4—the second carry signal CRb[i+4]) may be inputted to the twelfth terminal TM12. A second carry signal CRb[i] may be outputted to the thirteenth terminal TM13. A sense signal SENSE[i] may be outputted to the fourteenth terminal TM14. A high level voltage SGH may be applied to the fifteenth terminal TM15. A second low level voltage VSS2 may be applied to the sixteenth terminal TM16. A third low level voltage VSS3 may be applied to the seventeenth terminal TM17.

The first inverter selection signal SFI1 may be used to input the high level voltage SGH to an i-th inverter input terminal Inv_IN[i]. In accordance with embodiments, the first to third low level voltages VSS1 to VSS3 may have the same voltage, but the disclosure is not limited thereto. For example, at least one of the first to third low level voltages VSS1 to VSS3 may have a voltage level different from those of the remaining two low level voltages.

In accordance with embodiments, the third terminal TM3 and the fifteenth terminal TM15 may be the same terminal. However, embodiments of the disclosure are not limited thereto.

In accordance with embodiments, the first carry signal CRa inputted to the tenth terminal TM10 and the second carry signals CRb inputted to the eleventh terminal TM11 and the twelfth terminal TM12 may be designed to be different from the illustrated carry signals. For example, the first carry signal CRa outputted from the preceding scan stage circuit may be inputted to the tenth terminal TM10. For example, the second carry signal CRb outputted from one of the preceding sense stage circuits may be inputted to the eleventh terminal TM11. For example, the second carry signal CRb outputted from one of the subsequent sense stage circuits may be inputted to the twelfth terminal TM12.

The i+1-th sense stage circuit 1120(*i*+1) may be configured in the same or similar manner.

For example, referring to FIG. 12, the i−3-th first carry signal CRa[i−3] may be inputted to the tenth terminal TM10 among the first to fifteenth terminals TM1 to TM15 of the i+1-th sense stage circuit 1120(*i*+1). The i−3-th second carry signal CRb[i−3] may be inputted to the eleventh terminal TM11, and the i+3-th second carry signal CRb[i+3] may be inputted to the twelfth terminal TM12. However, embodiments of the disclosure are not limited thereto. An i+1-th second Q node Q2[*i*+1] may be connected (e.g., electrically connected) to the fourth terminal TM4, an i+1-th second carry signal CRb[i+1] may be outputted from the thirteenth terminal TM13, and an i+1-th sense signal SENSE[i+1] may be outputted from the fourteenth terminal TM14.

A second inverter selection signal SFI2 may be inputted to the seventh terminal TM7 of the i+1-th sense stage circuit 1120(*i*+1). The second inverter selection signal SFI2 may be used to input the high level voltage SGH to an i+1-th inverter input terminal Inv_IN[i+1].

The i-th sense stage circuit 1120*i* and the i+1-th sense stage circuit 1120(*i*+1) may share the fifteenth to seventeenth terminals TM15 to TM17.

The first to twenty-fifth transistors T1A to T25A and the first and second capacitors C1A and C2A of the i-th sense stage circuit 1120*i* are described below.

The first transistor T1A may be configured to switch electrical connection between the fourth terminal TM4 and the sixth terminal TM6. A gate electrode of the first transistor T1A may be connected (e.g., electrically connected) to the fifth terminal TM5. The first transistor T1A may electrically connect the fourth terminal TM4 and the sixth terminal TM6 to each other in response to the second start signal S2_RST. In case that the first transistor T1A is turned on, the voltage of the second Q node Q2[*i*] may be initialized to the first low level voltage VSS1.

The second transistor T2A may be configured to switch electrical connection between the fourth terminal TM4 and the sixth terminal TM6. A gate electrode of the second transistor T2A may be connected (e.g., electrically connected) to the twelfth terminal TM12. The second transistor T2A may electrically connect the fourth terminal TM4 and the sixth terminal TM6 to each other in response to the second carry signal (e.g., CRb[i+4]) outputted from the subsequent sense stage circuit. In case that the second transistor T2A is turned on, the voltage of the second Q node Q2[*i*] may be initialized to the first low level voltage VSS1.

The third transistor T3A may be configured to switch electrical connection between the fourth terminal TM4 and the sixth terminal TM6. A gate electrode of the third transistor T3A may be connected (e.g., electrically connected) to the i+1-th inverter input terminal Inv_IN[i+1]. The i+1-th inverter input terminal Inv_IN[i+1] may be configured to integrally control the i-th sense stage circuit 1120*i* and the i+1-th sense stage circuit 1120(*i*+1). In case that the third transistor T3A is turned on, the voltages of the second Q nodes Q2[*i*] and Q2[*i*+1] may be initialized to the first low level voltage VSS1.

The fourth transistor T4A may be configured to switch electrical connection between the fourth terminal TM4 and the eleventh terminal TM11. A gate electrode of the fourth transistor T4A may be connected (e.g., electrically connected) to the eleventh terminal TM11. The fourth transistor T4A may be turned on in response to the second carry signal (e.g., the i−3-th second carry signal CRb[i−3]) having a turn-on level. In case that the fourth transistor T4A is turned on, the second carry signal CRb[i−3] may be inputted to the fourth terminal TM4.

The fifth transistor T5A may be configured to switch electrical connection between the fourth terminal TM4 and the sixth terminal TM6. A gate electrode of the fifth transistor T5A may be connected (e.g., electrically connected) to the i-th inverter input terminal Inv_IN[i]. The i-th inverter input terminal Inv_IN[i] may be configured to integrally control the i-th sense stage circuit 1120*i* and the i+1-th sense stage circuit 1120(*i*+1). In case that the fifth transistor T5A is turned on, the voltages of the second Q nodes Q2[*i*] and Q2[*i*+1] may be initialized to the first low level voltage VSS1.

The sixth transistor T6A may be configured to switch electrical connection between the seventh transistor T7A and the i-th inverter input terminal Inv_IN[i]. A gate electrode of the sixth transistor T6A may be connected (e.g., electrically connected) to the eighth terminal TM8.

The seventh transistor T7A may be configured to switch electrical connection between the sixth terminal TM6 and the sixth transistor T6A. A gate electrode of the seventh transistor T7A may be connected (e.g., electrically connected) to the twenty-third transistor T23A. Referring to FIG. 15, in a period in which the twenty-first and twenty-third transistors T21A and T23A are turned on (i.e., a period in which the first sampling signal SRS having a turn-on level is applied), the first carry signal (e.g., the i−2-th first carry signal CRa[i−2]) inputted to the tenth terminal TM10 may be inputted to the gate electrode of the seventh transistor T7A. The seventh transistor T7A may be turned on or turned off in response to the level of the first carry signal CRa[i−2] inputted to the tenth terminal TM10 during the corresponding period.

The eighth transistor T8A may be configured to switch electrical connection between the fifteenth terminal TM15 and the first transistor T1A, the second transistor T2A, the third transistor T3A, the fourth transistor T4A, the fifth transistor TSA, and the twenty-fifth transistor T25A. Referring to FIG. 15, all sub-transistors of the first to fifth transistors T1A to T5A and the twenty-fifth transistor T25A may be connected (e.g., electrically connected) to the eighth transistor T8A.

The ninth transistor T9A may be configured to switch electrical connection between the first terminal TM1 and the fourteenth terminal TM14. A gate electrode of the ninth transistor T9A may be electrically connected to the fourth terminal TM4. The gate electrode of the ninth transistor T9A may be connected (e.g., electrically connected) to an electrode of the second capacitor C2A.

The tenth transistor T10A may be configured to switch electrical connection between the fourteenth terminal TM14 and the seventeenth terminal TM17. A gate electrode of the tenth transistor T10A may be connected (e.g., electrically connected) to the i+1-th inverter input terminal Inv_IN[i+1]. In case that a high level voltage is inputted to the gate electrode of the tenth transistor T10A, that is, the i+1-th inverter input terminal Inv_IN[i+1], a third low level voltage VSS3 may be outputted from the fourteenth terminal TM14.

The eleventh transistor T11A may be configured to switch electrical connection between the fourteenth terminal TM14 and the seventeenth terminal TM17. A gate electrode of the eleventh transistor T11A may be connected (e.g., electrically connected) to the i-th inverter input terminal Inv_IN[i]. In case that a high level voltage is inputted to the gate electrode of the eleventh transistor T11A, that is, the i-th inverter input terminal Inv_IN[i], the third low level voltage VSS3 may be outputted from the fourteenth terminal TM14.

The twelfth transistor T12A may be configured to switch electrical connection between the second terminal TM2 and the thirteenth terminal TM13. A gate electrode of the twelfth transistor T12A may be connected (e.g., electrically connected) to the fourth terminal TM4. In a period in which a turn-on level voltage is applied to the gate electrode of the twelfth transistor T12A, the carry clock signal CR_CLK may be outputted through the thirteenth terminal TM13 as the second carry signal CRb[i].

The thirteenth transistor T13A may be configured to switch electrical connection between the thirteenth terminal TM13 and the sixth terminal TM6. A gate electrode of the thirteenth transistor T13A may be connected (e.g., electrically connected) to the i+1-th inverter input terminal Inv_IN [i+1]. In case that a high level voltage is inputted to the gate electrode of the thirteenth transistor T13A, that is, the i+1-th inverter input terminal Inv_IN[i+1], the first low level voltage VSS1 may be outputted from the thirteenth terminal TM13.

The fourteenth transistor T14A may be configured to switch electrical connection between the thirteenth terminal TM13 and the sixth terminal TM6. A gate electrode of the fourteenth transistor T14A may be connected (e.g., electrically connected) to the i-th inverter input terminal Inv_IN[i]. In case that a high level voltage is inputted to the gate electrode of the fourteenth transistor T14A, that is, the i-th inverter input terminal Inv_IN[i], the first low level voltage VSS1 may be outputted from the thirteenth terminal TM13.

The fifteenth transistor T15A may be configured to switch electrical connection between the seventh terminal TM7 and the i-th inverter input terminal Inv_IN[i]. A gate electrode of the fifteenth transistor T15A may be connected (e.g., electrically connected) to the seventh terminal TM7. In case that the first inverter selection signal SFI1 (e.g., the high level voltage) is inputted to the seventh terminal TM7, the fifteenth transistor T15A and the eighteenth transistor T18A may be turned on and the high level voltage is inputted to the i-th inverter input terminal Inv_IN[i]. Therefore, the eleventh transistor T11A and the fourteenth transistor T14A may be turned on.

The sixteenth transistor T16A may be configured to switch electrical connection between a gate electrode of the eighteenth transistor T18A and the sixteenth terminal TM16. A gate electrode of the sixteenth transistor T16A may be connected (e.g., electrically connected) to the fourth terminal TM4 of the i-th sense stage circuit 1120*i*. In case that the sixteenth transistor T16A is turned on (i.e., in case that the turn-on level voltage is applied to the i-th second Q node Q2[*i*]), the second low level voltage VSS2 may be applied to a gate electrode of the eighteenth transistor T18A. Accordingly, the eighteenth transistor T18A may be turned off, and the electrical connection between the fifteenth transistor T15A and the i-th inverter input terminal Inv_IN[i] may be broken. The seventh terminal TM7 may be electrically connected to the sixteenth terminal TM16 via the fifteenth transistor T15A and the sixteenth transistor T16A.

The seventeenth transistor T17A may be configured to switch electrical connection between the gate electrode of the eighteenth transistor T18A and the sixteenth terminal TM16. A gate electrode of the seventeenth transistor T17A may be connected (e.g., electrically connected) to the fourth terminal TM4 of the i+1-th sense stage circuit 1120(*i*+1). In case that the seventeenth transistor T17A is turned on (i.e., in case that the turn-on level voltage is applied to the i+1-th second Q node Q2[*i*+1]), the second low level voltage VSS2 may be applied to the gate electrode of the eighteenth transistor T18A. Accordingly, the eighteenth transistor T18A may be turned off, and the electrical connection between the fifteenth transistor T15A and the i-th inverter input terminal Inv_IN[i] may be broken. The seventh terminal TM7 may be electrically connected to the sixteenth terminal TM16 via the fifteenth transistor T15A and the seventeenth transistor T17A.

The eighteenth transistor T18A may be configured to switch electrical connection between the seventh terminal TM7 and the i-th inverter input terminal Inv_IN[i]. The gate electrode of the eighteenth transistor T18A may be connected (e.g., electrically connected) to the fifteenth transistor T15A, the sixteenth transistor T16A, and the seventeenth transistor T17A.

The nineteenth transistor T19A may be configured to switch electrical connection between the sixth terminal TM6 and the i-th inverter input terminal Inv_IN[i]. A gate electrode of the nineteenth transistor T19A may be connected (e.g., electrically connected) to the fourth terminal TM4. In a period in which the high level voltage is applied to the fourth terminal TM4, the first low level voltage VSS1 may be applied to the i-th inverter input terminal Inv_IN[i].

The twentieth transistor T20A may be configured to switch electrical connection between the sixth terminal TM6 and the i-th inverter input terminal Inv_IN[i]. A gate electrode of the twentieth transistor T20A may be connected (e.g., electrically connected) to the eleventh terminal TM11. In a period in which the high level voltage is applied to the eleventh terminal TM11, the first low level voltage VSS1 may be applied to the i-th inverter input terminal Inv_IN[i].

The twenty-first, twenty-second, and twenty-third transistors T21A, T22A, and T23A may be configured to store the high level voltage SGH in the first capacitor C1A in response to the first sampling signal SRS and the first carry signal (e.g., the i−2-th first carry signal CRa[i−2]).

The twenty-first transistor T21A may be connected (e.g., electrically connected) between the tenth terminal TM10 and the twenty-third transistor T23A. A gate electrode of the twenty-first transistor T21A may be connected (e.g., electrically connected) to the ninth terminal TM9.

The twenty-second transistor T22A may be configured to switch electrical connection between the fifteenth terminal TM15 and the twenty-first transistor T21A and to switch electrical connection between the fifteenth terminal TM15 and the twenty-third transistor T23A. A gate electrode of the twenty-second transistor T22A may be connected (e.g., electrically connected) to the twenty-third transistor T23A.

The twenty-third transistor T23A may be connected (e.g., electrically connected) between the twenty-first transistor T21A and an electrode of the first capacitor C1A. A gate electrode of the twenty-third transistor T23A may be connected (e.g., electrically connected) to the ninth terminal TM9. The twenty-third transistor T23A may be connected (e.g., electrically connected) to the gate electrode of the seventh transistor T7A and a gate electrode of the twenty-fourth transistor T24A.

The twenty-fourth transistor T24A may be configured to switch electrical connection between the third terminal TM3 and the twenty-fifth terminal T25A. A gate electrode of the twenty-fourth transistor T24A may be connected (e.g., electrically connected) to an electrode of the first capacitor C1A and the twenty-third transistor T23A. In case that the twenty-fourth transistor T24A is turned on, the high level voltage SGH may be applied to the twenty-fifth transistor T25A.

The twenty-fifth transistor T25A may be configured to switch electrical connection between the twenty-fourth transistor T24A and the fourth terminal TM4. A gate electrode of the twenty-fifth transistor T25A may be connected (e.g., electrically connected) to the eighth terminal TM8. The twenty-fifth transistor T25A may be connected (e.g., electrically connected) to the first to fifth transistors T1A to T5A.

The first capacitor C1A may be configured to store the high level voltage SGH in one sense stage circuit selected from among the sense stage circuits. The first capacitor C1A may include an electrode connected (e.g., electrically connected) to the gate electrode of the twenty-fourth transistor T24A, and another electrode electrically connected to the third terminal TM3.

The second capacitor C2A may include an electrode connected (e.g., electrically connected) to the gate electrode of the ninth transistor T9A, and another electrode connected (e.g., electrically connected) to the fourteenth terminal TM14. In accordance with embodiments, the second capacitor C2A may be omitted.

The process of selecting one of the sense stage circuits by the first sampling signal SRS is described below.

Referring to FIG. 15, in case that the first sampling signal SRS (e.g., the turn-on level voltage) is applied to the ninth terminal TM9, the twenty-first and twenty-third transistors T21A and T23A may be turned on.

At this time, in case that the first carry signal CRa[i−2] having a low level (or a turn-off level) is inputted to the tenth terminal TM10, the turn-off level voltage may be stored in an electrode of the first capacitor C1A.

In contrast, in case that the first carry signal CRa[i−2] having a high level (or a turn-on level) is inputted to the tenth terminal TM10, the twenty-second transistor T22A may be turned on and the high level voltage SGH may be stored in an electrode of the first capacitor C1A. Therefore, the seventh transistor T7A and the twenty-fourth transistor T24A may be turned on.

The sense stage circuit selected by the first sampling signal SRS may indicate a sense stage circuit in which the high level voltage SGH is stored in the first capacitor C1A among the sense stage circuits.

The description of each configuration of the i-th sense stage circuit 1120*i* may be equally applied to the i+1-th sense stage circuit 1120(*i*+1).

The description of the first to twenty-fifth transistors T1A to T25A of the i-th sense stage circuit 1120*i* may be equally (or similarly) applied to the first to twenty-fifth transistors T1B to T25B of the i+1-th sense stage circuit 1120(*i*+1). The description of the first capacitor C1A of the i-th sense stage circuit 1120*i* may be equally applied to the first capacitor C1B of the i+1-th sense stage circuit 1120(*i*+1).

Referring to FIG. 15, the configuration corresponding to the second capacitor C2A of the i-th sense stage circuit 1120*i* is illustrated as being omitted from the i+1-th sense stage circuit 1120(*i*+1). However, embodiments of the disclosure are not limited thereto.

Figure 16:
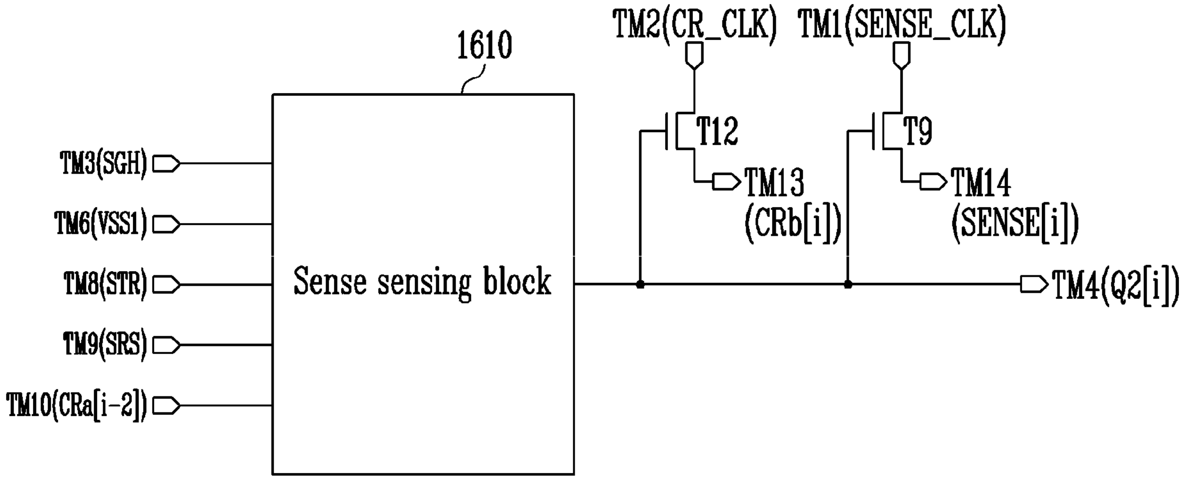
FIG. 16 is a schematic diagram illustrating a sense sensing block of the scan stage circuit.

FIG. 16 is a schematic diagram illustrating a sense sensing block 1610 of the sense stage circuit.

Referring to FIG. 16, the sense sensing block 1610 may be connected (e.g., electrically connected) to a third terminal TM3, a sixth terminal TM6, an eighth terminal TM8, a ninth terminal TM9, and a tenth terminal TM10. The sense sensing block 1610 may be connected (e.g., electrically connected) to a second Q node (e.g., an i-th second Q node Q2[*i*]). The sense sensing block 1610 may be connected (e.g., electrically connected) to a fourth terminal TM4.

A twelfth transistor T12 (corresponding to the twelfth transistors T12A and T12B of FIG. 15) may be configured to switch electrical connection between a second terminal TM2 and a thirteenth terminal TM13 in response to a voltage of the second Q node Q2[*i*]. A second carry signal (e.g., an i-th second carry signal CRb[i]) may be outputted from the thirteenth terminal TM13.

A ninth transistor T9 (corresponding to the ninth transistors T9A and T9B of FIG. 15) may be configured to switch electrical connection between a first terminal TM1 and a fourteenth terminal TM14 in response to the voltage of the second Q node Q2[*i*]. A sense signal (e.g., an i-th sense signal SENSE[i]) may be outputted from the fourteenth terminal TM14.

The sense sensing block 1610 may be configured to store a high level voltage SGH in response to a first sampling signal SRS and a first carry signal CRa[i−2]. The sense sensing block 1610 may supply the stored high level voltage SGH to the second Q node Q2[*i*] in response to a second sampling signal STR. The twelfth transistor T12 may be turned on by receiving the high level voltage SGH, and a carry clock signal CR_CLK may be outputted to the thirteenth terminal TM13 as the second carry signal CRb[i]. The ninth transistor T9 may be turned on by receiving the high level voltage SGH, and a sense clock signal SENSE_CLK may be outputted to the fourteenth terminal TM14 as the sense signal SENSE[i].

Figure 17A:
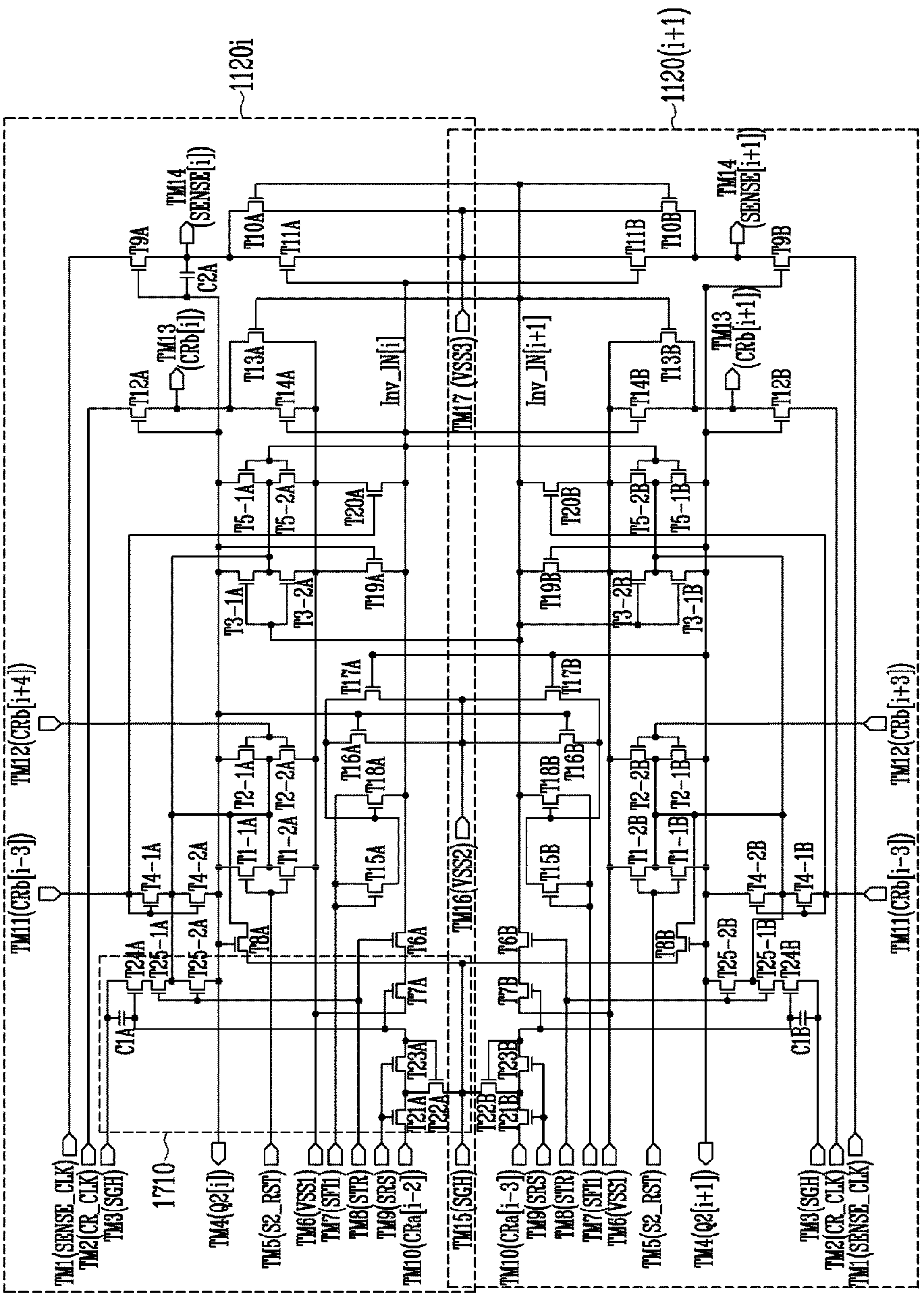
FIGS. 17A and 17B are schematic diagrams illustrating the sense sensing block in the sense stage circuit of FIG. 15.
Figure 17B:
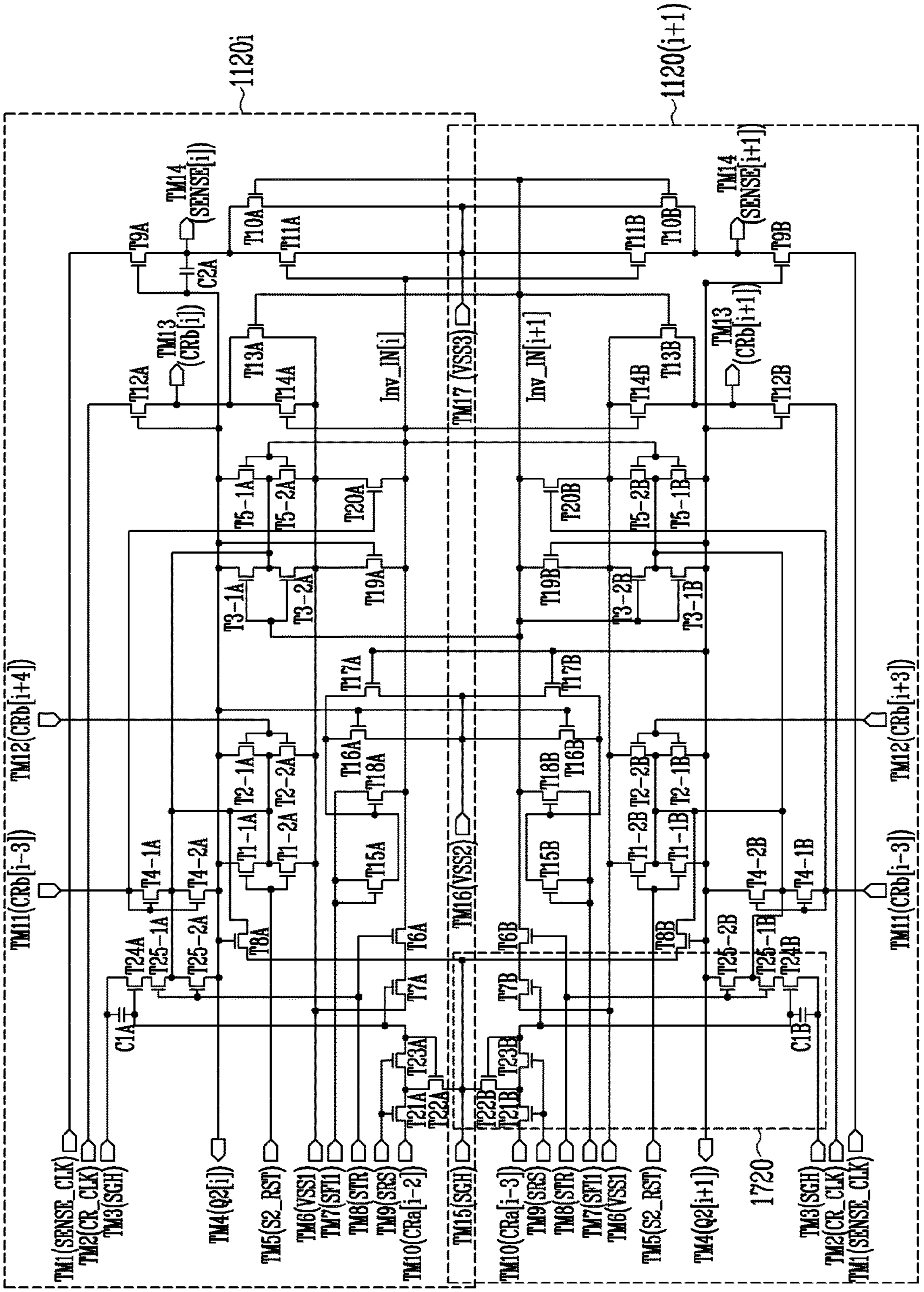

FIGS. 17A and 17B are schematic diagrams illustrating the sense sensing block in the sense stage circuit of FIG. 15.

Referring to FIG. 17A, a sense sensing block 1710 in an i-th sense stage circuit 1120*i* (refer to FIG. 15) may include a seventh transistor T7A, twenty-first to twenty-fifth transistors T21A to T25A, and a first capacitor C1A.

Referring to FIG. 17B, a sense sensing block 1720 in an i+1-th sense stage circuit 1120(*i*+1) (refer to FIG. 15) may include a seventh transistor T7B, twenty-first to twenty-fifth transistors T21B to T25B, and a first capacitor C1B.

The sense sensing block 1610 illustrated in FIG. 16 may be implemented as the sense sensing blocks 1710 and 1720 illustrated in FIGS. 17A and 17B.

Figure 18:
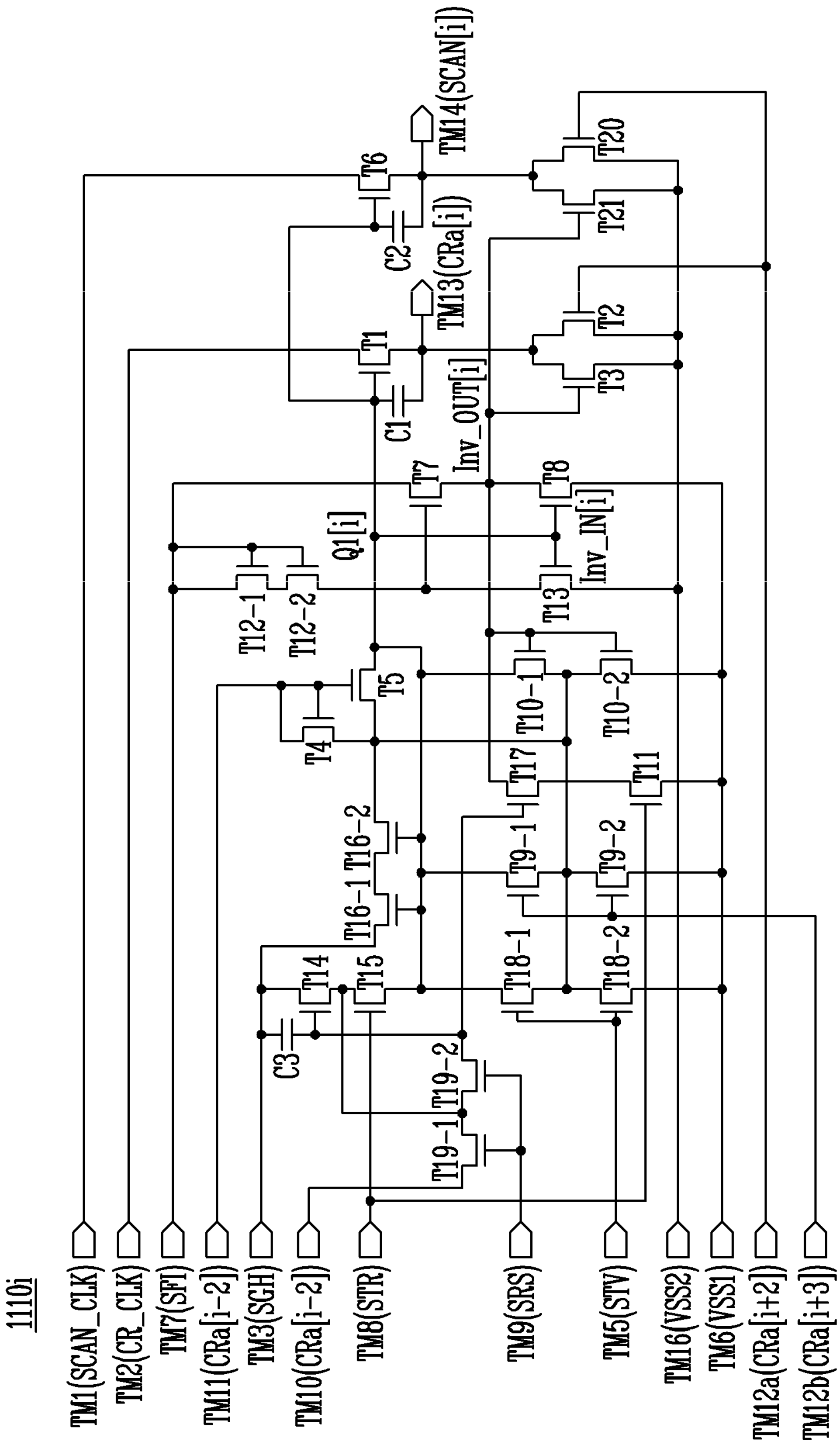
FIG. 18 is another schematic diagram of an equivalent circuit of a scan stage circuit in accordance with embodiments of the disclosure.

FIG. 18 is another equivalent circuit diagram of the scan stage circuit 1110*i* in accordance with embodiments of the disclosure.

The i-th scan stage circuit 1110*i* may include one or more transistors and one or more capacitor elements. Referring to FIG. 18, the i-th scan stage circuit 1110*i* may include first to twenty-fifth transistors T1 to T21 and first, second, and third capacitors C1, C2, and C3.

At least one of the first to twenty-first transistors T1 to T21 may include two sub-transistors connected in series to each other and may be configured to be controlled by a single signal (e.g., voltage). For example, the eighteenth transistor T18 may include two sub-transistors T18-1 and T18-2 connected in series to each other, and the two sub-transistors T18-1 and T18-2 may be controlled by the first start signal STV. FIG. 18 illustrates an embodiment, in which the ninth, tenth, twelfth, sixteenth, eighteenth, and nineteenth transistors T9, T10, T12, T16, T18, and T19 each include two sub-transistors and the remaining transistors are each implemented as a single transistor, by way of example. However, embodiments of the disclosure are not limited thereto. For example, at least one of the ninth, tenth, twelfth, sixteenth, eighteenth, and nineteenth transistors T9, T10, T12, T16, T18, and T19 may be implemented as a single transistor, and at least one of the remaining transistors may include two or more sub-transistors.

Referring to FIG. 18, the scan stage circuit 1110*i* in accordance with embodiments of the disclosure may include first to third terminals TM1 to TM3, fifth to fourteenth terminals TM5 to TM14, and a sixteenth terminal TM16.

A scan clock signal SCAN_CLK may be inputted to the first terminal TM1. A carry clock signal CR_CLK may be inputted to the second terminal TM2. A high level voltage SGH may be applied to the third terminal TM3. A first start signal STV may be inputted to the fifth terminal TM5. A first low level voltage VSS1 may be applied to the sixth terminal TM6. An inverter selection signal SFI may be inputted to the seventh terminal TM7. A second sampling signal STR may be inputted to the eighth terminal TM8. A first sampling signal SRS may be inputted to the ninth terminal TM9. A first carry signal (e.g., an i−2-th first carry signal CRa[i−2]) may be inputted to the tenth terminal TM10. A first carry signal (e.g., an i−2-th first carry signal CRa[i−2]) may be inputted to the eleventh terminal TM11. A first carry signal (e.g., an i+2-th first carry signal CRa[i+2]) may be inputted a 12*a*-th terminal TM12*a*. A first carry signal (e.g., an i+3-th first carry signal CRa[i+3]) may be inputted to a 12*b*-th twelfth terminal TM12*b*. A first carry signal CRa[i] may be outputted to the thirteenth terminal TM13. A scan signal SCAN[i] may be outputted to the fourteenth terminal TM14. A second low level voltage VSS2 may be applied to the sixteenth terminal TM16.

The inverter selection signal SFI may be used to supply a high level voltage to an inverter output terminal Inv_OUT [i].

In accordance with embodiments, the first and second low level voltages VSS1 and VSS2 may have the same voltage, but the disclosure is not limited thereto. For example, the first low level voltage VSS1 may be different from the second low level voltage VSS2.

In accordance with embodiments, the first carry signals CRa inputted to the tenth terminal TM10, the eleventh terminal TM11, the 12*a*-th terminal TM12*a*, and the 12*b*-th terminal TM12*b* may be designed to be different from the illustrated carry signals. For example, the first carry signal CRa outputted from one of the preceding scan stage circuits may be inputted to the tenth terminal TM10. For example, the first carry signal CRa outputted from one of the preceding scan stage circuits may be inputted to the eleventh terminal TM11. For example, the first carry signal CRa outputted from one of the subsequent scan stage circuits may be inputted to the 12*a*-th terminal TM12*a*. For example, the first carry signal CRa outputted from one of the subsequent scan stage circuits may be inputted to the 12*b*-th terminal TM12*b*.

The first to twenty-first transistors T1 to T21 and the first to third capacitors C1, C2, and C3 of the i-th scan stage circuit 1110*i* are described below.

The first transistor T1 may be configured to switch electrical connection between the second terminal TM2 and the thirteenth terminal TM13. A gate electrode of the first transistor T1 may be electrically connected to a first Q node Q1[*i*]. In a period in which the high level voltage is applied to the first Q node Q1[*i*], the carry clock signal CR_CLK may be outputted to the thirteenth terminal TM13 as the first carry signal CRa[i]. The gate electrode of the first transistor T1 may be connected (e.g., electrically connected) to an electrode of the first capacitor C1.

The second transistor T2 may be configured to switch electrical connection between the thirteenth terminal TM13 and the sixteenth terminal TM16. A gate electrode of the second transistor T2 may be connected (e.g., electrically connected) to the 12*a*-th terminal TM12*a*. In case that the second transistor T2 is turned on, the second low level voltage VSS2 may be outputted to the thirteenth terminal TM13.

The third transistor T3 may be configured to switch electrical connection between the thirteenth terminal TM13 and the sixteenth terminal TM16. A gate electrode of the third transistor T3 may be electrically connected to the inverter output terminal Inv_OUT[i]. In case that the third transistor T3 is turned on, the second low level voltage VSS2 may be outputted to the thirteenth terminal TM13.

The fourth and fifth transistors T4 and T5 may be configured to switch electrical connection between the eleventh terminal TM11 and the first Q node Q1[*i*].

The fourth transistor T4 may be connected (e.g., electrically connected) between the eleventh terminal TM11 and the fifth transistor T5. A gate electrode of the fourth transistor T4 may be connected (e.g., electrically connected) to the eleventh terminal TM11 and a gate electrode of the fifth transistor T5.

The fifth transistor T5 may be connected (e.g., electrically connected) between the fourth transistor T4 and the first Q node Q1[*i*]. A gate electrode of the fifth transistor T5 may be connected (e.g., electrically connected) to the eleventh terminal TM11 and the gate electrode of the fourth transistor T4.

The fourth and fifth transistors T4 and T5 may be connected (e.g., electrically connected) to the ninth, tenth, sixteenth, and eighteenth transistors T9, T10, T16, and T18.

The sixth transistor T6 may be configured to switch electrical connection between the first terminal TM1 and the fourteenth terminal TM14. A gate electrode of the sixth transistor T6 may be connected (e.g., electrically connected) to the first Q node Q1[*i*]. In a period in which the high level voltage is applied to the first Q node Q1[*i*], the scan clock signal SCAN_CLK may be outputted to the fourteenth terminal TM14 as the scan signal SCAN[i]. The gate electrode of the sixth transistor T6 may be connected (e.g., electrically connected) to an electrode of the second capacitor C2.

The seventh transistor T7 may be configured to switch electrical connection between the seventh terminal TM7 and the inverter output terminal Inv_OUT[i]. A gate electrode of the seventh transistor T7 may be connected (e.g., electrically connected) to the twelfth transistor T12 and the thirteenth transistor T13.

In case that the high level voltage is applied to the first Q node Q1[*i*], the high level voltage may be applied to the inverter input terminal Inv_IN[i]. The thirteenth transistor T13 may be turned on so that the second low level voltage VSS2 may be applied to the gate electrode of the seventh transistor T7, and the eighth transistor T8 may be turned on so that the first low level voltage VSS1 may be applied to the inverter output terminal Inv_OUT[i]. In case that the high level inverter selection signal SFI is inputted to the seventh terminal TM7, the seventh terminal TM7 may be electrically connected to the sixth terminal TM6 through the seventh transistor T7 and the eighth transistor T8, and thus, the inverter selection signal SFI may be outputted through the sixth terminal TM6. The first low level voltage VSS1 may be applied to the inverter output terminal INV_OUT[i].

In case that the low level voltage is applied to the first Q node Q1[*i*] the low level voltage may be applied to the inverter output terminal Inv_OUT[i]. The seventh transistor T7 may not be electrically connected to the sixth terminal TM6 and the sixteenth terminal TM16. In case that the high level inverter selection signal SFI is inputted, the high level voltage may be inputted to the gate electrode of the seventh transistor T7 through the twelfth transistor T12. Accordingly, the seventh transistor T7 may be turned on, and the high level inverter selection signal SFI may be inputted to the inverter output terminal Inv_OUT[i].

The eighth transistor T8 may be configured to switch electrical connection between the sixth terminal TM6 and the inverter output terminal Inv_OUT[i]. A gate electrode of the eighth transistor T8 may be connected (e.g., electrically connected) to the first Q node Q1[*i*]. The first Q node Q1[*i*] may function as the inverter input terminal Inv_IN[i]. In case that the eighth transistor T8 is turned on, the first low level voltage VSS1 may be applied to the inverter output terminal Inv_OUT[i].

The ninth transistor T9 may be configured to switch electrical connection between the sixth terminal TM6 and the first Q node Q1[*i*]. A gate electrode of the ninth transistor T9 may be connected (e.g., electrically connected) to the 12*b*-th terminal TM12*b*. In case that the ninth transistor T9 is turned on, the first low level voltage VSS1 may be applied to the first Q node Q1[*i*].

The tenth transistor T10 may be configured to switch electrical connection between the sixth terminal TM6 and the first Q node Q1[*i*]. A gate electrode of the tenth transistor T10 may be connected (e.g., electrically connected) to the inverter output terminal Inv_OUT[i]. In case that the tenth transistor T10 is turned on, the first low level voltage VSS1 may be applied to the first Q node Q1[*i*].

The eleventh transistor T11 may be configured to switch electrical connection between the sixth terminal TM6 and the seventeenth transistor T17. A gate electrode of the eleventh transistor T11 may be connected (e.g., electrically connected) to the eighth terminal TM8. In case that the eleventh transistor T11 is turned on, the first low level voltage VSS1 is applied to the seventeenth transistor T17.

The twelfth transistor T12 may be connected (e.g., electrically connected) between the seventh terminal TM7 and the seventh transistor T7 and may be connected (e.g., electrically connected) between the seventh terminal TM7 and the thirteenth transistor T13. A gate electrode of the twelfth transistor T12 may be connected (e.g., electrically connected) to the seventh terminal TM7 and the seventh transistor T7.

The thirteenth transistor T13 may be configured to switch electrical connection between the gate electrode of the seventh transistor T7 and the sixteenth terminal TM16. A gate electrode of the thirteenth transistor T13 may be connected (e.g., electrically connected) to the inverter input terminal Inv_IN[i]. In case that the thirteenth transistor T13 is turned on, the second power supply voltage VSS2 may be applied to the gate electrode of the seventh transistor T7. The thirteenth terminal T13 may be connected (e.g., electrically connected) to the twelfth transistor T12.

The fourteenth transistor T14 may be configured to switch electrical connection between the third terminal TM3 and the fifteenth transistor T15. A gate electrode of the fourteenth transistor T14 may be connected (e.g., electrically connected) to the nineteenth transistor T19. A gate electrode of the fourteenth transistor T14 may be connected (e.g., electrically connected) to an electrode of the third capacitor C3. In case that the fourteenth transistor T14 is turned on, the high level voltage SGH may be applied to the fifteenth transistor T15 and an electrode of the third capacitor C3. The fourteenth terminal T14 may be connected (e.g., electrically connected) to the sixteenth transistor T16.

The fifteenth transistor T15 may be configured to switch electrical connection between the fourteenth terminal T14 and the first Q node Q1[*i*]. A gate electrode of the fifteenth transistor T15 may be connected (e.g., electrically connected) to the eighth terminal TM8. In case that the fifteenth transistor T15 is turned on, the fourteenth transistor T14 may be connected (e.g., electrically connected) to the first Q node Q1[*i*]. The fifteenth transistor T15 may be connected (e.g., electrically connected) to a gate electrode of the sixteenth transistor T16.

In case that the fourteenth transistor T14 and the fifteenth transistor T15 are all turned on, the sixteenth transistor T16 may be turned on and the high level voltage SGH or a voltage corresponding thereto may be applied to the first Q node Q1[*i*].

The sixteenth terminal T16 may be connected (e.g., electrically connected) to the third terminal TM3. The gate electrode of the sixteenth transistor T16 may be connected (e.g., electrically connected) to the first Q node Q1[*i*]. The sixteenth transistor T16 may be connected (e.g., electrically connected) to the fourth and fifth transistors T4 and T5.

The seventeenth transistor T17 may be configured to switch electrical connection between the eleventh terminal T11 and the inverter output terminal Inv_OUT[i]. A gate electrode of the seventeenth transistor T17 may be connected (e.g., electrically connected) to an electrode of the third capacitor C3. In case that the seventeenth transistor T17 is turned on, the eleventh transistor T11 and the inverter output terminal Inv_OUT[i] may be connected (e.g., electrically connected) to each other.

The eighteenth transistor T18 may be configured to switch electrical connection between the sixth terminal TM6 and the first Q node Q1[*i*]. A gate electrode of the eighteenth transistor T18 may be connected (e.g., electrically connected) to the eighth terminal TM8. In case that the eighteenth transistor T18 is turned on, the first low level voltage VSS1 may be applied to the first Q node Q1[*i*].

The nineteenth transistor T19 may be configured to switch electrical connection between the tenth terminal TM10 and a terminal of the third transistor C3. A gate electrode of the nineteenth transistor T19 may be connected (e.g., electrically connected) to the ninth terminal TM9. In case that the high level voltage (e.g., the first sampling signal SRS having a turn-on level) is applied to the ninth terminal TM9, the third capacitor C3 may store the first carry signal (e.g., the i−2-th first carry signal CRa[i−2]).

The twentieth transistor T20 may be configured to switch electrical connection between the fourteenth terminal TM14 and the sixteenth terminal TM16. A gate electrode of the twentieth transistor T20 may be connected (e.g., electrically connected) to the 12*a*-th terminal TM12*a*. In case that the twentieth transistor T20 is turned on, the second low level voltage VSS2 may be outputted to the fourteenth terminal TM14.

The twenty-first transistor T21 may be configured to switch electrical connection between the fourteenth terminal TM14 and the sixteenth terminal TM16. A gate electrode of the twenty-first transistor T21 may be connected (e.g., electrically connected) to the inverter output terminal Inv_OUT[i]. In case that the twenty-first transistor T21 is turned on, the second low level voltage VSS2 may be outputted to the fourteenth terminal TM14.

The first capacitor C1 may include an electrode connected (e.g., electrically connected) to the first Q node Q1[*i*], and another electrode connected (e.g., electrically connected) to the thirteenth terminal TM13.

The second capacitor C2 may include an electrode connected (e.g., electrically connected) to the first Q node Q1[*i*], and another electrode connected (e.g., electrically connected) to the fourteenth terminal TM14.

The third capacitor C3 may include an electrode connected (e.g., electrically connected) to the gate electrode of the fourteenth transistor T14, and another electrode connected (e.g., electrically connected) to the third terminal TM3.

The process of selecting one of the scan stage circuits by the first sampling signal SRS is described below.

Referring to FIG. 18, in case that the turn-on level voltage (e.g., the first sampling signal SRS) is applied to the ninth terminal TM9, the seventeenth and nineteenth transistors T17 and T19 may be turned on.

At this time, in case that the first carry signal CRa[i−2] having a low level (or a turn-off level) is inputted to the tenth terminal TM10, the turn-off level voltage may be stored in an electrode of the third capacitor C3.

In contrast, in case that the first carry signal CRa[i−2] having a high level (or a turn-on level) is inputted to the tenth terminal TM10, the fourteenth transistor T14 may be turned on and the high level voltage (the high level voltage of the first carry signal CRa[i−2]) may be stored in an electrode of the third capacitor C3.

The scan stage circuit selected by the first sampling signal SRS may indicate a scan stage circuit in which the high level first carry signal CRa[i−2] is stored in the third capacitor C3 among the scan stage circuits.

For the selected scan stage circuit, in case that the high level voltage (e.g., the second sampling signal STR having a turn-on level) is applied to the eighth terminal TM8, the eleventh transistor T11 is turned on and the first low level voltage VSS1 is applied to the inverter output terminal Inv_OUT[i]. The fifteenth transistor T15 is turned on and the high level voltage SGH is applied to the first Q node Q1[*i*]. Accordingly, the first and sixth transistors T1 and T6 may be turned on.

Figure 19:
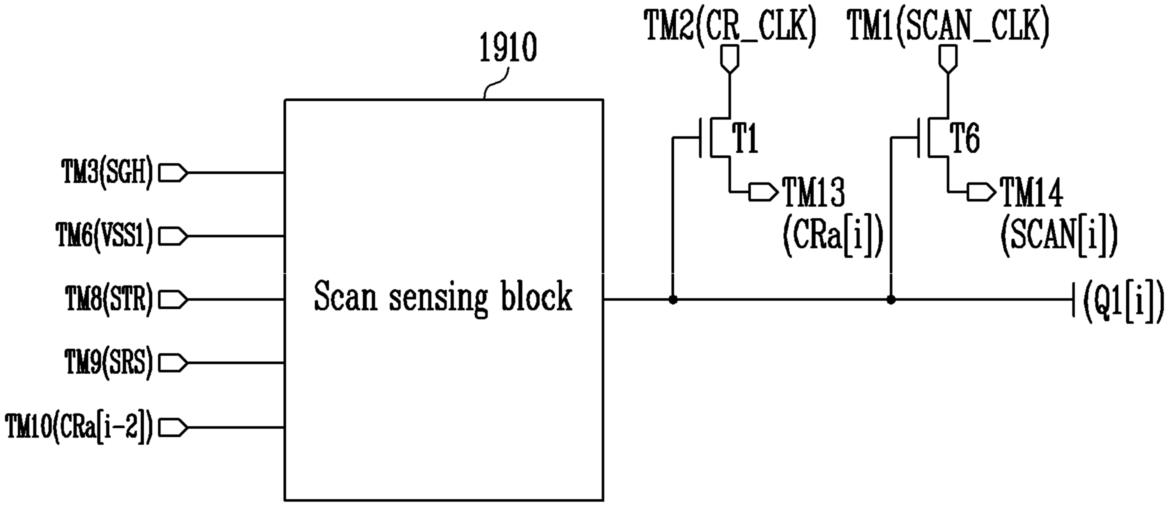
FIG. 19 is another schematic diagram illustrating a scan sensing block of the scan stage circuit.

FIG. 19 is another schematic diagram illustrating a scan sensing block 1910 of the scan stage circuit.

Referring to FIG. 19, the scan sensing block 1910 may be connected (e.g., electrically connected) to a third terminal TM3, a sixth terminal TM6, an eighth terminal TM8, a ninth terminal TM9, and a tenth terminal TM10. The scan sensing block 1910 may be connected (e.g., electrically connected) to a first Q node (e.g., an i-th first Q node Q1[*i*]).

A first transistor T1 (corresponding to the first transistor T1 of FIG. 18) may be configured to switch electrical connection between a second terminal TM2 and a thirteenth terminal TM13 in response to a voltage of the first Q node Q1[*i*]. A first carry signal (e.g., an i-th first carry signal CRa[i]) may be outputted from the thirteenth terminal TM13.

A sixth transistor T6 (corresponding to the sixth transistor T6 of FIG. 18) may be configured to switch electrical connection between a first terminal TM1 and a fourteenth terminal TM14 in response to the voltage of the first Q node Q1[*i*]. A scan signal (e.g., an i-th scan signal SCAN[i]) may be outputted from the fourteenth terminal TM14.

The scan sensing block 1910 may be configured to store a first carry signal CRa[i−2] in response to a first sampling signal SRS and a first carry signal CRa[i−2]. The scan sensing block 1910 may supply a high level voltage SGH to the first Q node Q1[*i*] in response to a second sampling signal STR. The first transistor T1 may be turned on by receiving the high level voltage SGH, and a carry clock signal CR_CLK may be outputted to the thirteenth terminal TM13 as the first carry signal CRa[i]. The sixth transistor T6 may be turned on by receiving the high level voltage SGH, and a scan clock signal SCAN_CLK may be outputted to the fourteenth terminal TM14 as the scan signal SCAN[i].

Figure 20:
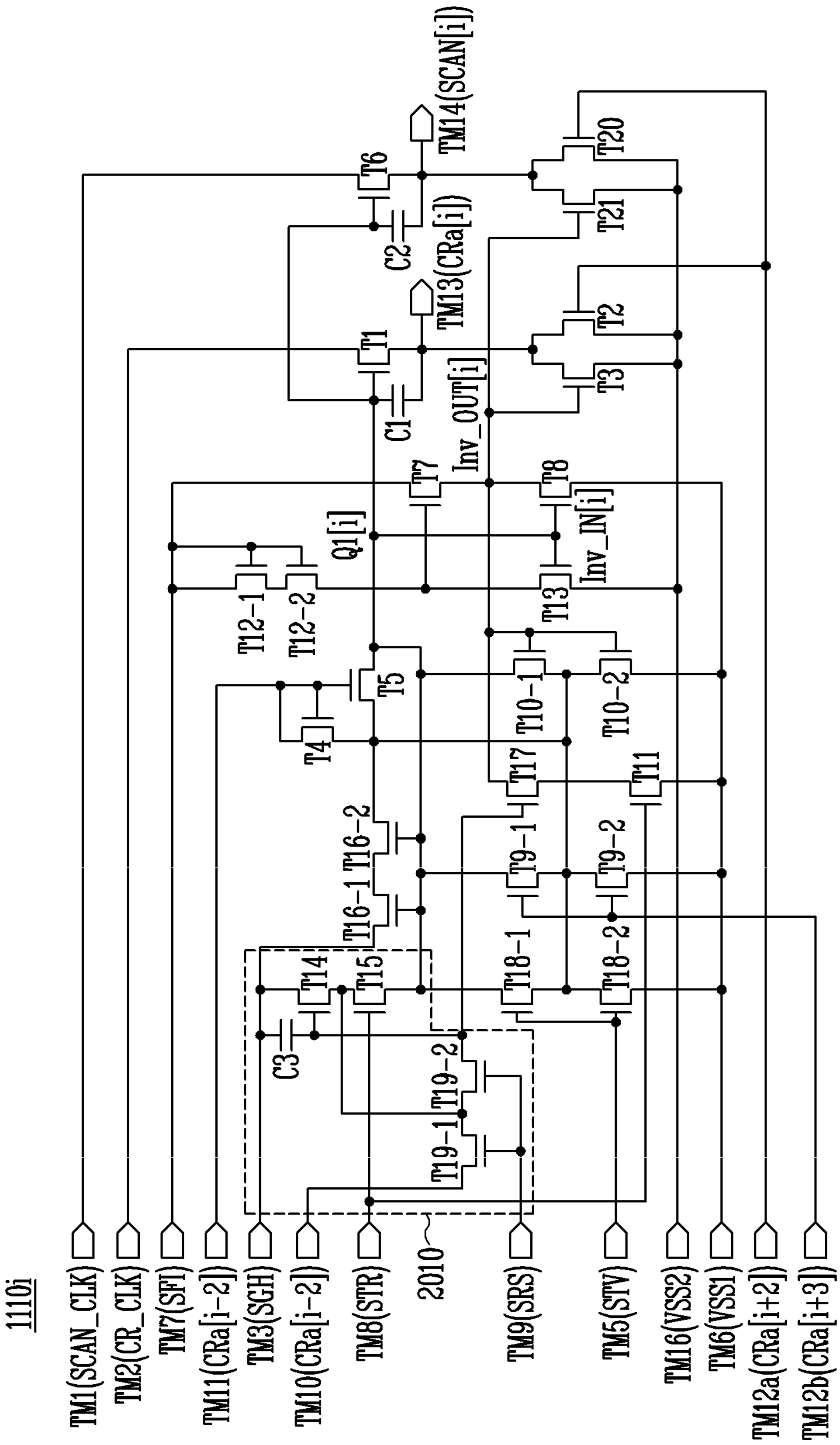
FIG. 20 is a schematic diagram illustrating the scan sensing block in the scan stage circuit of FIG. 18.

FIG. 20 is a schematic diagram illustrating a scan sensing block 2010 in the scan stage circuit of FIG. 18.

Referring to FIG. 20, the scan sensing block 2010 in the i-th scan stage circuit 1110*i* (refer to FIG. 12) may include fourteenth, fifteenth, and nineteenth transistors T14, T15, and T19 and a third capacitor C3.

The scan sensing block 1910 illustrated in FIG. 19 may be implemented as the scan sensing block 2010 illustrated in FIG. 20.

Figure 21:
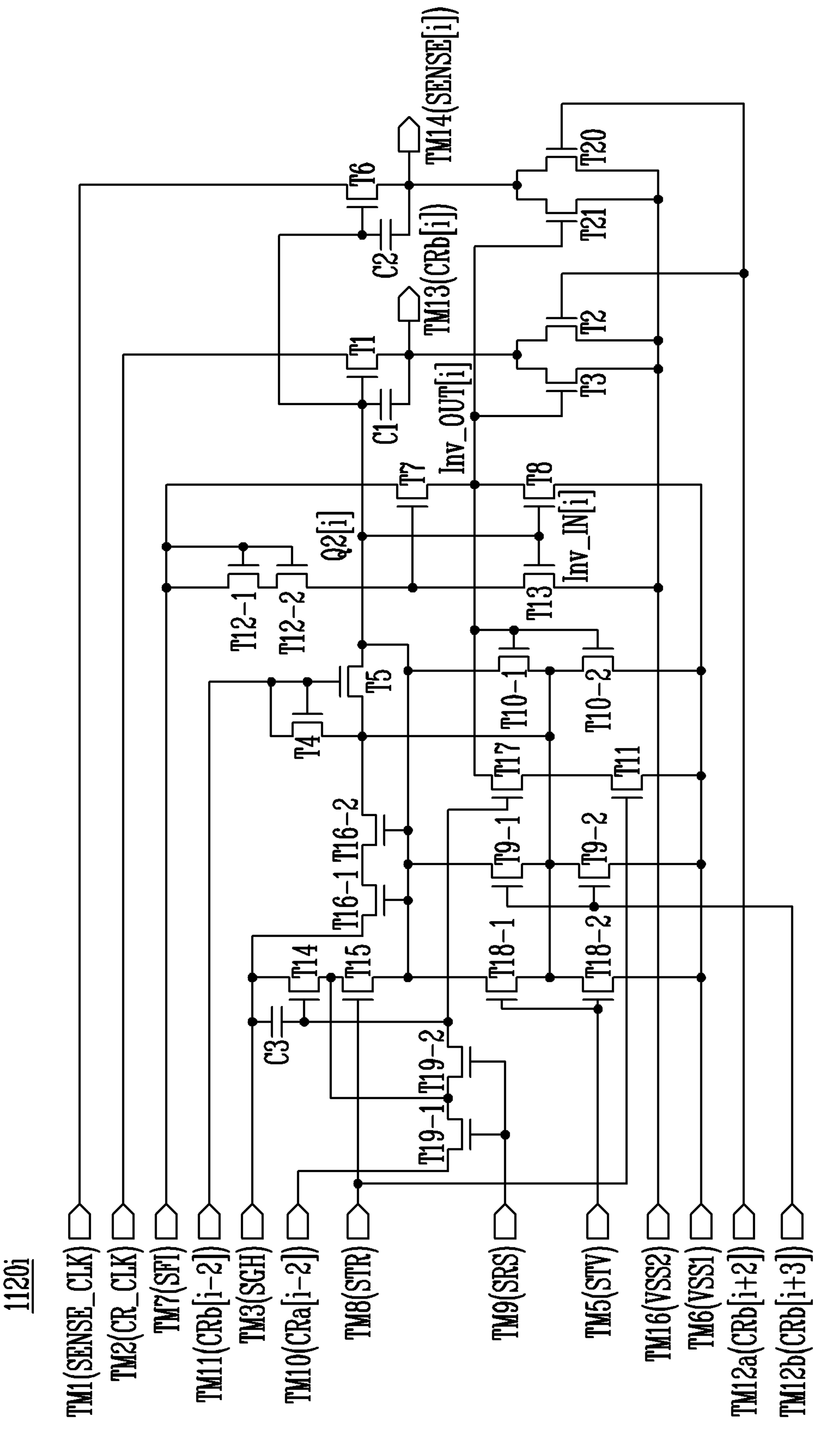
FIG. 21 is another schematic diagram of an equivalent circuit of a sense stage circuit in accordance with embodiments of the disclosure.

FIG. 21 is another schematic diagram of an equivalent circuit of the sense stage circuit 1120*i* in accordance with embodiments of the disclosure.

The i-th sense stage circuit 1120*i* may include one or more transistors and one or more capacitor elements. Referring to FIG. 21, the i-th sense stage circuit 1120*i* may include first to twenty-first transistors T1 to T21 and first, second, and third capacitors C1, C2, and C3.

At least one of the first to twenty-first transistors T1 to T21 may include two sub-transistors connected in series to each other and may be configured to be controlled by a single signal (e.g., voltage). For example, the eighteenth transistor T18 may include two sub-transistors T18-1 and T18-2 connected in series to each other, and the two sub-transistors T18-1 and T18-2 may be controlled by the first start signal STV. FIG. 18 illustrates an embodiment, in which the ninth, tenth, twelfth, sixteenth, eighteenth, and nineteenth transistors T9, T10, T12, T16, T18, and T19 each include two sub-transistors and the remaining transistors are each implemented as a single transistor, by way of example. However, embodiments of the disclosure are not limited thereto. For example, at least one of the ninth, tenth, twelfth, sixteenth, eighteenth, and nineteenth transistors T9, T10, T12, T16, T18, and T19 may be implemented as a single transistor, and at least one of the remaining transistors may include two or more sub-transistors.

Referring to FIG. 21, the sense stage circuit 1120*i* in accordance with embodiments of the disclosure may include first to third terminals TM1 to TM3, fifth to fourteenth terminals TM5 to TM14, and a sixteenth terminal TM16.

A sense clock signal SENSE_CLK may be inputted to the first terminal TM1. A carry clock signal CR_CLK may be inputted to the second terminal TM2. A high level voltage SGH may be applied to the third terminal TM3. A first start signal STV may be inputted to the fifth terminal TM5. A first low level voltage VSS1 may be applied to the sixth terminal TM6. An inverter selection signal SFI may be inputted to the seventh terminal TM7. A second sampling signal STR may be inputted to the eighth terminal TM8. A first sampling signal SRS may be inputted to the ninth terminal TM9. A first carry signal (e.g., an i−2-th first carry signal CRa[i−2]) may be inputted to the tenth terminal TM10. A second carry signal (e.g., an i−2-th second carry signal CRb[i−2]) may be inputted to the eleventh terminal TM11. A second carry signal (e.g., an i+2—the second carry signal CRb[i+2]) may be inputted to the 12*a*-th terminal TM12*a*. A second carry signal (e.g., an i+3—the second carry signal CRb[i+3]) may be inputted to the 12*b*-th twelfth terminal TM12*b*. A second carry signal CRb[i] may be outputted to the thirteenth terminal TM13. A sense signal SENSE[i] may be outputted to the fourteenth terminal TM14. A second low level voltage VSS2 may be applied to the sixteenth terminal TM16.

In accordance with embodiments, the first carry signal CRa inputted to the tenth terminal TM10 and the second carry signals CRb inputted to the eleventh terminal TM11, the 12*a*-th terminal TM12*a*, and the 12*b*-th terminal TM12*b* may be designed to be different from the illustrated carry signals. For example, the first carry signal CRa outputted from one of the preceding scan stage circuits may be inputted to the tenth terminal TM10. For example, the second carry signal CRb outputted from one of the preceding sense stage circuits may be inputted to the eleventh terminal TM11. For example, the second carry signal CRb outputted from one of the subsequent sense stage circuits may be inputted to the 12*a*-th terminal TM12*a*. For example, the second carry signal CRb outputted from one of the subsequent sense stage circuits may be inputted to the 12*b*-th terminal TM12*b*.

The first to twenty-first transistors T1 to T21 and the first to third capacitors C1, C2, and C3 of the i-th sense stage circuit 1120*i* are described below.

The first transistor T1 may be configured to switch electrical connection between the second terminal TM2 and the thirteenth terminal TM13. A gate electrode of the first transistor T1 may be electrically connected to a second Q node Q2[*i*]. In a period in which the high level voltage is applied to the second Q node Q2[*i*], the carry clock signal CR_CLK may be outputted to the thirteenth terminal TM13 as the second carry signal CRb[i]. A gate electrode of the first transistor T1 may be connected (e.g., electrically connected) to an electrode of the first capacitor C1.

The second transistor T2 may be configured to switch electrical connection between the thirteenth terminal TM13 and the sixteenth terminal TM16. A gate electrode of the second transistor T2 may be connected (e.g., electrically connected) to the 12*a*-th terminal TM12*a*. In case that the second transistor T2 is turned on, the second low level voltage VSS2 may be outputted to the thirteenth terminal TM13.

The third transistor T3 may be configured to switch electrical connection between the thirteenth terminal TM13 and the sixteenth terminal TM16. A gate electrode of the third transistor T3 may be electrically connected to the inverter output terminal Inv_OUT[i]. In case that the third transistor T3 is turned on, the second low level voltage VSS2 may be outputted to the thirteenth terminal TM13.

The fourth and fifth transistors T4 and T5 may be configured to switch electrical connection between the eleventh terminal TM11 and the second Q node Q2[*i*].

The fourth transistor T4 may be connected (e.g., electrically connected) between the eleventh terminal TM11 and the fifth transistor T5. A gate electrode of the fourth transistor T4 may be connected (e.g., electrically connected) to the eleventh terminal TM11 and a gate electrode of the fifth transistor T5.

The fifth transistor T5 may be connected (e.g., electrically connected) between the fourth transistor T4 and the second Q node Q2[*i*]. A gate electrode of the fifth transistor T5 may be connected (e.g., electrically connected) to the eleventh terminal TM11 and the gate electrode of the fourth transistor T4.

The fourth and fifth transistors T4 and T5 may be connected (e.g., electrically connected) to the ninth, tenth, sixteenth, and eighteenth transistors T9, T10, T16, and T18.

The sixth transistor T6 may be configured to switch electrical connection between the first terminal TM1 and the fourteenth terminal TM14. A gate electrode of the sixth transistor T6 may be connected (e.g., electrically connected) to the second Q node Q2[*i*]. In a period in which the high level voltage is applied to the second Q node Q2[*i*], the sense clock signal SENSE_CLK may be outputted to the fourteenth terminal TM14 as the sense signal SENSE[i]. The gate electrode of the sixth transistor T6 may be connected (e.g., electrically connected) to an electrode of the second capacitor C2.

The seventh transistor T7 may be configured to switch electrical connection between the seventh terminal TM7 and the inverter output terminal Inv_OUT[i]. A gate electrode of the seventh transistor T7 may be connected (e.g., electrically connected) to the twelfth transistor T12 and the thirteenth transistor T13.

In case that the high level voltage is applied to the second Q node Q2[*i*], the high level voltage may be applied to the inverter input terminal Inv_IN[i]. The thirteenth transistor T13 may be turned on so that the second low level voltage VSS2 may be applied to the gate electrode of the seventh transistor T7, and the eighth transistor T8 may be turned on so that the first low level voltage VSS1 may be applied to the inverter output terminal Inv_OUT[i]. In case that the high level inverter selection signal SFI is inputted to the seventh terminal TM7, the seventh terminal TM7 may be electrically connected to the sixth terminal TM6 through the seventh transistor T7 and the eighth transistor T8, and thus, the inverter selection signal SFI may be outputted through the sixth terminal TM6. The first low level voltage VSS1 may be applied to the inverter output terminal INV_OUT[i].

In case that the low level voltage is applied to the second Q node Q2[*i*] the low level voltage may be applied to the inverter output terminal Inv_OUT[i]. The seventh transistor T7 may not be electrically connected to the sixth terminal TM6 and the sixteenth terminal TM16. In case that the high level inverter selection signal SFI is inputted, the high level voltage may be inputted to the gate electrode of the seventh transistor T7 through the twelfth transistor T12. Accordingly, the seventh transistor T7 may be turned on, and the high level inverter selection signal SFI may be inputted to the inverter output terminal Inv_OUT[i].

The eighth transistor T8 may be configured to switch electrical connection between the sixth terminal TM6 and the inverter output terminal Inv_OUT[i]. A gate electrode of the eighth transistor T8 may be connected (e.g., electrically connected) to the second Q node Q2[*i*]. The second Q node Q2[*i*] may function as the inverter input terminal Inv_IN[i]. In case that the eighth transistor T8 is turned on, the first low level voltage VSS1 may be applied to the inverter output terminal Inv_OUT[i].

The ninth transistor T9 may be configured to switch electrical connection between the sixth terminal TM6 and the second Q node Q2[*i*]. A gate electrode of the ninth transistor T9 may be connected (e.g., electrically connected) to the 12*b*-th terminal TM12*b*. In case that the ninth transistor T9 is turned on, the first low level voltage VSS1 may be applied to the second Q node Q2[*i*].

The tenth transistor T10 may be configured to switch electrical connection between the sixth terminal TM6 and the second Q node Q2[*i*]. A gate electrode of the tenth transistor T10 may be connected (e.g., electrically connected) to the inverter output terminal Inv_OUT[i]. In case that the tenth transistor T10 is turned on, the first low level voltage VSS1 may be applied to the second Q node Q2[*i*].

The eleventh transistor T11 may be configured to switch electrical connection between the sixth terminal TM6 and the seventeenth transistor T17. A gate electrode of the eleventh transistor T11 may be connected (e.g., electrically connected) to the eighth terminal TM8. In case that the eleventh transistor T11 is turned on, the first low level voltage VSS1 may be applied to the seventeenth transistor T17.

The twelfth transistor T12 may be connected (e.g., electrically connected) between the seventh terminal TM7 and the seventh transistor T7 and may be connected (e.g., electrically connected) between the seventh terminal TM7 and the thirteenth transistor T13. A gate electrode of the twelfth transistor T12 may be connected (e.g., electrically connected) to the seventh terminal TM7 and the seventh transistor T7.

The thirteenth transistor T13 may be configured to switch electrical connection between the gate electrode of the seventh transistor T7 and the sixteenth terminal TM16. A gate electrode of the thirteenth transistor T13 may be connected (e.g., electrically connected) to the inverter input terminal Inv_IN[i]. In case that the thirteenth transistor T13 is turned on, the second power supply voltage VSS2 may be applied to the gate electrode of the seventh transistor T7. The thirteenth terminal T13 may be connected (e.g., electrically connected) to the twelfth transistor T12.

The fourteenth transistor T14 may be configured to switch electrical connection between the third terminal TM3 and the fifteenth transistor T15. A gate electrode of the fourteenth transistor T14 may be connected (e.g., electrically connected) to the nineteenth transistor T19. A gate electrode of the fourteenth transistor T14 may be connected (e.g., electrically connected) to an electrode of the third capacitor C3. In case that the fourteenth transistor T14 is turned on, the high level voltage SGH may be applied to the fifteenth transistor T15 and an electrode of the third capacitor C3. The fourteenth terminal T14 may be connected (e.g., electrically connected) to the sixteenth transistor T16.

The fifteenth transistor T15 may be configured to switch electrical connection between the fourteenth terminal T14 and the second Q node Q2[*i*]. A gate electrode of the fifteenth transistor T15 may be connected (e.g., electrically connected) to the eighth terminal TM8. In case that the fifteenth transistor T15 is turned on, the fourteenth transistor T14 may be connected (e.g., electrically connected) to the second Q node Q2[*i*]. The fifteenth transistor T15 may be connected (e.g., electrically connected) to a gate electrode of the sixteenth transistor T16.

In case that the fourteenth transistor T14 and the fifteenth transistor T15 are all turned on, the sixteenth transistor T16 may be turned on and the high level voltage SGH or a voltage corresponding thereto is applied to the second Q node Q2[*i*].

The sixteenth terminal T16 may be connected (e.g., electrically connected) to the third terminal TM3. A gate electrode of the sixteenth transistor T16 may be connected (e.g., electrically connected) to the second Q node Q2[*i*]. The sixteenth transistor T16 may be connected (e.g., electrically connected) to the fourth and fifth transistors T4 and T5.

The seventeenth transistor T17 may be configured to switch electrical connection between the eleventh terminal T11 and the inverter output terminal Inv_OUT[i]. A gate electrode of the seventeenth transistor T17 may be connected (e.g., electrically connected) to an electrode of the third capacitor C3. In case that the seventeenth transistor T17 is turned on, the eleventh transistor T11 and the inverter output terminal Inv_OUT[i] may be connected (e.g., electrically connected) to each other.

The eighteenth transistor T18 may be configured to switch electrical connection between the sixth terminal TM6 and the second Q node Q2[*i*]. A gate electrode of the eighteenth transistor T18 may be connected (e.g., electrically connected) to the eighth terminal TM8. In case that the eighteenth transistor T18 is turned on, the first low level voltage VSS1 may be applied to the second Q node Q2[*i*].

The nineteenth transistor T19 may be configured to switch electrical connection between the tenth terminal TM10 and a terminal of the third transistor C3. A gate electrode of the nineteenth transistor T19 may be connected (e.g., electrically connected) to the ninth terminal TM9. In case that the high level voltage (e.g., the first sampling signal SRS having a turn-on level) is applied to the ninth terminal TM9, the third capacitor C3 may store the first carry signal (e.g., the i−2-th first carry signal CRa[i−2]).

The twentieth transistor T20 may be configured to switch electrical connection between the fourteenth terminal TM14 and the sixteenth terminal TM16. A gate electrode of the twentieth transistor T20 may be connected (e.g., electrically connected) to the 12*a*-th terminal TM12*a*. In case that the twentieth transistor T20 is turned on, the second low level voltage VSS2 may be outputted to the fourteenth terminal TM14.

The twenty-first transistor T21 may be configured to switch electrical connection between the fourteenth terminal TM14 and the sixteenth terminal TM16. A gate electrode of the twenty-first transistor T21 may be connected (e.g., electrically connected) to the inverter output terminal Inv_OUT[i]. In case that the twenty-first transistor T21 is turned on, the second low level voltage VSS2 may be outputted to the fourteenth terminal TM14.

The first capacitor C1 may include an electrode connected (e.g., electrically connected) to the second Q node Q2[*i*], and another electrode connected (e.g., electrically connected) to the thirteenth terminal TM13.

The second capacitor C2 may include an electrode connected (e.g., electrically connected) to the second Q node Q2[*i*], and another electrode connected (e.g., electrically connected) to the fourteenth terminal TM14.

The third capacitor C3 may include an electrode connected (e.g., electrically connected) to the gate electrode of the fourteenth transistor T14, and another electrode connected (e.g., electrically connected) to the third terminal TM3.

The process of selecting one of the sense stage circuits by the first sampling signal SRS is described below.

Referring to FIG. 21, in case that the turn-on level voltage (e.g., the first sampling signal SRS) is applied to the ninth terminal TM9, the seventeenth and nineteenth transistors T17 and T19 may be turned on.

At this time, in case that the first carry signal CRa[i−2] having a low level (or a turn-off level) is inputted to the tenth terminal TM10, the turn-off level voltage may be stored in an electrode of the third capacitor C3.

In contrast, in case that the first carry signal CRa[i−2] having a high level (or a turn-on level) is inputted to the tenth terminal TM10, the fourteenth transistor T14 may be turned on and the high level voltage (the high level voltage of the first carry signal CRa[i−2]) may be stored in an electrode of the third capacitor C3.

The sense stage circuit selected by the first sampling signal SRS may indicate a sense stage circuit in which the high level first carry signal CRa[i−2] is stored in the third capacitor C3 among the sense stage circuits.

For the selected sense stage circuit, in case that the high level voltage (e.g., the second sampling signal STR having a turn-on level) is applied to the eighth terminal TM8, the eleventh transistor T11 may be turned on and the first low level voltage VSS1 may be applied to the inverter output terminal Inv_OUT[i]. The fifteenth transistor T15 may be turned on and the high level voltage SGH may be applied to the second Q node Q2[*i*]. Accordingly, the first and sixth transistors T1 and T6 may be turned on.

Figure 22:
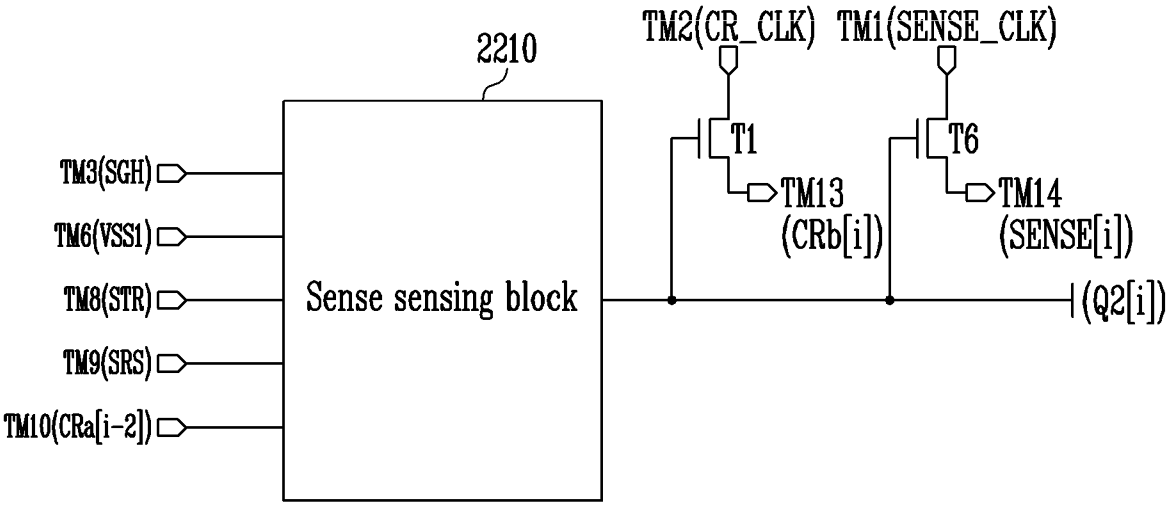
FIG. 22 is another schematic diagram illustrating a sense sensing block of the sense stage circuit.

FIG. 22 is another schematic diagram illustrating a sense sensing block 2210 of the sense stage circuit.

Referring to FIG. 22, the sense sensing block 2210 may be connected (e.g., electrically connected) to a third terminal TM3, a sixth terminal TM6, an eighth terminal TM8, a ninth terminal TM9, and a tenth terminal TM10. The sense sensing block 2210 may be connected (e.g., electrically connected) to a second Q node (e.g., an i-th second Q node Q2[*i*]).

A first transistor T1 (corresponding to the first transistor T1 of FIG. 21) may be configured to switch electrical connection between a second terminal TM2 and a thirteenth terminal TM13 in response to a voltage of the second Q node Q2[*i*]. A second carry signal (e.g., an i-th second carry signal CRb[i]) may be outputted from the thirteenth terminal TM13.

A sixth transistor T6 (corresponding to the sixth transistor T6 of FIG. 21) may be configured to switch electrical connection between the first terminal TM1 and a fourteenth terminal TM14 in response to the voltage of the second Q node Q2[*i*]. A sense signal (e.g., an i-th sense signal SENSE [i]) may be outputted from the fourteenth terminal TM14.

The sense sensing block 2210 may be configured to store a first carry signal CRa[i−2] in response to a first sampling signal SRS and a first carry signal CRa[i−2]. The sense sensing block 2210 may supply a high level voltage SGH to the second Q node Q2[*i*] in response to a second sampling signal STR. The first transistor T1 may be turned on by receiving the high level voltage SGH, and a carry clock signal CR_CLK may be outputted to the thirteenth terminal TM13 as the second carry signal CRb[i]. The sixth transistor T6 may be turned on by receiving the high level voltage SGH, and a sense clock signal SENSE_CLK may be outputted to the fourteenth terminal TM14 as the sense signal SENSE[i].

Figure 23:
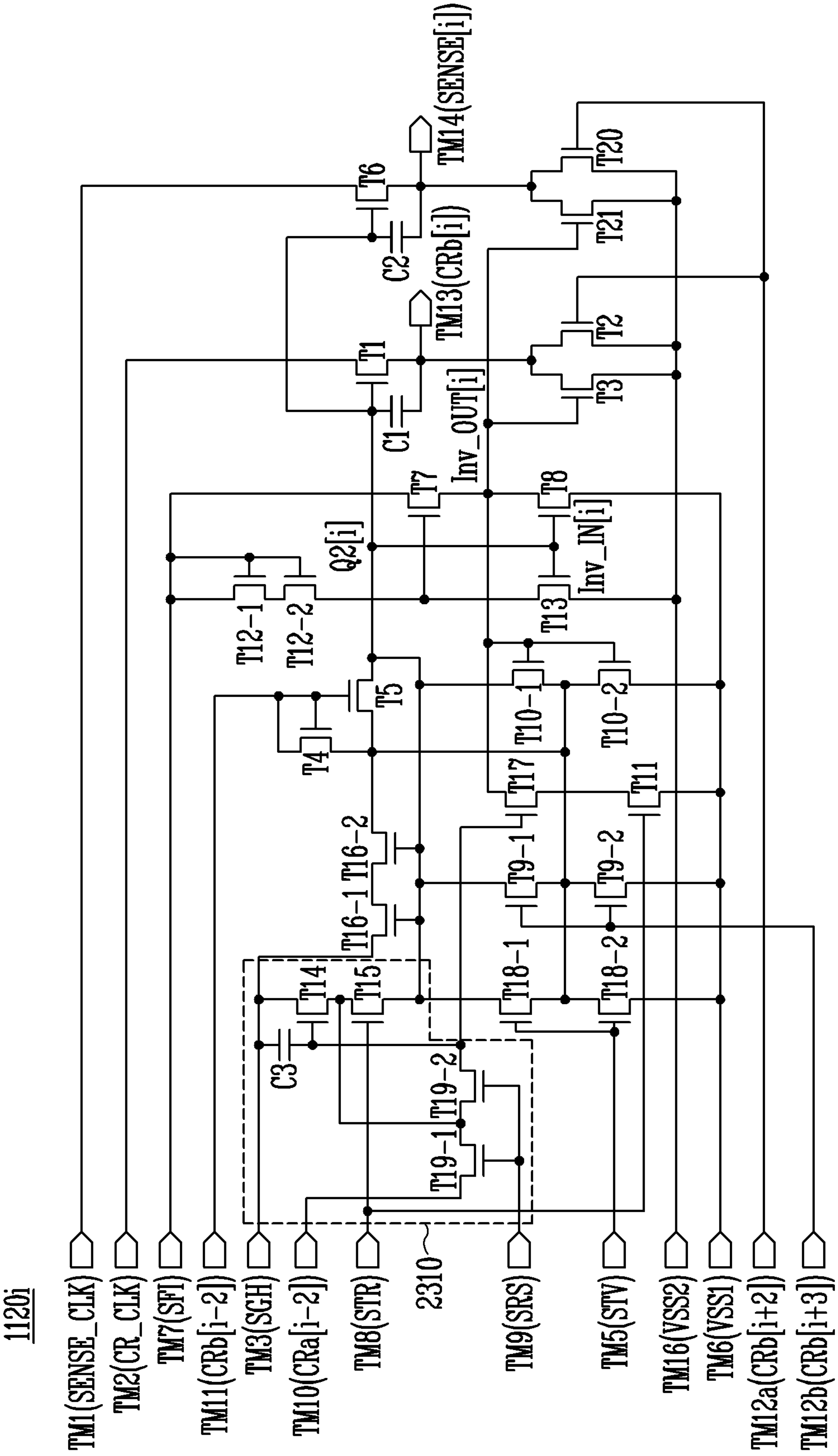
FIG. 23 is a schematic diagram illustrating the sense sensing block in the sense stage circuit of FIG. 21.

FIG. 23 is a schematic diagram illustrating a sense sensing block 2310 in the sense stage circuit of FIG. 21.

Referring to FIG. 23, the sense sensing block 2310 in the i-th sense stage circuit 1120*i* (refer to FIG. 12) may include fourteenth, fifteenth, and nineteenth transistors T14, T15, and T19 and a third capacitor C3.

The sense sensing block 2210 illustrated in FIG. 22 may be implemented as the sense sensing block 2310 illustrated in FIG. 23.

Figure 24:
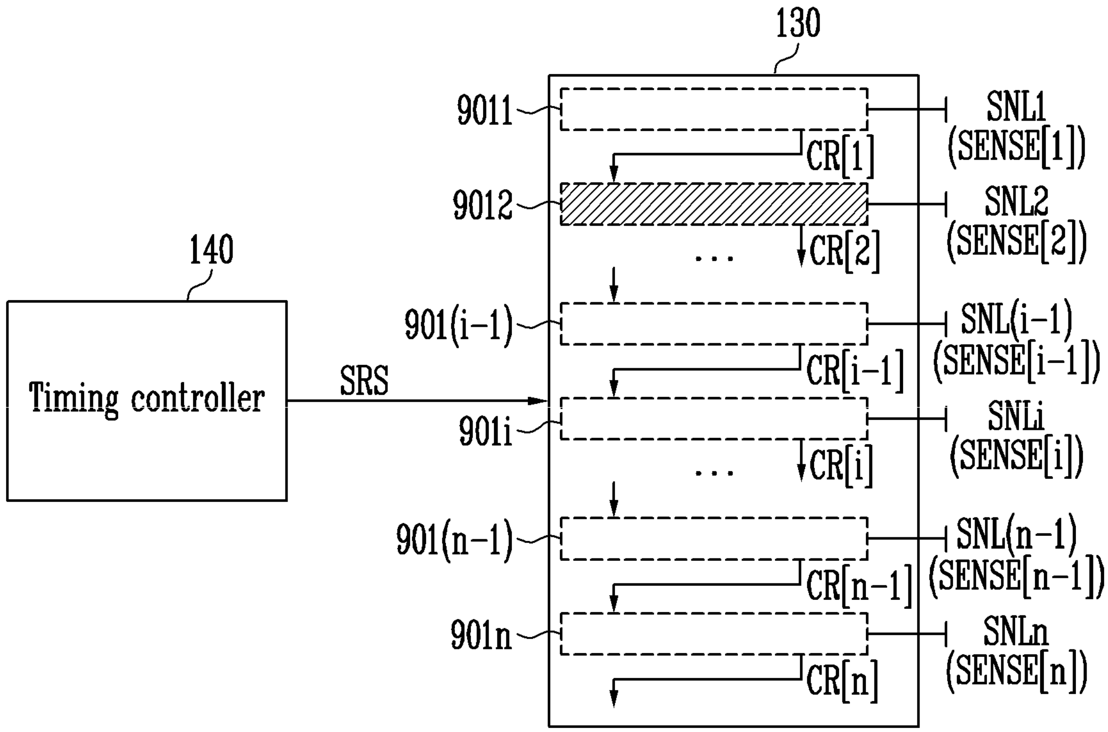
FIG. 24 is a schematic view of another embodiment in which a stage circuit is selected by a first sampling signal.
Figure 25:
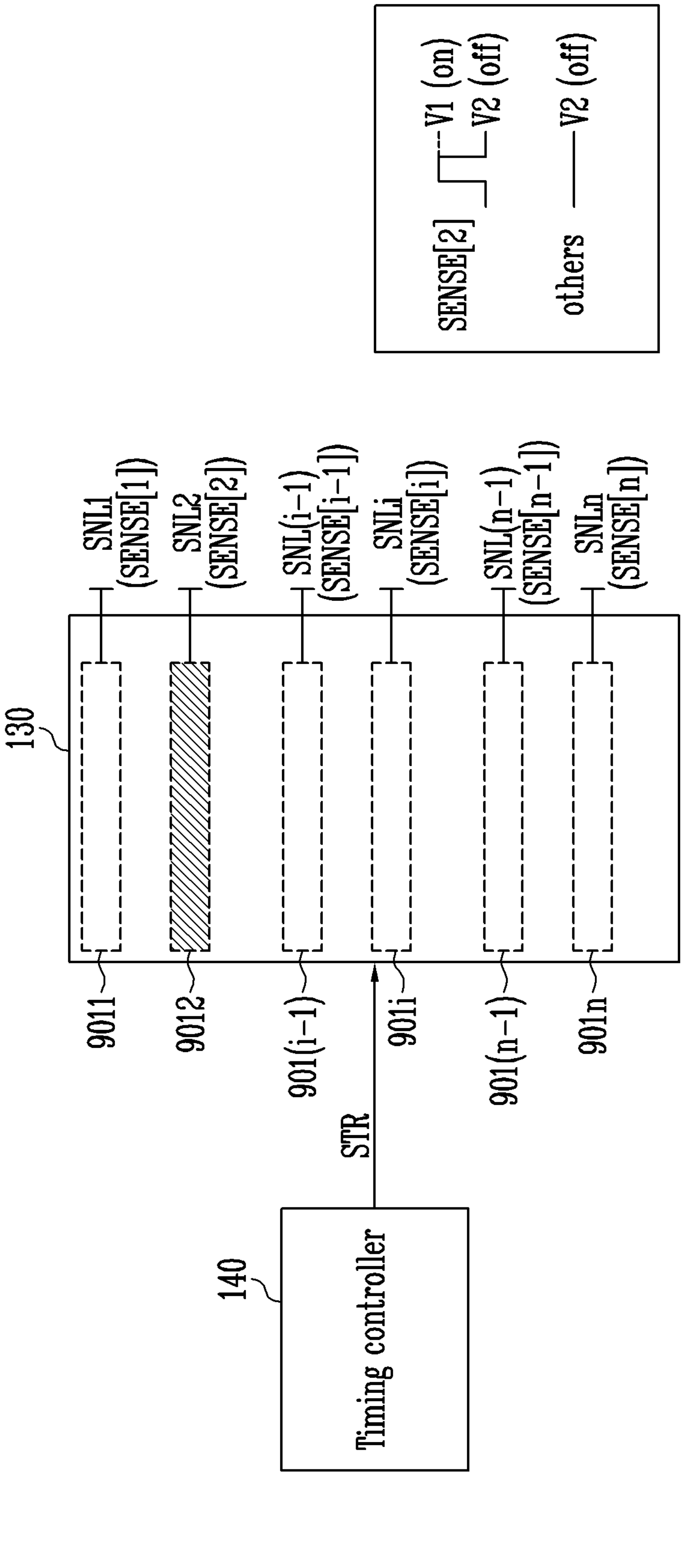
FIG. 25 is a schematic view of the case where the stage circuit selected in FIG. 24 outputs a sense signal in response to a second sampling signal.

FIG. 24 is a schematic view of another embodiment in which a stage circuit is selected by a first sampling signal SRS. FIG. 25 is a schematic view of the case where the stage circuit selected in FIG. 24 outputs a sense signal in response to a second sampling signal STR.

Compared to FIG. 9, in the scan driving circuit 130 in accordance with embodiments of the disclosure, only one stage circuit (e.g., the second stage circuit 9012) may be selected by the first sampling signal SRS.

Accordingly, only one stage circuit (e.g., the second stage circuit 9012) selected in advance from among the stage circuits 9011 to 901*n* may output a sense signal having a turn-on level (V1) in response to the second sampling signal STR.

In accordance with embodiments of the disclosure, the change in characteristic values (e.g., threshold voltage) of the first pixel transistor TR1 (refer to FIG. 3) can be accurately compensated for.

A scan driving circuit and a display device including the same in accordance with embodiments of the disclosure are improved in visibility so that images can be displayed at various refresh rates.

The drawings and detailed description of the disclosure referred to so far are merely illustrative. The embodiments are used only for the purpose of explaining the disclosure and are not used to limit the meaning or scope of the disclosure set forth in the claims. Therefore, those skilled in the art will appreciate that various modifications and other equivalent embodiments are possible.

What is claimed is:

1. A scan driving circuit, comprising:
a plurality of scan stage circuits that each output a first carry signal and a scan signal; and
a plurality of sense stage circuits that each output a second carry signal and a sense signal, wherein
each of the plurality of scan stage circuits receives the first carry signal from at least one preceding or subsequent scan stage circuit,
each of the plurality of sense stage circuits receives the second carry signal from at least one preceding or subsequent sense stage circuit,
each of the plurality of sense stage circuits receives the first carry signal from one of the at least one preceding or subsequent scan stage circuit,
each of the plurality of scan stage circuits outputs the first carry signal and the scan signal based on a voltage of a first Q node,
each of the plurality of sense stage circuits outputs the second carry signal and the sense signal based on a voltage of a second Q node,
the plurality of scan stage circuits reset the voltage of the first Q node in response to a first reset signal, and
the plurality of sense stage circuits reset the voltage of the second Q node in response to a second reset signal that is different from the first reset signal.

2. The scan driving circuit of claim 1, wherein
at least one of the plurality of scan stage circuits comprises:
a first terminal that receives a first sampling signal;
a second terminal that receives a second sampling signal;
a third terminal that receives the first carry signal;
a scan sensing block connected to the first terminal, the second terminal, the third terminal, and the first Q node;
a fourth terminal that outputs the first carry signal generated in response to the voltage of the first Q node; and
a fifth terminal that outputs the scan signal generated in response to the voltage of the first Q node.

3. The scan driving circuit of claim 1, wherein
at least one of the plurality of sense stage circuits comprises:
a first terminal that receives a first sampling signal;
a second terminal that receives a second sampling signal;
a third terminal that receives the first carry signal;
a sense sensing block connected to the first terminal, the second terminal, the third terminal, and the second Q node;
a fourth terminal that outputs the second carry signal generated in response to the voltage of the second Q node; and
a fifth terminal that outputs the sense signal generated in response to the voltage of the second Q node, and
the sense sensing block stores a high level voltage in response to the first sampling signal and the first carry signal and applies the stored high level voltage to the second Q node in response to the second sampling signal.

4. The scan driving circuit of claim 3, wherein
at least one of the plurality of sense stage circuits comprises:
a sixth terminal to which the high level voltage is applied;
a seventh terminal to which a low level voltage is applied;

an eighth terminal that receives a carry clock signal; and a ninth terminal that receives a sense clock signal.

5. The scan driving circuit of claim 4, wherein the sense stage circuit further comprises a tenth terminal to which the high level voltage is applied, and the sense sensing block comprises:

a twenty-first transistor including a gate electrode connected to the first terminal and that switches electrical connection between the third terminal and a twenty-third transistor;

a twenty-second transistor that switches electrical connection between the tenth terminal and the twenty-first transistor and to switch electrical connection between the tenth terminal and the twenty-third transistor;

the twenty-third transistor including a gate electrode connected to the first terminal and that switches electrical connection between the gate electrode of the twenty-first transistor and a gate electrode of the twenty-second transistor;

a twenty-fourth transistor including a gate electrode connected to the gate electrode of the twenty-second transistor, and electrically connected to the sixth terminal;

a twenty-fifth transistor including a gate electrode electrically connected to the second terminal and that switches electrical connection between the twenty-fourth transistor and the second Q node;

a seventh transistor including a gate electrode electrically connected to the gate electrode of the twenty-fourth transistor, and electrically connected to the seventh terminal; and a capacitor including an electrode electrically connected to the gate electrode of the twenty-fourth transistor and another electrode electrically connected to the sixth terminal.

6. The scan driving circuit of claim 4, wherein the sense sensing block comprises:

a fourteenth transistor electrically connected to the sixth terminal;

a nineteenth transistor that switches electrical connection between the third terminal and a gate electrode of the fourteenth transistor and including a gate electrode electrically connected to the first terminal;

a fifteenth transistor including a gate electrode electrically connected to the second terminal and that switches electrical connection between the fourteenth transistor and the second Q node; and a capacitor including an electrode electrically connected to the fourteenth transistor and another electrode electrically connected to the sixth terminal.

7. A scan driving circuit, comprising:

a plurality of scan stage circuits; and a plurality of sense stage circuits, wherein at least one of the plurality of scan stage circuits comprises:

a first terminal that receives a first sampling signal;

a second terminal that receives a second sampling signal;

a third terminal that receives a first carry signal from one preceding scan stage circuit among the plurality of scan stage circuits;

a scan sensing block connected to the first terminal, the second terminal, the third terminal, and a first Q node of the scan stage circuit;

a fourth terminal that outputs an i-th first carry signal (i is an integer greater than or equal to 1) generated in response to a voltage of the first Q node; and a fifth terminal that outputs an i-th scan signal generated in response to the voltage of the first Q node, and at least one of the plurality of sense stage circuits comprises:

a first terminal that receives the first sampling signal;

a second terminal that receives the second sampling signal;

a third terminal that receives the i-th first carry signal;

a sense sensing block connected to the first terminal, the second terminal, the third terminal, and a second Q node of the sense stage circuit;

a fourth terminal that outputs a j-th second carry signal (j is an integer greater than or equal to i) generated in response to a voltage of the second Q node; and a fifth terminal that outputs a j-th sense signal generated in response to the voltage of the second Q node.

8. The scan driving circuit of claim 7, wherein the sense sensing block stores a high level voltage in response to the first sampling signal and the i-th first carry signal and outputs the stored high level voltage in response to the second sampling signal.

9. The scan driving circuit of claim 8, wherein the one of the plurality of sense stage circuits comprises:

a sixth terminal to which the high level voltage is applied;

a seventh terminal to which a low level voltage is applied;

an eighth terminal that receives a carry clock signal; and a ninth terminal that receives a sense clock signal.

10. The scan driving circuit of claim 9, wherein the at least one of the plurality of sense stage circuits further comprises a tenth terminal to which the high level voltage is applied, and the sense sensing block comprises:

a twenty-first transistor including a gate electrode connected to the first terminal and that switches electrical connection between the third terminal and a twenty-third transistor;

a twenty-second transistor that switches electrical connection between the tenth terminal and the twenty-first transistor and to switch electrical connection between the tenth terminal and the twenty-third transistor;

the twenty-third transistor including a gate electrode connected to the first terminal and that switches electrical connection between the gate electrode of the twenty-first transistor and a gate electrode of the twenty-second transistor;

a twenty-fourth transistor including a gate electrode connected to the gate electrode of the twenty-second transistor, and electrically connected to the sixth terminal;

a twenty-fifth transistor including a gate electrode electrically connected to the second terminal and that switches electrical connection between the twenty-fourth transistor and the second Q node;

a seventh transistor including a gate electrode electrically connected to the gate electrode of the twenty-fourth transistor, and electrically connected to the seventh terminal; and a capacitor including an electrode electrically connected to the gate electrode of the twenty-fourth transistor and another electrode electrically connected to the sixth terminal.

11. The scan driving circuit of claim 9, wherein the sense sensing block comprises:

a fourteenth transistor electrically connected to the sixth terminal;

a nineteenth transistor that switches electrical connection between the third terminal and a gate electrode of the fourteenth transistor and including a gate electrode electrically connected to the first terminal;

a fifteenth transistor including a gate electrode electrically connected to the second terminal and that switches electrical connection between the fourteenth transistor and the second Q node; and a capacitor including an electrode electrically connected to the fourteenth transistor and another electrode electrically connected to the sixth terminal.

12. A display device, comprising:

a display panel including:

a plurality of scan lines;

a plurality of sense lines;

a plurality of data lines;

a plurality of reference voltage lines; and a plurality of sub-pixels, each of the plurality of sub-pixels being electrically connected to a corresponding one of the plurality of scan lines, a corresponding one of the plurality of sense lines, a corresponding one of the plurality of data lines, and a corresponding one of the plurality of reference voltage lines;

a scan driving circuit comprising a plurality of scan stage circuits that output a first carry signal and a scan signal, and a plurality of sense stage circuits that output a second carry signal and a sense signal, wherein the scan driving circuit outputs the scan signal to each of the plurality of scan lines and outputs the sense signal to each of the plurality of sense lines;

a data driving circuit comprising an output circuit that supplies a data voltage to the plurality of data lines and a sensing circuit that senses at least one of the plurality of reference voltage lines; and a timing controller that controls operation timings of the scan driving circuit and the data driving circuit, wherein each of the plurality of scan stage circuits receives the first carry signal from at least one preceding or subsequent scan stage circuit, and each of the plurality of sense stage circuits receives the second carry signal from at least one preceding or subsequent sense stage circuit, and each of the plurality of sense stage circuits receives the first carry signal from one of the at least one preceding or subsequent scan stage circuit.

13. The display device of claim 12, wherein at least one of the plurality of sub-pixels comprises:

a light emitting element connected between a second node and a second power line;

a first transistor including a gate electrode electrically connected to a first node, and connected between a first power line and the second node;

a second transistor including a gate electrode electrically connected to a corresponding one of the plurality of scan lines and that switches electrical connection between the first node and the corresponding one of the plurality of data lines;

a third transistor including a gate electrode electrically connected to a corresponding one of the plurality of sense lines and that switches electrical connection between the second node and the corresponding one of the plurality of reference voltage lines; and a storage capacitor including an electrode electrically connected to the first node and another electrode electrically connected to the second node.

14. The display device of claim 12, wherein, in an active period of a frame period including the active period and a blank period, the display device supplies a data voltage to the plurality of data lines and sequentially supplies a scan signal having a turn-on level to the plurality of scan lines in synchronization with a timing of supplying the data voltage, and in the blank period of the frame period, the display device supplies a scan signal having a turn-off level to the plurality of scan lines and sequentially supplies a sense signal having a turn-on level to the plurality of sense lines.

15. The display device of claim 14, wherein the blank period of a preceding frame and the active period of a subsequent frame overlap each other.

16. The display device of claim 14, wherein the timing controller outputs a first sampling signal for selecting one sense stage circuit from among the plurality of sense stage circuits in the active period.

17. The display device of claim 16, wherein the timing controller outputs a second sampling signal for outputting the sense signal from the one sense stage circuit selected from among the plurality of sense stage circuits in the blank period.

18. The display device of claim 16, wherein the one selected sense stage circuit is a sense stage circuit that simultaneously receives the first carry signal having a turn-on level and the first sampling signal having a turn-on level among the plurality of sense stage circuits.

* * * * *